(12) United States Patent
Snydacker et al.

(10) Patent No.: US 10,505,178 B2
(45) Date of Patent: Dec. 10, 2019

(54) ION EXCHANGE SYSTEM FOR LITHIUM EXTRACTION

(71) Applicant: Lilac Solutions, Inc., Middletown, RI (US)

(72) Inventors: David Henry Snydacker, San Francisco, CA (US); Alexander John Grant, San Francisco, CA (US); Ryan Ali Zarkesh, Richmond, CA (US)

(73) Assignee: LILAC SOLUTIONS, INC., Middletown, RI (US)

( * ) Notice: Subject to any disclaimer, the term of this patent is extended or adjusted under 35 U.S.C. 154(b) by 0 days.

(21) Appl. No.: 16/409,643

(22) Filed: May 10, 2019

(65) Prior Publication Data

US 2019/0273245 A1    Sep. 5, 2019

Related U.S. Application Data

(63) Continuation of application No. 16/052,381, filed on Aug. 1, 2018.

(60) Provisional application No. 62/582,208, filed on Nov. 6, 2017, provisional application No. 62/540,511, filed on Aug. 2, 2017.

(51) Int. Cl.
*H01M 4/13* (2010.01)
*H01M 4/131* (2010.01)
*H01M 10/0525* (2010.01)
*H01M 10/52* (2006.01)
*B01D 15/36* (2006.01)

(52) U.S. Cl.
CPC .......... *H01M 4/131* (2013.01); *B01D 15/361* (2013.01); *B01D 15/362* (2013.01); *H01M 10/0525* (2013.01); *H01M 10/52* (2013.01)

(58) Field of Classification Search
CPC ............... H01M 4/131; H01M 10/052; H01M 10/0525; H01M 10/52; B01D 15/361; B01D 15/362; B01D 9/0018; B01D 9/0059; B01D 61/422; B01J 39/09; B01J 39/02; B01J 39/10
See application file for complete search history.

(56) References Cited

U.S. PATENT DOCUMENTS

| | | |
|---|---|---|
| 3,793,433 A | 2/1974 | Seeley et al. |
| 4,116,858 A | 9/1978 | Lee et al. |
| 4,159,311 A | 6/1979 | Bauman et al. |
| 5,039,382 A | 8/1991 | Suzuki et al. |

(Continued)

FOREIGN PATENT DOCUMENTS

| | | |
|---|---|---|
| CN | 101961634 A | 2/2011 |
| CN | 102872792 A | 1/2013 |

(Continued)

OTHER PUBLICATIONS

Chitrakar et al. Lithium recovery from salt lake brine by $H_2TiO_3$. Dalton Trans 43:8933-8939 (2014).

(Continued)

*Primary Examiner* — Raymond Alejandro
(74) *Attorney, Agent, or Firm* — Wilson Sonsini Goodrich & Rosati

(57) ABSTRACT

The present invention relates to the extraction of lithium from liquid resources such as natural and synthetic brines, leachate solutions from clays and minerals, and recycled products.

19 Claims, 10 Drawing Sheets

(56) References Cited

U.S. PATENT DOCUMENTS

| | | | |
|---|---|---|---|
| 7,435,477 | B2 | 10/2008 | Adachi et al. |
| 8,506,851 | B2 | 8/2013 | Ravet et al. |
| 8,679,224 | B2 | 3/2014 | Brown et al. |
| 8,741,150 | B2 | 6/2014 | Chung et al. |
| 8,778,289 | B2 | 7/2014 | Chon et al. |
| 9,034,294 | B1 | 5/2015 | Harrison et al. |
| 9,677,181 | B2 | 6/2017 | Bourassa et al. |
| 10,150,056 | B2 | 12/2018 | Snydacker et al. |
| 2004/0005267 | A1 | 1/2004 | Boryta et al. |
| 2007/0138020 | A1 | 6/2007 | Balagopal et al. |
| 2010/0116748 | A1 | 5/2010 | Rasmussen et al. |
| 2011/0044882 | A1 | 2/2011 | Buckley et al. |
| 2011/0174739 | A1 | 7/2011 | Chung et al. |
| 2013/0306565 | A1 | 11/2013 | Davis |
| 2014/0113197 | A1 | 4/2014 | Xiao et al. |
| 2014/0239221 | A1* | 8/2014 | Harrison ............ C09K 5/10 252/67 |
| 2015/0013499 | A1 | 1/2015 | Asano et al. |
| 2015/0083667 | A1 | 3/2015 | Stouffer |
| 2015/0197830 | A1* | 7/2015 | Chon ............... C22B 3/42 423/179.5 |
| 2016/0115040 | A1* | 4/2016 | Yi .................. B01D 9/0031 23/302 R |
| 2016/0230250 | A1 | 8/2016 | Chung et al. |
| 2017/0022617 | A1 | 1/2017 | Magnan et al. |
| 2017/0028395 | A1 | 2/2017 | Bewsey |
| 2017/0189855 | A1* | 7/2017 | Xiang ............... B01D 61/44 |
| 2017/0217796 | A1 | 8/2017 | Snydacker et al. |
| 2018/0080133 | A1 | 3/2018 | Smith et al. |
| 2018/0133619 | A1 | 5/2018 | Snydacker |
| 2019/0044126 | A1 | 2/2019 | Snydacker et al. |
| 2019/0046898 | A1 | 2/2019 | Snydacker |

FOREIGN PATENT DOCUMENTS

| | | |
|---|---|---|
| CN | 103794779 A | 5/2014 |
| FR | 3034781 A1 | 10/2016 |
| JP | 5898021 B2 | 4/2016 |
| WO | WO-2016064689 A2 | 4/2016 |
| WO | WO-2016172017 A1 | 10/2016 |
| WO | WO-2017005113 A1 | 1/2017 |
| WO | WO-2017020090 A1 | 2/2017 |
| WO | WO-2017137885 A1 | 8/2017 |
| WO | WO-2018089932 A1 | 5/2018 |
| WO | WO-2019028148 A1 | 2/2019 |
| WO | WO-2019028174 A2 | 2/2019 |

OTHER PUBLICATIONS

Chitrakar et al. Selective Uptake of Lithium Ion from Brine by $H_{1.33}Mn_{1.67}O_4$ and $H_{1.6}Mn_{1.6}O_4$. Chem Lett 41:1647-1649 (2012).

Cho et al. High-Performance $ZrO_2$-Coated $LiNiO_2$ Cathode Material. Electrochem Solid-State Lett 4(10):A159-A161 (2001).

Co-pending U.S. Appl. No. 16/366,697, filed Mar. 27, 2019.

Department of Energy. Ion Exchange Materials for Lithium Extraction (Topic: 15, Subtopic:e)—Abstract. Available at https://www.sbir.gov/sbirsearch/detail/1307793 (3 pgs.) (2017).

Larumbe et al. Effect of a $SiO_2$ coating on the magnetic properties of $Fe_3O_4$ nanoparticles. JPhys: Condens Matter 24(26):266007 (2012).

Nishihama et al. Selective recovery process of lithium from seawater using integrated ion exchange methods. Solvent Extraction and Ion Exchange 29:421-431 (2011).

Oh et al. Double Carbon Coating of $LiFePO_4$ as High Rate Electrode for Rechargeable Lithium Batteries. Adv. Mater. 22:4842-4845 (2010).

Pareja et al. Corrosion behaviour of zirconia barrier coatings on galvanized steel. Surface and Coatings Technology 200(22-23):6606-6610 (2006).

Patel et al. Ionic and electronic conductivities of atomic layer deposition thin film coated lithium ion battery cathode particles. RSC Advances 6:98768-98776 (2016).

PCT/US2017/061384 International Search Report and Written Opinion dated Feb. 14, 2018.

PCT/US2018/044821 International Search Report and Written Opinion dated Oct. 12, 2018.

PCT/US2018/044868 International Search Report and Written Opinion dated Mar. 6, 2019.

Tarakina et al. Defect crystal structure of new $TiO(OH)_2$ hydroxide and related lithium salt $Li_2TiO_3$. Dalton Trans 39:8168-8176 (2010).

U.S. Appl. No. 15/811,415 Office Action dated May 24, 2018.

U.S. Appl. No. 16/052,381 Office Action dated Nov. 1, 2018.

PCT/US2019/017885 International Search Report and Written Opinion dated Jun. 14, 2019.

PCT/US2019/019780 International Search Report and Written Opinion dated Jun. 14, 2019.

U.S. Appl. No. 16/366,697 Office Action dated Jun. 6, 2019.

* cited by examiner

ION EXCHANGE SYSTEM FOR LITHIUM EXTRACTION

CROSS-REFERENCE

This application is a continuation of U.S. application Ser. No. 16/052,381, filed on Aug. 1, 2018, which claims the benefit of U.S. Provisional Applications Nos. 62/540,511, filed Aug. 2, 2017, and 62/582,208, filed Nov. 6, 2017, which applications are incorporated herein by reference in their entireties.

BACKGROUND OF THE INVENTION

Lithium is an essential element for high-energy rechargeable batteries and other technologies. Lithium can be found in a variety of liquid solutions, including natural and synthetic brines and leachate solutions from minerals and recycled products

SUMMARY OF THE INVENTION

Lithium can be extracted from liquid resources using an ion exchange process based on inorganic ion exchange materials. Inorganic ion exchange materials absorb lithium ions from a liquid resource while releasing hydrogen ions, and then elute lithium ions in acid while absorbing hydrogen ions. The ion exchange process can be repeated to extract lithium ions from a liquid resource and yield a concentrated lithium ion solution. The concentrated lithium ion solution can be further processed into chemicals for the battery industry or other industries.

An aspect described herein is a system for the extraction of lithium ions from a liquid resource, comprising: a) an ion exchange material; and b) a pH modulating setup for increasing the pH of the liquid resource in the system.

In some embodiments, the ion exchange material is loaded in a vessel. In some embodiments, the ion exchange material is loaded in a plurality of vessels. In some embodiments, the pH modulating setup is connected to the vessel loaded with the ion exchange material. In some embodiments, the vessel further comprises a plurality of injection ports, wherein the plurality of injection ports is used to increase the pH of the liquid resource in the system. In some embodiments, the pH modulating setup further comprises one or more tanks.

In some embodiments, the pH modulating setup is a tank comprising: a) one or more compartments; and b) a means for moving the liquid resource through the one or more compartments. In some embodiments, the ion exchange material is loaded in at least one compartment. In some embodiments, the tank further comprises a means for circulating the liquid resource throughout the tank. In some embodiments, the means for circulating the liquid resource throughout the tank is a mixing device. In some embodiments, the tank further comprises an injection port.

An aspect described herein is a system for the extraction of lithium ions from a liquid resource, comprising a tank, wherein the tank further comprises: a) one or more compartments; b) an ion exchange material; c) a mixing device; and d) a pH modulating setup for changing the pH of the system, wherein the ion exchange material is used to extract lithium ions from the liquid resource.

In some embodiments, the ion exchange material is loaded in at least one of the one or more compartments. In some embodiments, the pH modulating setup comprises a pH measuring device and an inlet for adding base. In some embodiments, the pH measuring device is a pH probe. In some embodiments, the inlet is an injection port. In some embodiments, the tank further comprises a porous partition. In some embodiments, the porous partition is a porous polymer partition.

An aspect described herein is a system for the extraction of lithium ions from a liquid resource comprising an ion exchange material and a plurality of columns, wherein each of the plurality of columns is configured to transport the ion exchange material along the length of the column and the ion exchange material is used to extract lithium ions from the liquid resource.

In some embodiments, at least one of the plurality of columns comprises an acidic solution. In some embodiments, at least one of the plurality of columns comprises the liquid resource. In some embodiments, each of the plurality of columns is configured to transport the ion exchange material by a pipe system or an internal conveyer system.

In some embodiments, the ion exchange material comprises a plurality of ion exchange particles. In some embodiments, the plurality of ion exchange particles in the ion exchange material is selected from uncoated ion exchange particles, coated ion exchange particles and combinations thereof. In some embodiments, the ion exchange material is a porous ion exchange material. In some embodiments, the porous ion exchange material comprises a network of pores that allows liquids to move quickly from the surface of the porous ion exchange material to the plurality of ion exchange particles. In some embodiments, the ion exchange material is in the form of porous ion exchange beads. In some embodiments, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

An aspect described herein is a device for lithium extraction from a liquid resource comprising one or more vessels independently configured to simultaneously accommodate porous ion exchange beads moving in one direction and alternately acid, brine, and optionally other solutions moving in the net opposite direction.

In some embodiments, at least one of the one or more vessels are fitted with a conveyer system suitably outfitted to move porous ion exchange beads upward and simultaneously allow a net flow of acid, brine, and optionally other solutions, downward. In some embodiments, the porous ion exchange beads comprise ion exchange particles that reversibly exchange lithium and hydrogen and a structural matrix material, and having a pore network. In some embodiments, the liquid resource comprises a natural brine, a dissolve salt flat, a concentrated brine, a processed brine, a filtered brine, a liquid from an ion exchange process, a liquid from a solvent extraction process, a synthetic brine, leachate from ores, leachate from minerals, leachate from clays, leachate from recycled products, leachate from recycled materials, or combinations thereof.

An aspect described herein is a method of extracting lithium ions from a liquid resource, comprising: a) flowing the liquid resource through a system described herein to produce a lithiated ion exchange material; and b) treating the lithiated ion exchange material from a) with an acid solution to produce a salt solution comprising lithium ions.

An aspect described herein is a method of extracting lithium ions from a liquid resource, comprising: a) flowing the liquid resource through the tank of a system described herein to produce a lithiated ion exchange material; and b) treating the lithiated ion exchange material from a) with an acid solution to produce a salt solution comprising lithium ions.

An aspect described herein is a method of extracting lithium ions from a liquid resource, comprising: a) flowing the liquid resource into a system comprising a tank to produce a lithiated ion exchange material, wherein the tank further comprises (i) one or more compartments, (ii) an ion exchange material, (iii) a mixing device, and (iv) a pH modulating setup for changing the pH of the liquid resource; and b) treating the lithiated ion exchange material from a) with an acid solution to produce a hydrogen-rich ion exchange material and a salt solution comprising lithium ions. In some embodiments, the method further comprises prior to b), washing the lithiated ion exchange material with an aqueous solution. In some embodiments, the method further comprises subsequent to b), washing the hydrogen-rich ion exchange material with an aqueous solution. In some embodiments, the pH modulating setup comprises a pH measuring device and an inlet for adding base. In some embodiments, the pH measuring device is a pH probe. In some embodiments, the inlet is a pipe. In some embodiments, the inlet is an injection port. In some embodiments, the method further comprises, during a), the pH modulating setup measuring a change in pH. In some embodiments, the change in pH triggers the addition of a base to maintain lithium uptake. In some embodiments, the change in pH to below a pH value of about 2 to about 9 triggers the addition of base to maintain lithium uptake.

In some embodiments of the methods described herein, the tank further comprises a porous partition. In some embodiments, the porous partition is a porous polymer partition.

An aspect described herein is a method of extracting lithium ions from a liquid resource, comprising: a) providing a system comprising an ion exchange material, a tank comprising one or more compartments; and a mixing device, wherein (i) the ion exchange material is oxide-based and exchanges hydrogen ions with lithium ions, and (ii) the mixing device is capable of moving the liquid resource around the tank comprising one or more compartments; b) flowing the liquid resource into the system of a) thereby contacting the liquid resource with the ion exchange material, wherein the ion exchange material exchanges hydrogen ions with lithium ions in the liquid resource to produce lithiated ion exchange material; c) removing the liquid resource from the system of b); d) flowing an acid solution into the system of c) thereby contacting the acid solution with the lithiated ion exchange material, wherein the lithiated ion exchange material exchanges lithium ions with the hydrogen ions in the acid solution to produce the ion exchange material and a salt solution comprising lithium ions from the lithiated ion exchange material; and e) collecting the salt solution comprising the lithium ions for further processing.

In some embodiments of the methods described herein, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

In some embodiments of the methods described herein, the acid solution comprises hydrochloric acid, sulfuric acid, phosphoric acid, hydrobromic acid, chloric acid, perchloric acid, nitric acid, formic acid, acetic acid, or combinations thereof.

An aspect described herein is a process for lithium extraction from a liquid resource comprising treating ion exchange material alternately with acid, brine, and optionally other solutions, in a configuration where the material moves in the net opposite direction to the acid, brine, and optionally other solutions, thereby producing a lithium-enriched solution from the liquid resource.

In some embodiments of the process for lithium extraction from a liquid resource, the process comprises: a) treating the ion exchange material with acid under conditions suitable to absorb hydrogen to generate hydrogen-enriched material and release lithium to generate a lithium-enriched solution; b) optionally, washing the hydrogen-enriched material with water to generate hydrogen-enriched material substantially free of residual acid; c) treating the hydrogen-enriched material with the liquid resource under conditions suitable to absorb lithium to generate lithium-enriched material; d) optionally, washing the lithium-enriched material with water to generate lithium-enriched material substantially free of liquid resource; and e) repeating the cycle to produce a lithium-enriched solution from the liquid resource. In some embodiments, the ion exchange material comprises ion exchange particles that reversibly exchange lithium and hydrogen and a structural matrix material, and having a pore network. In some embodiments of the processes described herein, the liquid resource comprises a natural brine, a dissolved salt flat, a concentrated brine, a processed brine, a filtered brine, a liquid from an ion exchange process, a liquid from a solvent extraction process, a synthetic brine, leachate from ores, leachate from minerals, leachate from clays, leachate from recycled products, leachate from recycled materials, or combinations thereof.

An aspect described herein is a process for the extraction of lithium ions from a liquid resource, comprising: a) contacting an ion exchange material with the liquid resource; and b) increasing the pH of the liquid resource before contact with the ion exchange material, during contact with the ion exchange material, after contact with the ion exchange material, or combinations thereof. In some embodiments, the ion exchange material is loaded into one or more compartments in a tank. In some embodiments, the process further comprises moving the liquid resource through the one or more compartments in the tank. In some embodiments, the tank comprises injection ports. In some embodiments, the process further comprises using the injection ports to increase the pH of the liquid resource before contact with the ion exchange material, during contact with the ion exchange material, after contact with the ion exchange material, or combinations thereof. In some embodiments, the ion exchange material is loaded into one or more vessels. In some embodiments, the one or more vessels further comprise a plurality of injection ports. In some embodiments, the process further comprises using the plurality of injection ports to increase the pH of the liquid resource before contact with the ion exchange material, during contact with the ion exchange material, after contact with the ion exchange material, or combinations thereof.

In some embodiments of the processes described herein, the ion exchange material comprises a plurality of ion exchange particles. In some embodiments, the plurality of ion exchange particles in the ion exchange material is selected from uncoated ion exchange particles, coated ion exchange particles and combinations thereof. In some embodiments, the ion exchange material is a porous ion exchange material. In some embodiments, the porous ion exchange material comprises a network of pores that allows liquids to move quickly from the surface of the porous ion exchange material to the plurality of ion exchange particles. In some embodiments, the porous ion exchange material is in the form of porous ion exchange beads.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
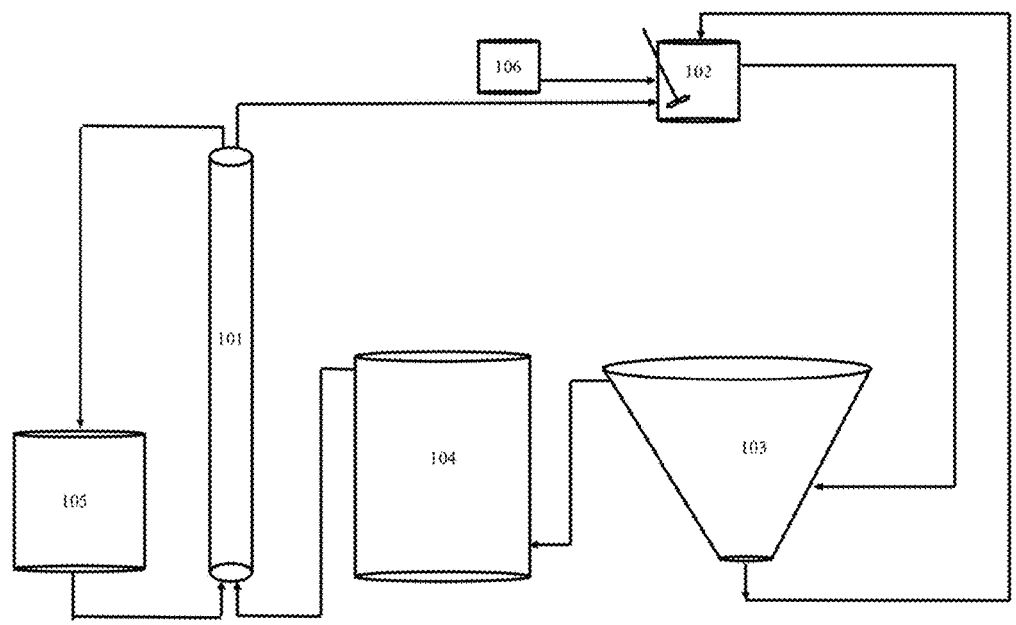
FIG. 1 illustrates a recirculating batch system comprising an ion exchange column, a mixing tank, a settling tank, and a recirculation tank.

The terms "lithium", "lithium ion", and "$Li^+$" are used interchangeably in the present specification and these terms are synonymous unless specifically noted to the contrary. The terms "hydrogen", "hydrogen ion", "proton", and "$H^+$" are used interchangeably in the present specification and these terms are synonymous unless specifically noted to the contrary.

As used herein, the words "column" and "vessel" are used interchangeably. In some embodiments described herein referring to a "vessel", the vessel is a column. In some embodiments described herein referring to a "column", the column is a vessel.

The term "the pH of the system" or "the pH of" a component of a system, for example one or more tanks, vessels, columns, pH modulating setups, or pipes used to establish fluid communication between one or more tanks, vessels, columns, or pH modulating setups, refers to the pH of the liquid medium contained or present in the system, or contained or present in one or more components thereof. In some embodiments, the liquid medium contained in the system, or one or more components thereof, is a liquid resource. In some embodiments, the liquid medium contained in the system, or one or more components thereof, is a brine. In some embodiments, the liquid medium contained in the system, or one or more components thereof, is an acid solution, an aqueous solution, a wash solution, a salt solution, a salt solution comprising lithium ions, or a lithium-enriched solution.

Lithium is an essential element for batteries and other technologies. Lithium is found in a variety of liquid resources, including natural and synthetic brines and leachate solutions from minerals, clays, and recycled products. Lithium is optionally extracted from such liquid resources using an ion exchange process based on inorganic ion exchange materials. These inorganic ion exchange materials absorb lithium from a liquid resource while releasing hydrogen, and then elute lithium in acid while absorbing hydrogen. This ion exchange process is optionally repeated to extract lithium from a liquid resource and yield a concentrated lithium solution. The concentrated lithium solution is optionally further processed into chemicals for the battery industry or other industries.

Ion exchange materials are optionally formed into beads and the beads are optionally loaded into ion exchange columns for lithium extraction. Alternating flows of brine, acid, and other solutions are optionally flowed through an ion exchange column to extract lithium from the brine and produce a lithium concentrate, which is eluted from the column using the acid. As brine flows through the ion exchange column, the beads absorb lithium while releasing hydrogen, where both the lithium and hydrogen are cations. The release of hydrogen during lithium uptake will acidify the brine and limit lithium uptake unless the pH of the brine is optionally maintained in a suitable range to facilitate thermodynamically favorable lithium uptake and concomitant hydrogen release.

To control the pH of the brine and maintain the pH in a range that is suitable for lithium uptake in an ion exchange column, bases such as NaOH, $Ca(OH)_2$, CaO, KOH, or $NH_3$ are optionally added to the brine as solids, aqueous solutions, or in other forms. For brines that contain divalent ions such as Mg, Ca, Sr, or Ba, addition of base to the brine can cause precipitation of solids, such as $Mg(OH)_2$ or $Ca(OH)_2$, which can cause problems for the ion exchange reaction. These precipitates cause problems in at least three ways. First, precipitation can remove base from solution, leaving less base available in solution to neutralize protons and maintain pH in a suitable range for lithium uptake in the ion exchange column. Second, precipitates that form due to base addition can clog the ion exchange column, including clogging the surfaces and pores of ion exchange beads and the voids between ion exchange beads. This clogging can prevent lithium from entering the beads and being absorbed by the ion exchange material. The clogging can also cause large pressure heads in the column. Third, precipitates in the column dissolve during acid elution and thereby contaminate the lithium concentrate produced by the ion exchange system. For ion exchange beads to absorb lithium from brine, an ideal pH range for the brine is optionally 6 to 9, a preferred pH range is optionally 4 to 9, and an acceptable pH range is optionally 2 to 9.

System of Modulating pH for the Extraction of Lithium

An aspect of the invention described herein is an ion exchange reactor for lithium extraction with a form that allows for pH control during lithium uptake from a brine or other lithium ion-containing liquid resource. This reactor functions to neutralize hydrogen that is released during lithium uptake, while solving the problems associated with precipitation from base addition.

An aspect of the invention described herein is a system for the extraction of lithium ions from a liquid resource, comprising: a) an ion exchange material; and b) a pH modulating setup for increasing pH of the liquid resource in the system. The ion exchange material extracts lithium ions from a liquid resource. During the extraction of lithium ions from a liquid resource by the ion exchange material, the pH of the liquid resource optionally decreases. Increasing the pH of the liquid resource in the system by using a pH modulating setup maintains the pH in a range that is suitable for lithium ion uptake by the ion exchange material. In an embodiment, the pH modulating setup comprises measuring the pH of the system and adjusting the pH of the system to an ideal pH range for lithium extraction. In an embodiment, for ion exchange material to absorb lithium from brine, an ideal pH range for the brine is optionally 6 to 9, a preferred pH range is optionally 4 to 9, and an acceptable pH range is optionally 2 to 9. In an embodiment, the pH modulating setup comprises measuring the pH of the system and wherein the pH of the system is less than 6, less than 4, or less than 2, the pH of the system is adjusted to a pH of 2 to 9, a pH of 4 to 9, or a pH of 6 to 9.

Recirculating Batch System

In an embodiment of the system, the ion exchange material is loaded in a column. In an embodiment of the system, the pH modulating setup is connected to the column loaded with the ion exchange material. In an embodiment of the system, the pH modulating setup comprises one or more tanks.

In some embodiments of the systems described herein, the ion exchange material is loaded in a vessel. In some embodiments, the pH modulating setup is in fluid communication with the vessel loaded with the ion exchange material. In some embodiments, the pH modulating setup is in fluid communication with the column loaded with the ion exchange material.

In one embodiment of the system, one or more ion exchange columns are loaded with a fixed or fluidized bed of ion exchange beads. In one embodiment of the system, the ion exchange column is a cylindrical construct with entry and exit ports. In a further embodiment, the ion exchange column is optionally a non-cylindrical construct with entry and exit ports. In a further embodiment, the ion exchange column optionally has entry and exit ports for brine pumping, and additional doors or hatches for loading and unloading ion exchange beads to and from the column. In a further embodiment, the ion exchange column is optionally equipped with one or more security devices to decrease the risk of theft of the ion exchange beads. In one embodiment, these beads contain ion exchange material that can reversibly absorb lithium from brine and release lithium in acid. In one embodiment, the ion exchange material is comprised of particles that are optionally protected with coating material such as $SiO_2$, $ZrO_2$, or $TiO_2$ to limit dissolution or degradation of the ion exchange material. In one embodiment, these beads contain a structural component such as an acid-resistant polymer that binds the ion exchange materials. In one embodiment, the beads contain pores that facilitate penetration of brine, acid, aqueous, and other solutions into the beads to deliver lithium and hydrogen to and from the bead or to wash the bead. In one embodiment, the bead pores are structured to form a connected network of pores with a distribution of pore sizes and are structured by incorporating filler materials during bead formation and later removing that filler material in a liquid or gas.

In one embodiment of the system, the system is a recirculating batch system, which comprises an ion exchange column that is connected to one or more tanks for mixing base into the brine, settling out any precipitates following base addition, and storing the brine prior to reinjection into the ion exchange column or the other tanks. In one embodiment of the recirculating batch system, the brine is loaded into one or more tanks, pumped through the ion exchange column, pumped through a series of tanks, and then returned to the ion exchange column in a loop. In one embodiment, the brine optionally traverses this loop repeatedly. In one embodiment, the brine is recirculated through the ion exchange column to enable optimal lithium uptake by the beads. In one embodiment, base is added to the brine in such a way that pH is maintained at an adequate level for lithium uptake and in such a way that the amount of base-related precipitates in the ion exchange column is minimized.

In one embodiment, as the brine is pumped through the recirculating batch system, the brine pH drops in the ion exchange column due to hydrogen release from the ion exchange beads during lithium uptake, and the brine pH is adjusted upward by the addition of base as a solid, aqueous solution, or other form. In one embodiment, the ion exchange system drives the ion exchange reaction to near completion, and the pH of the brine leaving the ion exchange column approaches the pH of the brine entering the ion exchange column. In one embodiment, the amount of base added is optionally controlled to neutralize the hydrogen released by the ion exchange beads in such a way that no basic precipitates form. In one embodiment, an excess of base or a transient excess of base is optionally added in such a way that basic precipitates form. In one embodiment, the basic precipitates form transiently and then are redissolved partially or fully by the hydrogen that is released from the ion exchange column. In one embodiment of the system, base is optionally added to the brine flow prior to the ion exchange column, after the ion exchange column, prior to one or more tanks, or after one or more tanks.

In one embodiment of the recirculating batch system, the tanks include a mixing tank where the base is mixed with the brine. In one embodiment, the tanks include a settling tank, where precipitates such as $Mg(OH)_2$ optionally settle to the bottom of the settling tank to avoid injection of the precipitates into the ion exchange column. In one embodiment, the tanks include a storage tank where the brine is stored prior to reinjection into the ion exchange column, mixing tank, settling tank, or other tanks. In one embodiment, the tanks include an acid recirculation tank. In one embodiment, some tanks in the recirculating batch reactor optionally serve a combination of purposes including base mixing tank, settling tank, acid recirculation tank, or storage tank. In any embodiment, a tank optionally does not fulfil two functions at the same time. For example, a tank is not a base mixing tank and a settling tank.

In one embodiment of the recirculating batch system, base is added to a mixing tank, which is optionally a continuous stirred tank system, a confluence of acidified brine flow and base flow followed by a static mixer, a confluence of acidified brine flow and base flow followed by a paddle mixer, a confluence of acidified brine flow and base flow followed by a turbine impeller mixer, or a continuous stirred tank system in the shape of a vertical column which is well mixed at the bottom and settled near the top. In one embodiment, the base is optionally added as a solid or as an aqueous solution. In one embodiment, the base is optionally added continuously at a constant or variable rate. In one embodiment, the base is optionally added discretely in constant or variable aliquots or batches. In one embodiment, the base is optionally added according to one or more pH meters, which optionally samples brine downstream of the ion exchange column or elsewhere in the recirculating batch system. In one embodiment, filters are optionally used to prevent precipitates from leaving the mixing tank. In one embodiment, the filters are optionally plastic mesh screens, small packed columns containing granular media such as sand, silica, or alumina, small packed columns containing porous media filter, or a membrane.

In one embodiment of the recirculating batch system, the settling tank is optionally a settling tank with influent at bottom and effluent at top or a settling tank with influent on one end and effluent on another end. In one embodiment, chambered weirs are used to fully settle precipitates before brine is recirculated into reactor. In one embodiment, solid base precipitates are collected at the bottom of the settling tank and recirculated into the mixer. In one embodiment, precipitates such as $Mg(OH)_2$ optionally settle near the bottom of the tank. In one embodiment, brine is removed from the top of the settling tank, where the amount of suspended precipitates is minimal. In one embodiment, the precipitates optionally settle under forces such as gravity, centrifugal action, or other forces. In one embodiment, filters are optionally used to prevent precipitates from leaving the settling tank. In one embodiment, the filters are optionally plastic mesh screens, small packed columns containing granular media such as sand, silica, or alumina, small packed columns containing porous media filter, or a membrane. In one embodiment, baffles are optionally used to ensure settling of the precipitate and to prevent the precipitate from exiting the settling tank and entering the column.

In one embodiment of the recirculating batch system, basic precipitates are optionally collected from the settling tank and reinjected into the brine in a mixing tank or elsewhere to adjust the pH of the brine.

In one embodiment of the recirculating batch system, one or more ion exchange columns are optionally connected to one or more tanks or set of tanks. In one embodiment of the recirculating batch system, there are optionally multiple ion exchange columns recirculating brine through a shared set of mixing, settling, and storage tanks. In one embodiment of the recirculating batch system, there is optionally one ion exchange column recirculating brine through multiple sets of mixing, settling, and storage tanks.

Column Interchange System

An aspect of the invention described herein is a system wherein the ion exchange material is loaded in a plurality of columns. In an embodiment, the pH modulating setup comprises a plurality of tanks connected to the plurality of columns, wherein each of the plurality of tanks is immediately connected to one of the plurality of columns. In an embodiment, two or more of the plurality of tanks connected to the plurality of columns forms at least one circuit. In an embodiment, three or more of the plurality of tanks connected to the plurality of columns forms at least two circuits. In an embodiment, three or more of the plurality of tanks connected to the plurality of columns forms at least three circuits. In an embodiment, at least one circuit is a liquid resource circuit. In an embodiment, at least one circuit is a water washing circuit. In an embodiment, at least one circuit is an acid solution circuit. In an embodiment, at least two circuits are water washing circuits.

In one embodiment of the ion exchange system, the system is a column interchange system where a series of ion exchange columns are connected to form a brine circuit, an acid circuit, a water washing circuit, and optionally other circuits. In one embodiment of the brine circuit, brine flows through a first column in the brine circuit, then into a next column in the brine circuit, and so on, such that lithium is removed from the brine as the brine flows through one or more columns. In one embodiment of the brine circuit, base is added to the brine before or after each ion exchange column or certain ion exchange columns in the brine circuit to maintain the pH of the brine in a suitable range for lithium uptake by the ion exchange beads. In one embodiment of the acid circuit, acid flows through a first column in the acid circuit, then into the next column in the acid circuit, and so on, such that lithium is eluted from the columns with acid to produce a lithium concentrate. In one embodiment of the acid circuit, acid flows through a first column in the acid circuit, then optionally into a next column in the acid circuit, and so on, such that lithium is eluted from the columns with acid to produce a lithium concentrate. In one embodiment of the water washing circuit, water flows through a first column in the water washing circuit, then optionally into a next column in the water washing circuit, and so on, such that brine in the void space, pore space, or head space of the columns in the water washing circuit is washed out.

In one embodiment of the column interchange system, ion exchange columns are interchanged between the brine circuit, the water washing circuit, and the acid circuit. In one embodiment, the first column in the brine circuit is loaded with lithium and then interchanged into the water washing circuit to remove brine from the void space, pore space, or head space of the column. In one embodiment, the first column in the water washing circuit is washed to remove brine, and then interchanged to the acid circuit, where lithium is eluted with acid to form a lithium concentrate. In one embodiment, the first column in the acid circuit is eluted with acid and then interchanged into the brine circuit to absorb lithium from the brine. In one embodiment of the column interchange system, two water washing circuits are used to wash the columns after both the brine circuit and the acid circuit. In one embodiment of the column interchange system, only one water washing circuit is used to wash the columns after the brine circuit, whereas excess acid is neutralized with base or washed out of the columns in the brine circuit.

In one embodiment of the column interchange system, the first column in the brine circuit is interchanged to become the last column in the water washing circuit. In one embodiment of the column interchange system, the first column in the water washing circuit is interchanged to become the last column in the acid circuit. In one embodiment of the column interchange system, the first column in the acid circuit is interchanged to become the last column in the brine circuit.

In one embodiment of the column interchange system, each column in the brine circuit contains one or more tanks or junctions for mixing base into the brine and optionally settling any basic precipitates that form following base addition. In one embodiment of the column interchange system, each column in the brine circuit has associated one or more tanks or junctions for removing basic precipitates or other particles via settling or filtration. In one embodiment of the column interchange system, each column or various clusters of columns have associated one or more settling tanks or filters that remove particles including particles that detach from ion exchange beads.

In one embodiment of the column interchange system, the number of the columns in the brine circuit is optionally less than about 3, less than about 10, less than about 30, or less than about 100. In one embodiment of the column interchange system, the number of the columns in the acid circuit is optionally less than about 3, less than about 10, less than about 30, or less than about 100. In one embodiment of the column interchange system, the number of the columns in the water washing circuit is optionally less than about 3, less than about 10, less than about 30, or less than about 100. In certain embodiments, the number of columns in the brine circuit is 1 to 10. In some embodiments, the number of columns in the acid circuit is 1 to 10. In some embodiments, the number of columns in washing circuit is 1 to 10.

In one embodiment of the column interchange system, there is optionally one or more brine circuits, one or more acid circuits, and one or more water washing circuits. In one embodiment of the column interchange system, ion exchange columns are optionally supplied with fresh ion exchange beads without interruption to operating columns. In one embodiment of the column interchange system, ion exchange columns with beads that have been depleted in capacity is optionally replaced with ion exchange columns with fresh ion exchange beads without interruption to operating columns.

In one embodiment of the column interchange system, the columns contain fluidized beds of ion exchange material. In one embodiment of the column interchange system, the columns have means of created a fluidized bed of ion exchange material such as overhead stirrers or pumps. In one embodiment of the column interchange system, the columns contain fluidized beds of ion exchange material. In one embodiment of the ion exchange system, the system is an interchange system and the vessels are stirred tank reactors. In one embodiment of the interchange system, base may be added directly to the columns or other tanks containing the ion exchange material. In one embodiment of the interchange system, base may be added to the brine or another solution in a separate mixing tank and then added to the columns or other tanks containing the ion exchange material.

In one embodiment of the ion exchange system, ion exchange beads are loaded into ion exchange columns and following lithium uptake from brine, lithium is eluted from the ion exchange columns using an acid recirculation loop. In one embodiment of the acid recirculation loop, acid is flowed through an ion exchange column, into a tank, and then recirculated through the ion exchange column to optimize lithium elution. In one embodiment of the ion exchange system, ion exchange beads are loaded into ion exchange columns and following lithium uptake from brine, lithium is eluted from each ion exchange column using a once-through flow of acid. In one embodiment of the ion exchange system, ion exchange beads are loaded into an ion exchange column and following lithium uptake from brine, lithium is eluted from the ion exchange column using a column interchange circuit.

In one embodiment of the ion exchange system, ion exchange columns are loaded with lithium by flowing brine through the columns using a recirculating batch system and then lithium is eluted from the columns using a column interchange system. In one embodiment of the ion exchange system, ion exchange columns are loaded with lithium by flowing brine through the columns using a column interchange system and then lithium is eluted from the columns using a recirculating batch system. In one embodiment of the ion exchange system, ion exchange columns are loaded with lithium by flowing brine through the columns using a recirculating batch system and then lithium is eluted from the columns using a recirculating batch system. In one embodiment of the ion exchange system, ion exchange columns are loaded with lithium by flowing brine through the columns using a column interchange system and then lithium is eluted from the columns using a column interchange system.

Stirred Tank system

An aspect of the invention described herein is a system wherein the pH modulating setup is a tank comprising: a) one or more compartments; and b) a means for moving the liquid resource through the one or more compartments. In an embodiment, the ion exchange material is loaded in at least one compartment. In an embodiment, the means for moving the liquid resource through the one or more compartments is a pipe. In a further embodiment, the means for moving the liquid resource through the one or more compartments is a pipe and suitably a configured pump. In an embodiment, the tank further comprises a means for circulating the liquid resource throughout the tank. In an embodiment, the means for circulating the liquid resource throughout the tank is a mixing device. In an embodiment, the tank further comprises an injection port.

In some embodiments, the tank further comprises one or more injection ports. In some embodiments, the tank further comprises a plurality of injection ports.

An aspect described herein is a system for the extraction of lithium ions from a liquid resource, comprising a tank, wherein the tank further comprises: a) one or more compartments; b) an ion exchange material; c) a mixing device; and d) a pH modulating setup for changing the pH of the system, wherein the ion exchange material is used to extract lithium ions from the liquid resource. In one embodiment, the pH modulating setup changes the pH of the liquid resource in the system.

In some embodiments, the ion exchange material is loaded in at least one of the one or more compartments. In some embodiments, the ion exchange material is fluidized in at least one of the one or more compartments. In some embodiments, the ion exchange material is non-fluidized in at least one of the one or more compartments. In some embodiments, the ion exchange material occupies a fixed position in at least one of the one or more compartments.

In some embodiments, the pH modulating setup comprises a pH measuring device and an inlet for adding base. In some embodiments, the pH measuring device is a pH probe. In some embodiments, the inlet is a pipe. In some embodiments, the inlet is an injection port.

In some embodiments, the tank further comprises a porous partition. In some embodiments, the porous partition is a porous polymer partition. In some embodiments, the porous partition is a mesh or membrane. In some embodiments, the porous partition is a polymer mesh or polymer membrane. In some embodiments, the porous partition comprises one or more layers of mesh, membrane, or other porous structure. In some embodiments, the porous partition comprises one or more coarse meshes that provide structural support and one or more fine meshes and/or membranes that provide filtration. In some embodiments, the porous partition comprises a polyether ether ketone mesh, a polypropylene mesh, a polyethylene mesh, a polysulfone mesh, a polyester mesh, a polyamide mesh, a polytetrafluoroethylene mesh, an ethylene tetrafluoroethylene polymer mesh, a stainless steel mesh, a stainless steel mesh coated in polymer, a stainless steel mesh coated in ceramic, or a combination thereof, wherein the mesh is a course mesh, a fine mesh, or a combination thereof. In some embodiments, the porous polymer partition comprises a mesh comprising one or more blends of two or more of a polyether ether ketone, a polypropylene, a polyethylene, a polysulfone, a polyester, a polyamide, a polytetrafluoroethylene, or an ethylene tetrafluoroethylene polymer. In some embodiments, the porous partition comprises a polyether ether ketone membrane, a polypropylene membrane, a polyethylene membrane, a polysulfone membrane, a polyester membrane, a polyamide membrane, a polytetrafluoroethylene membrane, an ethylene tetrafluoroethylene polymer membrane, or combinations thereof.

In one embodiment of the ion exchange system, the system is a stirred tank system comprised of a tank of brine containing permeable bead compartments such as permeable pallets, cases, boxes, or other containers that are loaded with ion exchange beads, and the brine is stirred through the tank in a batch process. In one embodiment of the stirred tank system, the base is optionally added directly to the tank gradually or all at once as a solid or in an aqueous solution. In one embodiment of the stirred tank system, after a brine uptake stage is complete, the permeable bead containers are optionally moved to another tank for acid elution. In one embodiment of the stirred tank system, the permeable bead compartments are located at the bottom of the stirred tank during the brine stage and after the brine stage is completed, then brine is removed, and the bottom of the stirred tank is filled with acid to elute lithium in such a way that the permeable bead compartments are covered with an optimal volume of acid.

In one embodiment of the stirred tank system, the ion exchange beads are suspended using plastic structural supports in a tank with an internal mixing device. In one embodiment of the stirred tank system, a stream of brine is removed from the tank and passed through a column where hydrogen ions in the brine produced by ion exchange are neutralized using sacrificial base in solution or added as solid, or by an ion exchange resin. This pH-corrected stream is sent back into the system where the lithium can continue to be removed. In one embodiment of the stirred tank system, brine that has passed through the bead compartment is returned to the opposite end of the tank through a pipe that is optionally internal or external to the tank. In one embodiment of the stirred tank system, base is optionally added to the brine inside the tank or in a base addition tank outside the tank.

In one embodiment of the stirred tank system, fresh brine is fed to the system so as to operate in continuous stirred tank system mode instead of batch mode. In one embodiment of the recirculating batch system, fresh brine is fed to the system so as to operate in continuous stirred tank system mode instead of batch mode.

In one embodiment of the ion exchange system, the ion exchange material is mixed with a liquid resource in a stirred tank reactor. In one embodiment, the ion exchange material may be comprised of coated particles, uncoated particles, porous beads, or combinations thereof.

In one embodiment of the ion exchange system, a stirred tank reactor is used to fluidize the ion exchange material in a liquid resource to enable absorption of lithium from the liquid resource into the ion exchange material. In one embodiment, a stirred tank reactor is used to fluidize the ion exchange material in a washing fluid to remove residual brine, acid, or other contaminants from the ion exchange materials. In one embodiment, a stirred tank reactor is used to fluidize the ion exchange material in an acid solution to elute lithium from the ion exchange material while replacing the lithium in the ion exchange material with protons. In one embodiment, a single stirred tank reactor is used to mix ion exchange material with a liquid resource, washing fluid, and acid solution.

In some embodiments, the system for the extraction of lithium ions from a liquid resource, comprising a tank, wherein the tank further comprises: a) one or more compartments; b) an ion exchange material; c) a mixing device; and d) a pH modulating setup for changing the pH of the liquid resource in the system, wherein the ion exchange material is used to extract lithium ions from the liquid resource, further comprises another tank, wherein the other tank further comprises: a) one or more compartments; b) an ion exchange material; c) a mixing device; and d) a pH modulating setup for changing the pH of the liquid resource in the system. In some embodiments, the tank is in fluid communication with the other tank.

In some embodiments, the system for the extraction of lithium ions from a liquid resource, comprising a tank, wherein the system further comprises another tank, wherein the other tank further comprises: a) one or more compartments; b) an ion exchange material; c) a mixing device; and d) an acid inlet for adding acid to the system. In a further embodiment, the ion exchange material is moved between the tank and the other tank.

In some embodiments, the system for the extraction of lithium ions from a liquid resource, comprising a tank, wherein the tank further comprises: a) one or more compartments; b) an ion exchange material; c) a mixing device; and d) a pH modulating setup for changing the pH of the liquid resource in the system, wherein the ion exchange material is used to extract lithium ions from the liquid resource, further comprises a plurality of tanks, each tank further comprising: a) one or more compartments; b) an ion exchange material; c) a mixing device; and d) a pH modulating setup for changing the pH of the liquid resource in the system. In some embodiments, each tank of the system is in fluid communication with each other tank of the system.

In some embodiments, the system further comprises another plurality of tanks, wherein each tank further comprises: a) one or more compartments; b) an ion exchange material; and c) a mixing device.

In some embodiments, the system is configured to operate in a batch mode. In some embodiments, the system is configured to operate in a continuous mode. In some embodiments, the system is configured to operate in a batch mode and a continuous mode. In some embodiments, one or more tanks in the system are configured to operate in a batch mode and one or more tanks in the system are configured to operate in a continuous mode. In some embodiments, one or more tanks in the system are configured to operate in a batch mode and one or more tanks in the system are configured to operate in a semi-continuous mode. In some embodiments, one or more tanks in the system are configured to operate in a semi-continuous mode and one or more tanks in the system are configured to operate in a continuous mode. In some embodiments, one or more tanks in the system are configured to operate in a batch mode, one or more tanks in the system are configured to operate in a semi-continuous mode, and one or more tanks in the system are configured to operate in a continuous mode. In some embodiments, the system is configured to operate in a semi-continuous mode, a batch mode, a continuous mode, or combinations thereof.

In one embodiment of the ion exchange system, a plurality of stirred tank reactors are used to mix ion exchange material with a liquid resource, washing fluid, and acid solution. In one embodiment, the stirred tank reactors may be different sizes and may contain different volumes of a liquid resource, washing fluid, and acid solution. In one embodiment, the stirred tanks may be cylindrical, conical, rectangular, pyramidal, or a combination thereof. In one embodiment of the ion exchange system, the ion exchange material may move through the plurality of stirred tank reactors in the opposite direction of the liquid resource, the washing fluid, or the acid solution.

In one embodiment of the ion exchange system, a plurality of stirred tank reactors may be used where one or more stirred tank reactors mix the ion exchange material with a liquid resource, one or more stirred tank reactors mix the ion exchange material with a washing fluid, and one or more stirred tank reactors mix the ion exchange material with an acid solution.

In one embodiment of the ion exchange system, stirred tank reactors may be operated in a continuous, semi-continuous, or batch mode where a liquid resource flows continuously, semi-continuously, or batch-wise through the stirred tank reactor. In one embodiment of the ion exchange system, stirred tank reactors may be operated in a continuous, semi-continuous, or batch mode where the ion exchange material flows continuously, semi-continuously, or batch-wise through the stirred tank reactor. In one embodiment of the ion exchange system, stirred tank reactors may be operated in a mode where the ion exchange material remains in the tank while flows of liquid resource, washing fluid, or acid solution are flowed through the tank in continuous, semi-continuous, or batch flows.

In one embodiment, ion exchange material may be loaded into or removed from the stirred tank reactors through the top, the bottom, or the side of the tank.

In one embodiment of the ion exchange system, stirred tank reactors may comprise one or more compartments. In one embodiment, the compartments may contain ion exchange material in a bed that is fluidized, fixed, partially fluidized, partially fixed, alternatively fluidized, alternatively fixed, or combinations thereof. In one embodiment, the compartments may be comprised of a porous support at the bottom of the compartment, the sizes of the compartment, the top of the compartment, or combinations thereof. In one embodiment, the compartments may be conical, cylindrical, rectangular, pyramidal, other shapes, or combinations thereof. In one embodiment, the compartment may be located at the bottom of the tank. In one embodiment, the shape of the compartment may conform to the shape of the stirred tank reactor. In one embodiment, the compartment may be partially or fully comprised of the tank of the stirred tank reactor.

In one embodiment, the compartment may be comprised of a porous structure. In one embodiment, the compartment may be comprised of a polymer, a ceramic, a metal, or combinations thereof. In one embodiment, the compartment may be comprised be comprised partially or fully of a porous material or a mesh. In one embodiment, the compartment may be at the top of the tank. In one embodiment, the compartment may be separated from the rest of the tank with one or more porous materials. In one embodiment, the compartment may be at the top of the tank. In one embodiment, the compartment may be separated from the rest of the tank with a bilayer mesh comprising one layer of coarse mesh for strength and one layer of fine mesh to contain smaller particles in the compartment. In one embodiment, the compartment may allow liquid to flow freely through the stirred tank reactor and through the compartment. In one embodiment, the compartment may be open on the top. In one embodiment, the compartment may contain the ion exchange material in the tank but allow the ion exchange material to move throughout the tank. In one embodiment, the compartment may comprise a majority or minority of the tank volume. In one embodiment, the compartment may represent a fraction of the volume of the tank that is greater than 1 percent, greater than 10 percent, greater than 50 percent, greater than 90 percent, greater than 99 percent, or greater than 99.9 percent. In one embodiment, one or more devices for stirring, mixing, or pumping may be used to move fluid through the compartment, the stirred tank reactor, or combinations thereof.

In one embodiment of the ion exchange system, stirred tank reactors may be arranged into a network where flows of brine, washing fluid, and acid solutions are directly through different columns. In one embodiment, a network of stirred tank reactors may involve physical movement of the ion exchange material through the various stirred tank reactors. In one embodiment, a network of stirred tank reactors may involve no physical movement of the ion exchange material through the various stirred tank reactors. In one embodiment, a network of stirred tank reactors may involve switching of flows of brine, washing fluid, and acid solutions through the various stirred tank reactors. In one embodiment, brine may into stirred tank reactors in continuous or batch mode. In one embodiment, brine may be mixed with ion exchange material in one or more reactors before exiting the system. In one embodiment, a network of stirred tank reactors may involve a brine circuit with counter-current exposure of ion exchange material to flows of brine. In one embodiment, a network of stirred tank reactors may involve a washing circuit with counter-current exposure of ion exchange material to flows of washing fluid. In one embodiment, a network of stirred tank reactors may involve an acid circuit with counter-current exposure of ion exchange material to flows of acid solution. In one embodiment, the washing fluid may be water, an aqueous solution, or a solution containing an anti-scalant.

In one embodiment of the stirred tank reactor, acid is added at the beginning of elution. In one embodiment of the stirred tank reactor, acid is added at the beginning of elution and again during elution. In one embodiment of the stirred tank reactor, an acid of lower concentration is added at the start of elution and additional acid of high concentration is added to continue elution.

An aspect described herein is a system for the extraction of lithium ions from a liquid resource, comprising: a) an ion exchange material; b) a tank comprising one or more compartments; and c) a mixing device, wherein the ion exchange material is used to extract lithium ions from the liquid resource.

In some embodiments, the ion exchange material is loaded in at least one of the one or more compartments. In some embodiments, the ion exchange material is fluidized or partially fluidized in at least one of the one or more compartments. In some embodiments, the ion exchange material occupies a fixed position in at least one of the one or more compartments. In some embodiments, the ion exchange material is mounted in at least one of the one or more compartments.

An aspect described herein is a system for the extraction of lithium ions from a liquid resource, comprising: a) a column comprising an ion exchange material; and b) a pH modulating setup for changing the pH of the liquid resource in the system, wherein the pH modulating setup is in fluid communication with the column, wherein the ion exchange material is used to extract lithium ions from the liquid resource.

Other Types of Systems

An aspect described herein is a system for the extraction of lithium ions from a liquid resource, comprising: a) a plurality of columns, wherein each of the plurality of columns comprises an ion exchange material; and b) a pH modulating setup for changing the pH of the liquid resource in the system, wherein the pH modulating setup is in fluid communication with each of the plurality of columns, wherein the ion exchange material is used to extract lithium ions from the liquid resource.

In some embodiments, the pH modulating setup comprises a plurality of tanks, wherein each of the plurality of tanks is immediately connected to one of the plurality of columns. In one embodiment, the pH modulating setup comprises a plurality of tanks, wherein each of the plurality of tanks is in immediate liquid communication with one of the plurality of columns. In some embodiments, two or more of the plurality of tanks connected to two or more of the plurality of columns forms at least one circuit. In some embodiments, two or more of the plurality of tanks connected to two or more of the plurality of columns forms at least two circuits. In some embodiments, three or more of the plurality of tanks connected to three or more of the plurality of columns forms at least two circuits. In some embodiments, three or more of the plurality of tanks connected to three or more of the plurality of columns forms at least three circuits.

In some embodiments, at least one circuit is a liquid resource circuit. In some embodiments, at least one circuit is a water washing circuit. In some embodiments, at least two circuits are water washing circuits. In some embodiments, at least one circuit is an acid solution circuit.

An aspect described herein is a system for the extraction of lithium ions from a liquid resource comprising an ion exchange material and a plurality of vessels, wherein each of the plurality of vessels is configured to transport the ion exchange material along the length of the vessel and the ion exchange material is used to extract lithium ions from the liquid resource. In some embodiments, at least one of the plurality of vessels comprises an acidic solution. In some embodiments, at least one of the plurality of vessels comprises the liquid resource. In some embodiments, each of the plurality of vessels is configured to transport the ion exchange material by a pipe system or an internal conveyer system.

An aspect described herein is a system for the extraction of lithium ions from a liquid resource comprising an ion exchange material and a plurality of columns, wherein each of the plurality of columns is configured to transport the ion exchange material along the length of the column and the ion exchange material is used to extract lithium ions from the liquid resource.

In some embodiments, at least one of the plurality of columns comprises an acidic solution. In some embodiments, at least one of the plurality of columns comprises the liquid resource. In some embodiments, each of the plurality of columns is configured to transport the ion exchange material by a pipe system or an internal conveyer system.

In some embodiments, the ion exchange material comprises ion exchange particles. In some embodiments, at least a portion of the ion exchange material is in the form of ion exchange particles. In some embodiments, the ion exchange particles are selected from uncoated ion exchange particles, coated ion exchange particles, and combinations thereof. In some embodiments, the ion exchange particles comprise uncoated ion exchange particles. In some embodiments, the ion exchange particles comprise coated ion exchange particles. In some embodiments, the ion exchange particles comprise a mixture of uncoated and coated ion exchange particles.

In some embodiments, the coated ion exchange particles comprise an ion exchange material and a coating material.

In some embodiments, the coating material of the coated ion exchange particles comprises a carbide, a nitride, an oxide, a phosphate, a fluoride, a polymer, carbon, a carbonaceous material, or combinations thereof. In some embodiments, the coating material of the coated ion exchange particles is selected from the group consisting of $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, and combinations thereof.

In some embodiments, the ion exchange material of the coated ion exchange particles comprises an oxide, a phosphate, an oxyfluoride, a fluorophosphate, or combinations thereof. In some embodiments, the ion exchange material of the coated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, and combinations thereof; wherein x is from 0.1-10; and y is from 0.1-10.

In some embodiments, the uncoated ion exchange particles comprise an ion exchange material. In some embodiments, the ion exchange material of the uncoated ion exchange particles comprises an oxide, a phosphate, an oxyfluoride, a fluorophosphate, or combinations thereof. In some embodiments, the ion exchange material of the uncoated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, and combinations thereof; wherein x is from 0.1-10; and y is from 0.1-10.

In some embodiments, the ion exchange material is porous. In some embodiments, the porous ion exchange material comprises a network of pores that allows liquids to move quickly from the surface of the porous ion exchange material to a plurality of ion exchange particles. In some embodiments, the porous ion exchange material comprises a network of pores that allows a liquid to move from the surface of the porous ion exchange material to a plurality of ion exchange particles. In some embodiments, the porous ion exchange material comprises a network of pores that allows a liquid to move quickly from the surface of the porous ion exchange material to a plurality of ion exchange particles. In some embodiments, the porous ion exchange material is porous ion exchange beads. In some embodiments, the porous ion exchange material is comprised of porous ion exchange beads.

In some embodiments of the systems described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments of the systems described herein, the liquid resource is a brine. In some embodiments of the systems described herein, the liquid resource comprises a natural brine, a synthetic brine, or a mixture of a natural and a synthetic brine. In some embodiments of the systems described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, or combinations thereof.

An aspect of the invention described herein is a system, wherein the column further comprises a plurality of injection ports, wherein the plurality of injection ports are used to increase the pH of the liquid resource in the system In one embodiment of the ion exchange system, the system is a mixed base system comprising an ion exchange column and a mixing chamber where base is mixed into the brine immediately prior to injection of the brine into the column.

In one embodiment of the ion exchange system, the system is a ported ion exchange column system with multiple ports for injection of aqueous base spaced at intervals along the direction of brine flow through the column. As brine flows through the column, there is a region of the column where the beads experience the greatest rate of lithium absorption, and this region moves through the column in the direction of brine flow. In the ported ion exchange column system, base is injected near that region to neutralize protons released by the ion exchange reaction. In regions of the columns where the beads have been saturated with lithium and the rate of release of protons has slowed, base injected is decreased or terminated to avoid formation of basic precipitates.

In one embodiment of the ion exchange system, the system has a moving bed of beads that moves in a direction opposite to the flow of brine and base is injected at one or more fixed points in the column in a region near where the ion exchange reaction occurs at a maximum rate in the column to neutralize the protons released from the ion exchange reaction. In one embodiment of the ion exchange system, the base added to the brine is optionally NaOH, KOH, $Mg(OH)_2$, $Ca(OH)_2$, CaO, $NH_3$, $Na_2SO_4$, $K_2SO_4$, $NaHSO_4$, $KHSO_4$, NaOCl, KOCl, $NaClO_4$, $KClO_4$, $NaH_2BO_4$, $Na_2HBO_4$, $Na_3BO_4$, $KH_2BO_4$, $K_2HBO_4$, $K_3BO_4$, $MgHBO_4$, $CaHBO_4$, $NaHCO_3$, $KHCO_3$, $NaCO_3$, $KCO_3$, $MgCO_3$, $CaCO_3$, $Na_2O$, $K_2O$, $Na_2CO_3$, $K_2CO_3$, $Na_3PO_4$, $Na_2HPO_4$, $NaH_2PO_4$, $K_3PO_4$, $K_2HPO_4$, $KH_2PO_4$, $CaHPO_4$, $MgHPO_4$, sodium acetate, potassium acetate, magnesium acetate, poly(vinylpyridine), poly(vinylamine), polyacrylonitrile, other bases, or combinations thereof. In one embodiment, the base is optionally added to the brine in its pure form or as an aqueous solution. In one embodiment, the base is optionally added in a gaseous state such as gaseous $NH_3$. In one embodiment, the base is optionally added to the brine in a steady stream, a variable stream, in steady aliquots, or in variable aliquots. In one embodiment, the base is optionally created in the brine by using an electrochemical cell to remove $H_2$ and $Cl_2$ gas, which is optionally combined in a separate system to create HCl acid to be used for eluting lithium from the system or for other purposes.

In some embodiments, a solid base is mixed with a liquid resource to create a basic solution. In some embodiments, a solid base is mixed with a liquid resource to create a basic solution, and the resulting basic solution is added to a second volume of a liquid resource to increase the pH of the second volume of the liquid resource. In some embodiments, solid base is mixed with a liquid resource to create a basic solution, wherein the resulting basic solution is used to adjust or control the pH of a second solution. In some embodiments, a solid base is mixed with a liquid resource to create a basic slurry. In some embodiments, a solid base is mixed with a liquid resource to create a basic slurry, and the resulting basic slurry is added to a second volume of a liquid resource to increase the pH of the second volume of the liquid resource. In some embodiments, solid base is mixed with a liquid resource to create a basic slurry, wherein the resulting basic slurry is used to adjust or control the pH of a second solution. In some embodiments, base may be added to a liquid resource as a mixture or slurry of base and liquid resource.

In one embodiment of the ion exchange system, the brine flows through a pH control column containing solid sacrificial base particles such as NaOH, CaO, or $Ca(OH)_2$, which dissolve into the brine and raise the pH of the brine. In one embodiment of the ion exchange system, the brine flows through a pH control column containing immobilized regeneratable OH-containing ion exchange resins which react with hydrogen ions, or regeneratable base species such as immobilized polypyridine, which conjugate HCl, thereby neutralizing the acidified brine. When the ion exchange resin has been depleted of its OH groups or is saturated with HCl, it is optionally regenerated with a base such as NaOH.

In one embodiment of the ion exchange system, pH meters are optionally installed in tanks, pipes, column, and other components of the system to monitor pH and control the rates and amounts of base addition at various locations throughout the system.

In one embodiment of the ion exchange system, the columns, tanks, pipes, and other components of the system are optionally constructed using plastic, metal with a plastic lining, or other materials that are resistant to corrosion by brine or acid.

In one embodiment of the ion exchange system, the ion exchange columns are optionally washed with water that is mildly acidic, optionally including a buffer, to remove any basic precipitates from the column prior to acid elution.

After the ion exchange column is saturated or nearly saturated with lithium, the lithium is flushed out of the ion exchange column using acid. The acid is optionally flowed through the column one or more times to elute the lithium. In one embodiment, the acid is optionally flowed through the ion exchange column using a recirculating batch system comprised of the ion exchange column connected to a tank. In one embodiment, the tank used for acid flows is optionally the same tank used for the brine flows. In a further embodiment, the tank used for acid flows is optionally a different tank than the one used for brine flows. In a further embodiment, the acid is distributed at the top of the ion exchange column and allowed to percolate through and immediately recirculated into the column with no extra tank. In an embodiment, acid addition optionally occurs without a tank used for acid flows.

In one embodiment of the ion exchange system, the column is optionally washed with water after the brine and/or acid steps, and the effluent water from washing is optionally treated using pH neutralization and reverse osmosis to yield process water.

In one embodiment of the ion exchange system, the ion exchange column is optionally shaped like a cylinder, a rectangle, or another shape. In one embodiment, the ion exchange column optionally has a cylinder shape with a height that is greater or less than its diameter. In one embodiment, the ion exchange column optionally has a cylinder shape with a height that is less than 10 cm, less than 1 meter, or less than 10 meters. In one embodiment, the ion exchange column optionally has a cylinder shape with a diameter that is less than 10 cm, less than 1 meter, or less than 10 meters.

In one embodiment of the ion exchange system, the system is optionally resupplied with fresh ion exchange beads by swapping out an ion exchange column with a new column loaded with fresh ion exchange beads. In one embodiment of the ion exchange system, the system is optionally resupplied with fresh ion exchange beads by removing the beads from the column and loading new beads into the column. In one embodiment of the ion exchange system, new beads are optionally supplied to all columns in the system simultaneously. In one embodiment of the ion exchange system, new beads are optionally supplied to one or more columns at a time. In one embodiment of the ion exchange system, new beads are optionally supplied to one or more columns without interruption to other columns that optionally continue operating.

In one embodiment of the ion exchange system, brine pumping optionally continues until the ion exchange beads approach a point of lithium saturation over a period of time that is optionally less than about 1 hours, less than about 2 hours, less than about 4 hours, less than about 8 hours, less than about 24 hours, less than about 48 hours, or less than about one week. In one embodiment of the ion exchange system, brine pumping optionally continues until the ion exchange beads approach a point of lithium saturation over a period of time that is optionally greater than about one week. In certain embodiments of the ion exchange system, brine pumping optionally continues until the ion exchange beads approach a point of lithium saturation over a period of time that is optionally between 30 minutes and 24 hours. In one embodiment of the ion exchange system, acid pumping optionally continues until the ion exchange beads approach a point of hydrogen saturation over a period of time that is optionally less than about 1 hours, less than about 2 hours, less than about 4 hours, less than about 8 hours, less than about 24 hours, or less than about 48 hours. In one embodiment of the ion exchange system, brine pumping optionally continues until the ion exchange beads approach a point of hydrogen saturation over a period of time that is optionally greater than about one 48 hours. In certain embodiments of the ion exchange system, brine pumping optionally continues until the ion exchange beads approach a point of hydrogen saturation over a period of time that is optionally between 30 minutes and 24 hours.

Ion Exchange Material

An aspect of the invention described herein is a system wherein the ion exchange material comprises a plurality of ion exchange particles. In an embodiment, the plurality of ion exchange particles in the ion exchange material is selected from uncoated ion exchange particles, coated ion exchange particles and combinations thereof. In an embodiment, the ion exchange material is a porous ion exchange material. In an embodiment, the porous ion exchange material comprises a network of pores that allows liquids to move quickly from the surface of the porous ion exchange material to the plurality of ion exchange particles. In an embodiment, the ion exchange material is in the form of porous ion exchange beads. In an embodiment, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

Ion exchange materials are typically small particles, which together constitute a fine powder. In some embodiments small particle size minimizes the diffusion distance that lithium must travel into the core of the ion exchange particles. In some cases, these particles are optionally coated with protective surface coatings to minimize dissolution of the ion exchange materials while allowing efficient transfer of lithium and hydrogen to and from the particles.

In an embodiment, the coated ion exchange particles are comprised of an ion exchange material and a coating material wherein the ion exchange material comprises $Li_4Mn_5O_{12}$, $Li_{1.6}Mn_{1.6}O_4$, $Li_2MO_3$ (M=Ti, Mn, Sn), $LiFePO_4$, solid solutions thereof, or combinations thereof and the coating material comprises $TiO_2$, $ZrO_2$, $MoO_2$, $Li_2TiO_3$, $Li_2ZrO_3$, $LiNbO_3$, $AlF_3$, $SiC$, $Si_3N_4$, graphitic carbon, amorphous carbon, diamond-like carbon, or combinations thereof. The coated ion exchange particles have an average diameter less than about 100 nm, less than about 1,000 nm, or less than about 10,000 nm, and the coating thickness is less than about 1 nm, less than about 10 nm, or less than about 100 nm. The particles are created by first synthesizing the ion exchange material using a method such as hydrothermal, solid state, or microwave. The coating material is then deposited on the surface of the ion exchange material using a method such as chemical vapor deposition, hydrothermal, solvothermal, sol-gel, precipitation, or microwave. The coated ion exchange particles are treated with an acid solution prepared with hydrochloric acid, sulfuric acid, nitric acid, or combinations thereof wherein the concentration of the acid solution is greater than about 0.1 M, greater than about 1.0 M, greater than about 5 M, greater than about 10 M, or combinations thereof. During acid treatment, the particles absorb hydrogen while releasing lithium. The ion exchange material is converted to a hydrated state with a hydrogen-rich composition. The coating material allows diffusion of hydrogen and lithium respectively to and from the ion exchange material while providing a protective barrier that limits dissolution of the ion exchange material. After treatment in acid, the hydrated coated ion exchange particles are treated with a liquid resource wherein the liquid resource is a natural brine, a dissolved salt flat, a concentrated brine, a processed brine, a synthetic brine, liquid from an ion exchange process, liquid from a solvent extraction process, leachate from minerals, leachate from clays, leachate from recycled products, leachate from recycled materials, or combinations thereof. The coated ion exchange particles absorb lithium while releasing hydrogen. The lithium salt solution is then collected. The coated ion exchange particles are capable then perform the ion exchange reaction repeatedly over a number of cycles greater than about 10 cycles, greater than about 30 cycles, greater than about 100 cycles, or greater than about 300 cycles.

One major challenge for lithium extraction using inorganic ion exchange particles is the loading of the particles into an ion exchange column in such a way that brine and acid are optionally pumped efficiently through the column with minimal clogging. The materials are optionally formed into beads, and the beads are optionally loaded into the column. This bead loading creates void spaces between the beads, and these void spaces facilitate pumping through the column. The beads hold the ion exchange particles in place and prevent free movement of the particles throughout the column. When the materials are formed into beads, the penetration of brine and acid solutions into the beads become slow and challenging. A slow rate of convection and diffusion of the acid and brine solutions into the bead slows the kinetics of lithium absorption and release. Such slow kinetics can create problems for column operation. Slow kinetics can require slow pumping rates through the column. Slow kinetics can also lead to low lithium recovery from the brine and inefficient use of acid to elute the lithium.

Figure 8:
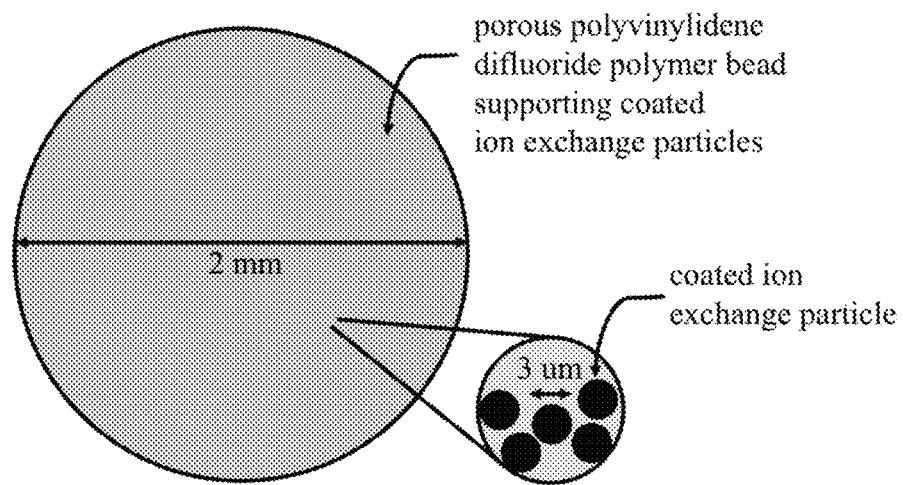
FIG. 8 illustrates a porous ion exchange bead.

In some embodiments, the ion exchange beads are porous ion exchange beads with networks of pores that facilitate the transport into the beads of solutions that are pumped through an ion exchange column. Pore networks are optionally strategically controlled to provide fast and distributed access for the brine and acid solutions to penetrate into the bead and deliver lithium and hydrogen to the ion exchange particles. One example of a porous ion exchange bead is shown in FIG. 8.

In some embodiments, the ion exchange beads are formed by mixing ion exchange particles, a matrix material, and a filler material. These components are mixed and formed into a bead. Then, the filler material is removed from the bead to leave behind pores. The filler material is dispersed in the bead in such a way to leave behind a pore structure that enables transport of lithium and hydrogen with fast kinetics. This method optionally involves multiple ion exchange materials, multiple polymer materials, and multiple filler materials.

Figure 7:
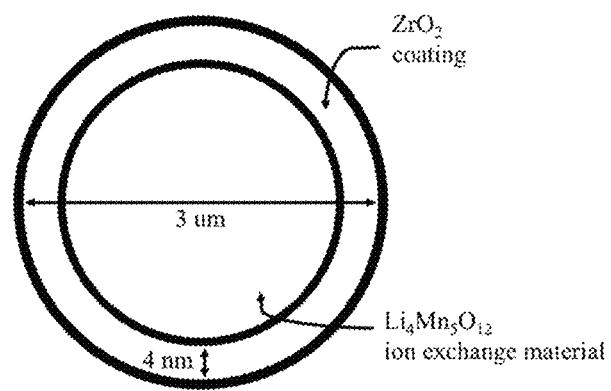
FIG. 7 illustrates a coated ion exchange particle.

Another major challenge for lithium extraction using inorganic ion exchange materials is dissolution and degradation of the materials, especially during lithium elution in acid but also during lithium uptake in liquid resources. To yield a concentrated lithium solution from the ion exchange process, it is desirable to use a concentrated acid solution to elute the lithium. However, concentrated acid solutions dissolve and degrade inorganic ion exchange materials, which decrease the performance and lifespan of the materials. Therefore, the porous ion exchange beads optionally contain coated ion exchange particle for lithium extraction that are comprised of an ion exchange material and a coating material protecting the particle surface. The coating protects the ion exchange material from dissolution and degradation during lithium elution in acid, during lithium uptake from a liquid resource, and during other aspects of an ion exchange process. This coated particle enables the use of concentrated acids in the ion exchange process to yield concentrated lithium solutions. One example of a coated ion exchange particle is shown in FIG. 7.

In this invention, the ion exchange material is selected for high lithium absorption capacity, high selectivity for lithium in a liquid resource relative to other ions such as sodium and magnesium, strong lithium uptake in liquid resources including those with low concentrations of lithium, facile elution of lithium with a small excess of acid, and fast ionic diffusion. A coating material is optionally selected to protect the particle from dissolution and chemical degradation during lithium recovery in acid and also during lithium uptake in various liquid resources. A coating material optionally is also selected to facilitate diffusion of lithium and hydrogen between the particles and the liquid resources, to enable adherence of the particles to a structural support, and to suppress structural and mechanical degradation of the particles.

When the porous ion exchange beads are used in an ion exchange column, the liquid resource containing lithium is pumped through the ion exchange column so that the ion exchange particles absorb lithium from the liquid resource while releasing hydrogen. After the beads have absorbed lithium, an acid solution is pumped through the column so that the particles release lithium into the acid solution while absorbing hydrogen. The column is optionally operated in co-flow mode with the liquid resource and acid solution alternately flowing through the column in the same direction, or the column is optionally operated in counter-flow mode with a liquid resource and acid solution alternately flowing through the column in opposite directions. Between flows of the liquid resource and the acid solution, the column is optionally treated or washed with water or other solutions for purposes such as adjusting pH in the column or removing potential contaminants. The beads optionally form a fixed or moving bed, and the moving bed optionally moves in counter-current to the brine and acid flows. The beads are optionally moved between multiple columns with moving beds where different columns are used for brine, acid, water, or other flows. Before or after the liquid resource flows through the column, the pH of the liquid is optionally adjusted with NaOH or other chemicals to facilitate the ion exchange reaction as well as handling or disposal of the spent liquid resource. Before or after the liquid resource flows through the column, the liquid resource is optionally subjected to other processes including other ion exchange processes, solvent extraction, evaporation, chemical treatment, or precipitation to remove lithium, to remove other chemical species, or to otherwise treat the brine.

When the ion exchange particles are treated with acid, a lithium solution is produced. This lithium solution is optionally further processed to produce lithium chemicals. These lithium chemicals are optionally supplied for an industrial application. In some embodiments, an ion exchange material is selected from the following list: an oxide, a phosphate, an oxyfluoride, a fluorophosphate, or combinations thereof. In some embodiments, an ion exchange material is selected from the following list: $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, or combinations thereof. In a further aspect, an ion exchange material comprises $LiFePO_4$, $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, solid solutions thereof, or combinations thereof.

In a further aspect described herein, the coating material allows diffusion to and from the ion exchange material. In particular, the coating material facilitates diffusion of lithium and hydrogen between the particles and the liquid resources, enables adherence of the particles to a structural support, and suppresses structural and mechanical degradation of the particles. In a further aspect described herein, the coating material comprises a carbide, a nitride, an oxide, a phosphate, a fluoride, a polymer, carbon, a carbonaceous material, or combinations thereof. In a further aspect, the coating material comprises polyvinylidene difluoride, polyvinyl chloride, a fluoro-polymer, a chloro-polymer, or a fluoro-chloro-polymer. In a further aspect, a coating material comprises $Nb_2O_5$, $Ta_2O_5$, $MoO_2$, $TiO_2$, $ZrO_2$, $SnO_2$, $SiO_2$, $Li_2O$, $Li_2TiO_3$, $Li_2ZrO_3$, $Li_2MoO_3$, $LiNbO_3$, $LiTaO_3$, $Li_2SiO_3$, $Li_2Si_2O_5$, $Li_2MnO_3$, $ZrSiO_4$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In a further aspect, a coating material comprises $TiO_2$, $ZrO_2$, $SiO_2$, $Li_2TiO_3$, $Li_2ZrO_3$, $Li_2MnO_3$, $ZrSiO_4$, or $LiNbO_3$. In a further aspect, a coating material comprises a chloro-polymer, a fluoro-polymer, a chloro-fluoro-polymer, a hydrophilic polymer, a hydrophobic polymer, co-polymers thereof, mixtures thereof, or combinations thereof. In a further aspect, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, a coating material comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In a further aspect, a coating is deposited onto an ion exchange particle by dry mixing, mixing in solvent, emulsion, extrusion, bubbling one solvent into another, casting, heating, evaporating, vacuum evaporation, spray drying, vapor deposition, chemical vapor deposition, microwaving, hydrothermal synthesis, polymerization, co-polymerization, cross-linking, irradiation, catalysis, foaming, other deposition methods, or combinations thereof. In a further aspect, a coating is deposited using a solvent comprising N-methyl-2-pyrrolidone, dimethyl sulfoxide, tetrahydrofuran, dimethylformamide, dimethylacetamide, methyl ethyl ketone, ethanol, acetone, other solvents, or combinations thereof. In a further aspect, a coating is deposited using a solvent comprising N-methyl-2-pyrrolidone, dimethyl sulfoxide, tetrahydrofuran, dimethylformamide, dimethylacetamide, methyl ethyl ketone, ethanol, acetone, or combinations thereof.

In a further aspect described herein, the coated ion exchange particles have an average diameter less than about 10 nm, less than about 100 nm, less than about 1,000 nm, less than about 10,000 nm, or less than about 100,000 nm. In a further aspect, the coated ion exchange particles have an average size less than about 100 nm, less than about 1,000 nm, or less than about 10,000 nm. In a further aspect, the coated ion exchange particles are optionally secondary particles comprised of smaller primary particles that have an average diameter less than about 10 nm, less than about 100 nm, less than about 1,000 nm, less than about 10,000 nm, or less than about 100,000 nm. In a further aspect, the coating optionally coats the primary ion exchange particles. In a further aspect, the coating optionally coats the secondary ion exchange particles. In a further aspect, the coating optionally coats the secondary ion exchange particles. In a further aspect, the coating optionally coats both the primary ion exchange particles and the secondary ion exchange particles. In a further aspect, the primary ion exchange particles optionally have a first coating and the secondary ion exchange particles optionally have a second coating that is optionally identical, similar, or different in composition to the first coating.

In some embodiments described herein, the coating material has a thickness less than about 1 nm, less than about 10 nm, less than about 100 nm, less than about 1,000 nm, or less than about 10,000 nm. In further embodiments, the coating material has a thickness less than about 5 nm, less than about 50 nm, or less than about 500 nm. In some embodiments, the ion exchange particles have a coating material with a thickness selected from the following list: less than 1 nm, less than 10 nm, less than 100 nm, or less than 1,000 nm. In some embodiments, the coating material has a thickness selected from the following list: less than 1 nm, less than 10 nm, or less than 100 nm. In certain embodiments, the coating material has a thickness between about 0.5 nm to about 1000 nm. In some embodiments, the coating material has a thickness between about 1 nm to about 100 nm.

In a further aspect described herein, the ion exchange material and the coating material form one or more concentration gradients where the chemical composition of the particle ranges between two or more compositions. In a further aspect, the chemical composition optionally varies between the ion exchange materials and the coating in a manner that is continuous, discontinuous, or continuous and discontinuous in different regions of the particle. In a further aspect, the ion exchange materials and the coating materials form a concentration gradient that extends over a thickness less than about 1 nm, less than about 10 nm, less than about 100 nm, less than about 1,000 nm, less than about 10,000 nm, or less than about 100,000 nm. In a further aspect, the ion exchange materials and the coating materials form a concentration gradient that extends over a thickness of about 1 nm to about 1,000 nm.

In a further aspect described herein, the ion exchange material is synthesized by a method such as hydrothermal, solvothermal, sol-gel, solid state, molten salt flux, ion exchange, microwave, ball milling, chemical precipitation, co-precipitation, vapor deposition, or combinations thereof. In a further aspect, the ion exchange material is synthesized by a method such as chemical precipitation, hydrothermal, solid state, or combinations thereof.

In a further aspect described herein, the coating material is deposited by a method such as chemical vapor deposition, atomic layer deposition, physical vapor deposition, hydrothermal, solvothermal, sol-gel, solid state, molten salt flux, ion exchange, microwave, chemical precipitation, co-precipitation, ball milling, pyrolysis, or combinations thereof. In a further aspect, the coating material is deposited by a method such as sol-gel, chemical precipitation, or combinations thereof. In a further aspect, the coating materials is deposited in a reactor that is optionally a batch tank reactor, a continuous tank reactor, a batch furnace, a continuous furnace, a tube furnace, a rotary tube furnace, or combinations thereof.

In some embodiments, a coating material is deposited with physical characteristics selected from the following list: crystalline, amorphous, full coverage, partial coverage, uniform, non-uniform, or combinations thereof.

In some embodiments, multiple coatings are optionally deposited on the ion exchange material in an arrangement selected from the following list: concentric, patchwork, or combinations thereof.

In some embodiments, the matrix is selected from the following list: a polymer, an oxide, a phosphate, or combinations thereof. In some embodiments, a structural support is selected from the following list: polyvinyl fluoride, polyvinylidene fluoride, polyvinyl chloride, polyvinylidene chloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, sulfonated polymer, carboxylated polymer, Nafion, copolymers thereof, and combinations thereof. In some embodiments, a structural support is selected from the following list: polyvinylidene difluoride, polyvinyl chloride, sulfonated polytetrofluoroethylene, polystyrene, polydivinylbenzene, copolymers thereof, or combinations thereof. In some embodiments, a structural support is selected from the following list: titanium dioxide, zirconium dioxide, silicon dioxide, solid solutions thereof, or combinations thereof. In some embodiments, the matrix material is selected for thermal resistance, acid resistance, and/or other chemical resistance.

In some embodiments, the porous bead is formed by mixing the ion exchange particles, the matrix material, and the filler material together at once. In some embodiments, the porous bead is formed by first mixing the ion exchange particles and the matrix material, and then mixing with the filler material. In some embodiments, the porous bead is formed by first mixing the ion exchange particles and the filler material, and then mixing with the matrix material. In some embodiments, the porous bead is formed by first mixing the matrix material and the filler material, and then mixing with the ion exchange particles.

In some embodiments, the porous bead is formed by mixing the ion exchange particles, the matrix material, and/or the filler material with a solvent that dissolves once or more of the components. In some embodiments, the porous bead is formed by mixing the ion exchange particles, the matrix material, and/or the filler material as dry powders in a mixer or ball mill. In some embodiments, the porous bead is formed by mixing the ion exchange particles, the matrix material, and/or the filler material in a spray drier.

In some embodiments, the matrix material is a polymer that is dissolved and mixed with the ion exchange particles and/or filler material using a solvent from the following list: n-methyl-2-pyrrolidone, dimethyl sulfoxide, tetrahydrofuran, dimethylformamide, dimethylacetamide, methyl ethyl ketone, or combinations thereof. In some embodiments, the filler material is a salt that is dissolved and mixed with the ion exchange particles and/or matrix material using a solvent from the following list: water, ethanol, iso-propyl alcohol, acetone, or combinations thereof.

In some embodiments, the filler material is a salt that is dissolved out of the bead to form pores using a solution selected from the following list: water, ethanol, iso-propyl alcohol, a surfactant mixture, an acid a base, or combinations thereof. In some embodiments, the filler material is a material that thermally decomposes to form a gas at high temperature so that the gas can leave the bead to form pores, where the gas is selected from the following list: water vapor, oxygen, nitrogen, chlorine, carbon dioxide, nitrogen oxides, organic vapors, or combinations thereof.

In some embodiments, the porous ion exchange bead is formed from dry powder using a mechanical press, a pellet press, a tablet press, a pill press, a rotary press, or combinations thereof. In some embodiments, the porous ion exchange bead is formed from a solvent slurry by dripping the slurry into a different liquid solution. The solvent slurry is optionally formed using a solvent of n-methyl-2-pyrrolidone, dimethyl sulfoxide, tetrahydrofuran, dimethylformamide, dimethylacetamide, methyl ethyl ketone, or combinations thereof. The different liquid solution is optionally formed using water, ethanol, iso-propyl alcohol, acetone, or combinations thereof.

In some embodiments, the porous ion exchange bead is approximately spherical with an average diameter selected from the following list: less than 10 um, less than 100 um, less than 1 mm, less than 1 cm, or less than 10 cm. In some embodiments, the porous ion exchange bead is approximately spherical with an average diameter selected from the following list: less than 200 um, less than 2 mm, or less than 20 mm. In certain embodiments, the porous ion exchange bead is approximately spherical with an average diameter between 10 um and 2 mm.

In some embodiments, the porous ion exchange bead is tablet-shaped with a diameter of less than 1 mm, less than 2 mm, less than 4 mm, less than 8 mm, or less than 20 mm and with a height of less than 1 mm, less than 2 mm, less than 4 mm, less than 8 mm, or less than 20 mm. In certain embodiments, the porous ion exchange bead is tablet-shaped with a diameter between 500 um and 10 mm.

In some embodiments, the porous ion exchange bead is embedded in a support structure, which is optionally a membrane, a spiral-wound membrane, a hollow fiber membrane, or a mesh. In some embodiments, the porous ion exchange bead is embedded on a support structure comprised of a polymer, a ceramic, or combinations thereof. In some embodiments, the porous ion exchange bead is loaded directly into an ion exchange column with no additional support structure.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof. In some embodiments, the liquid resource is optionally pre-treated prior to entering the ion exchange reactor to remove suspended solids, hydrocarbons, or organic molecules. In some embodiments, the liquid resource is optionally enter the ion exchange reactor without any pre-treatment following from its source.

In some embodiments, the liquid resource is selected with a lithium concentration selected from the following list: less than 100,000 ppm, less than 10,000 ppm, less than 1,000 ppm, less than 100 ppm, less than 10 ppm, or combinations thereof. In some embodiments, a liquid resource is selected with a lithium concentration selected from the following list: less than 5,000 ppm, less than 500 ppm, less than 50 ppm, or combinations thereof.

Device for Extracting Lithium from a Liquid Resource

In one aspect described herein, is a device for lithium extraction from a liquid resource comprising one or more vessels independently configured to simultaneously accommodate porous ion exchange beads moving in one direction and alternately acid, brine, and optionally other solutions moving in the net opposite direction.

In one aspect described herein, there is a device for lithium extraction from a liquid resource comprising a stirred rank reactor, an ion exchange material, and a pH modulating setup for increasing the pH of the liquid resource in the stirred tank reactor.

In one aspect described herein, is a device for lithium extraction from a liquid resource comprising a stirred rank reactor, an ion exchange material, a pH modulating setup for increasing the pH of the liquid resource in the stirred tank reactor, and a compartment for containing the ion exchange material in the stirred tank reactor while allowing for removal of liquid resource, washing fluid, and acid solutions from the stirred tank reactor.

In one embodiment, at least one of the one or more vessels are fitted with a conveyer system suitably outfitted to move porous ion exchange beads upward and simultaneously allow a net flow of acid, brine, and optionally other solutions, downward. In one embodiment, the conveyor system comprises fins with holes. In one embodiment, wherein the fins slide upward over a sliding surface that is fixed in place. In one embodiment, the fins slide upward over a sliding surface that is fixed in place. In one embodiment, all of the one or more vessels are fitted with a conveyor system suitably outfitted to move porous ion exchange beads upward and simultaneously allow a net flow of acid, brine, and optionally other solutions, downward. In one embodiment, there are an even number of vessels. In one embodiment, there are an odd number of vessels. In one embodiment, the vessels are columns.

In some embodiments, structures with holes are used to move the ion exchange material through one or more vessels. In some embodiments, the holes in the structures may be less than 10 microns, less than 100 microns, less than 1,000 microns, or less than 10,000 microns. In some embodiments, the structures may be attached to a conveyer system. In some embodiments, the structures may comprise a porous compartment, porous partition, or other porous structure. In some embodiments, the structures may contain a bed of fixed or fluidized ion exchange material. In some embodiments, the structures may contain ion exchange material while allowing brine, aqueous solution, or acid solution to pass through the structures.

In one embodiment, the porous ion exchange beads comprise ion exchange particles that reversibly exchange lithium and hydrogen and a structural matrix material and having a pore network. In one embodiment, the liquid resource comprises a natural brine, a dissolve salt flat, a concentrated brine, a processed brine, a filtered brine, a liquid from an ion exchange process, a liquid from a solvent extraction process, a synthetic brine, leachate from ores, leachate from minerals, leachate from clays, leachate from recycled products, leachate from recycled materials, or combinations thereof.

Methods of Modulating pH for the Extraction of Lithium

An aspect of the invention described herein is a method of extracting lithium ions from a liquid resource, comprising: flowing the liquid resource through the column of the system described above to produce a lithiated ion exchange material; and treating the resulting lithiated ion exchange material with an acid solution to produce a salt solution comprising lithium ions.

An aspect of the invention described herein is a method of extracting lithium ions from a liquid resource, comprising: flowing the liquid resource through the plurality of columns of the system described above to produce a lithiated ion exchange material; and treating the resulting lithiated ion exchange material with an acid solution to produce a salt solution comprising lithium ions.

An aspect of the invention described herein is a method of extracting lithium ions from a liquid resource, comprising: flowing the liquid resource through the tank of the system described above to produce a lithiated ion exchange material; and treating the resulting lithiated ion exchange material with an acid solution to produce a salt solution comprising lithium ions.

An aspect of the invention described herein is a method of extracting lithium ions from a liquid resource, comprising: flowing the liquid resource through the column of the system described above to produce a lithiated ion exchange material; and treating the resulting lithiated ion exchange material with an acid solution to produce a salt solution comprising lithium ions.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof. In some embodiments, the liquid resource is optionally pre-treated prior to entering the ion exchange reactor to remove suspended solids, hydrocarbons, or organic molecules. In some embodiments, the liquid resource is optionally entered the ion exchange reactor without any pre-treatment following from its source.

In an embodiment, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

In some embodiments, the liquid resource is selected with a lithium concentration selected from the following list: less than 100,000 ppm, less than 10,000 ppm, less than 1,000 ppm, less than 100 ppm, less than 10 ppm, or combinations thereof. In some embodiments, a liquid resource is selected with a lithium concentration selected from the following list: less than 5,000 ppm, less than 500 ppm, less than 50 ppm, or combinations thereof.

In some embodiments, the acid used for recovering lithium from the ion exchange reactor is selected from the following list: hydrochloric acid, sulfuric acid, phosphoric acid, hydrobromic acid, chloric acid, perchloric acid, nitric acid, formic acid, acetic acid, or combinations thereof. In some embodiments, the acid used for recovering lithium from the porous ion exchange beads is selected from the following list: hydrochloric acid, sulfuric acid, nitric acid, or combinations thereof.

In an embodiment, the acid solution comprises hydrochloric acid, sulfuric acid, phosphoric acid, hydrobromic acid, chloric acid, perchloric acid, nitric acid, formic acid, acetic acid, or combinations thereof.

In some embodiments, the acid used for recovering lithium from the ion exchange system has a concentration selected from the following list: less than 0.1 M, less than 1.0 M, less than 5 M, less than 10 M, or combinations thereof. In some embodiments, the acid used for recovering lithium from the porous ion exchange beads has a concentration greater than 10 M.

In an embodiment, acids with distinct concentrations are used during the elution process. In an embodiment, acid with a lower concentration is first added to elute lithium from the ion exchange material and then additional acid of a greater concentration is added to elute more lithium into the solution and increase the concentration of lithium in the eluate.

In some embodiments, the ion exchange beads perform the ion exchange reaction repeatedly while maintaining adequate lithium uptake capacity over a number of cycles selected from the following list: greater than 10 cycles, greater than 30 cycles, greater than 100 cycles, greater than 300 cycles, or greater than 1,000 cycles. In some embodiments, the porous ion exchange beads perform the ion exchange reaction repeatedly over a number of cycles selected from the following list: greater than 50 cycles, greater than 100 cycles, or greater than 200 cycles. In some embodiments, adequate lithium uptake capacity is optionally defined as a percentage of initial uptake capacity selected from the following list: greater than 95%, greater than 90%, greater than 80%, greater than 60%, or greater than 20%. In some embodiments, adequate lithium uptake capacity is optionally defined as a percentage of initial uptake capacity such as less than 20%.

In some embodiments, the concentrated lithium solution that is yielded from the ion exchange reactor is further processed into lithium raw materials using methods selected from the following list: solvent extraction, ion exchange, chemical precipitation, electrodialysis, electrowinning, electrolysis, evaporation with direct solar energy, evaporation with concentrated solar energy, evaporation with a heat transfer medium heated by concentrated solar energy, evaporation with heat from a geothermal brine, evaporation with heat from combustion, pH neutralization, or combinations thereof. In some embodiments, the concentrated lithium solution that is yielded from the ion exchange reactor is concentrated using reverse osmosis or membrane technologies.

In some embodiments, the concentrated lithium solution that is yielded from the ion exchange reactor is further processed into lithium chemicals selected from the following list: lithium chloride, lithium carbonate, lithium hydroxide, lithium metal, lithium metal oxide, lithium metal phosphate, lithium sulfide, or combinations thereof. In some embodiments, the concentrated lithium solution that is yielded from the porous ion exchange beads is further processed into lithium chemicals that are solid, liquid, hydrated, or anhydrous.

In some embodiments, the lithium chemicals produced using the ion exchange reactor are used in an industrial application selected from the following list: lithium batteries, metal alloys, glass, grease, or combinations thereof. In some embodiments, the lithium chemicals produced using the coated ion exchange particles are used in an application selected from the following list: lithium batteries, lithium-ion batteries, lithium sulfur batteries, lithium solid-state batteries, and combinations thereof.

In some embodiments, the ion exchange materials are synthesized in a lithiated state with a sublattice fully or partly occupied by lithium. In some embodiments, the ion exchange materials are synthesized in a hydrated state with a sublattice fully or partly occupied by hydrogen.

In some embodiments, the ion exchange material extracts lithium ions from a liquid resource. During the extraction of lithium ions from a liquid resource by the ion exchange material, the pH of the liquid resource optionally decreases. Increasing the pH of the liquid resource in the system by using a pH modulating setup maintains the pH in a range that is suitable for lithium ion uptake by the ion exchange material. In an embodiment, the pH modulating setup comprises measuring the pH of the system and adjusting the pH of the system to an ideal pH range for lithium extraction. In an embodiment, for ion exchange material to absorb lithium from brine, an ideal pH range for the brine is optionally 6 to 9, a preferred pH range is optionally 4 to 9, and an acceptable pH range is optionally 2 to 9. In an embodiment, the pH modulating setup comprises measuring the pH of the system and wherein the pH of the system is less than 6, less than 4, or less than 2, the pH of the system is adjusted to a pH of 2 to 9, a pH of 4 to 9, or a pH of 6 to 9.

Another aspect described herein is a method of extracting lithium ions from a liquid resource, comprising: a) flowing the liquid resource into a system comprising a tank to produce a lithiated ion exchange material, wherein the tank further comprises (i) one or more compartments, (ii) an ion exchange material, (iii) a mixing device, and (iv) a pH modulating setup for changing the pH of the liquid resource in the system; and b) treating the lithiated ion exchange material from a) with an acid solution to produce a hydrogen-rich ion exchange material and a salt solution comprising lithium ions.

In some embodiments, the method further comprises, prior to b), washing the lithiated ion exchange material with an aqueous solution. In some embodiments, the method further comprises, subsequent to b), washing the hydrogen-rich ion exchange material with an aqueous solution. In some embodiments, the aqueous solution is water.

In some embodiments, the method further comprises, prior to b), flowing the lithiated ion exchange material into a washing system. In some embodiments, the method further comprises, prior to b), transferring a suspension comprising the lithiated ion exchange material. In some embodiments, the method further comprises, prior to b), flowing the lithiated ion exchange material into a washing system and washing the lithiated ion exchange material with a solution. In some embodiments, the method further comprises, prior to b), flowing the lithiated ion exchange material into a washing system and washing the lithiated ion exchange material with a solution comprising water. In some embodiments, the method further comprises, prior to b), flowing the lithiated ion exchange material into a washing system and washing the lithiated ion exchange material with an aqueous solution. In some embodiments, the lithiated ion exchange material is washed with an aqueous solution.

In some embodiments, the method further comprises, prior to b), flowing the lithiated ion exchange material into a stripping system. In some embodiments, the method further comprises, prior to b), flowing the lithiated ion exchange material into a stripping system and stripping the lithiated ion exchange material. In some embodiments, the method further comprises, prior to b), flowing the lithiated ion exchange material into a stripping system and stripping volatile components from the lithiated ion exchange material. In some embodiments, the method further comprises, prior to b), flowing the lithiated ion exchange material into a stripping system and stripping volatile components comprising water from the lithiated ion exchange material.

In some embodiments, the pH modulating setup comprises a pH measuring device and an inlet for adding base to the tank. In some embodiments, the pH measuring device is a pH probe. In some embodiments, the inlet is a pipe. In some embodiments, the inlet is an injection port.

In some embodiments, the method further comprises, during a), measuring a change in pH of the liquid resource using the pH modulating setup. In some embodiments, the measured change in pH triggers adding a base to maintain lithium uptake. In some embodiments, a change in pH to below a pH value of about 2 to about 9 triggers the addition of a base to maintain lithium uptake. In some embodiments, a change in pH to below a pH value of about 2, of about 3, of about 4, of about 5, of about 6, of about 7, of about 8, or of about 9 triggers the addition of a base to maintain lithium uptake. In some embodiments, a change in pH to below a pH of about 2 to about 4, of about 3 to about 5, of about 4 to about 6, of about 5 to about 7, of about 6 to about 8, or of about 7 to about 9 triggers the addition of a base to maintain lithium uptake. In some embodiments, base is added to the liquid resource to maintain the pH of the liquid resource in a range of about 2-3, 3-4, 4-5, 5-6, 6-7, 7-8, or 8-9. In some embodiments, base is added to the liquid resource to maintain the pH of the liquid resource in a range of about 4-5, 5-6, 6-7, or 7-8. In some embodiments, base is added to the liquid resource to maintain the pH of the liquid resource in a range of about 4.0-4.5, 4.5-5.0, 5.0-5.5, 5.5-6.0, 6.0-6.5, 6.5-7.0, 7.0-7.5, or 7.5-8.0. In some embodiments, the pH of a liquid resource is maintained in a target range that is high enough to facilitate lithium uptake and low enough to avoid precipitation of metal salts from the liquid resource. In some embodiments, the pH of a liquid resource is maintained below a pH of about 8 to avoid precipitation of Mg salts. In some embodiments, the pH of a liquid resource is maintained below a pH of about 2, below a pH of about 3, below a pH of about 4, below a pH of about 5, below a pH of about 6, below a pH of about 7, below a pH of about 8, or below a pH of about 9 to avoid precipitation of metal salts. In some embodiments, the pH of the liquid resource may drop out of a target pH range due to release of protons from an ion exchange material and a pH modulating setup may adjust the pH of the liquid resource back to within a target pH range. In some embodiments, the pH of the liquid resource may be adjusted above a target pH range prior to the liquid resource entering the system and then protons released from the ion exchange material may decrease the pH of the system into the target range. In some embodiments, the pH of the liquid resource may be controlled in a certain range and the range may be changed over time. In some embodiments, the pH of the liquid resource may be controlled in a certain range and then the pH of the liquid resource may be allowed to drop. In some embodiments, the pH of the liquid resource may be controlled in a certain range and then the pH of the liquid resource may be allowed to drop to solubilize colloids or solids. In some embodiments, base may be added to a liquid resource to neutralize protons without measuring pH. In some embodiments, base may be added to a liquid resource to neutralize protons with monitoring of volumes or quantities of the base. In some embodiments, the pH of the liquid resource may be measured to monitor lithium uptake by an ion exchange material. In some embodiments, the pH of the liquid resource may be monitored to determine when to separate a liquid resource from an ion exchange material. In some embodiments, the rate of change of the pH of the liquid resource may be measured to monitor the rate of lithium uptake. In some embodiments, the rate of change of the pH of the liquid resource may be measured to determine when to separate a liquid resource from an ion exchange material.

In some embodiments, the tank further comprises a porous partition. In some embodiments, the porous partition is a porous polymer partition. In some embodiments, the porous partition is a mesh or membrane. In some embodiments, the porous partition is a polymer mesh or polymer membrane. In some embodiments, the porous partition comprises one or more layers of mesh, membrane, or other porous structure. In some embodiments, the porous partition comprises one or more coarse meshes that provide structural support and one or more fine meshes and/or membranes that provide filtration. In some embodiments, the porous partition comprises a polyether ether ketone mesh, a polypropylene mesh, a polyethylene mesh, a polysulfone mesh, a polyester mesh, a polyamide mesh, a polytetrafluoroethylene mesh, an ethylene tetrafluoroethylene polymer mesh, a stainless steel mesh, a stainless steel mesh coated in polymer, a stainless steel mesh coated in ceramic, or a combination thereof, wherein the mesh is a course mesh, a fine mesh, or a combination thereof. In some embodiments, the porous polymer partition comprises a mesh comprising one or more blends of two or more of a polyether ether ketone, a polypropylene, a polyethylene, a polysulfone, a polyester, a polyamide, a polytetrafluoroethylene, or an ethylene tetrafluoroethylene polymer. In some embodiments, the porous partition comprises a polyether ether ketone membrane, a polypropylene membrane, a polyethylene membrane, a polysulfone membrane, a polyester membrane, a polyamide membrane, a polytetrafluoroethylene membrane, an ethylene tetrafluoroethylene polymer membrane, or combinations thereof.

In some embodiments, the method further comprises, after a), draining the liquid resource through the porous partition after the production of the lithiated ion exchange material.

In some embodiments, the method further comprises, after b), draining the salt solution comprising lithium ions through the porous partition after the production of the hydrogen-rich ion exchange material.

In some embodiments, the method further comprises, subsequent to a), flowing the lithiated ion exchange material into another system comprising a tank to produce the hydrogen-rich ion exchange material and the salt solution comprising lithium ions, wherein the tank of the other system further comprises (i) one or more compartments, and (ii) a mixing device.

In some embodiments, the system comprises a plurality of tanks and each of the plurality of tanks further comprises (i) one or more compartments, (ii) an ion exchange material, (iii) a mixing device, and (iv) a pH modulating setup for changing the pH of the system.

An aspect described herein is a method of extracting lithium ions from a liquid resource, comprising: a) flowing the liquid resource into a first system comprising a tank, wherein the tank of the first system further comprises (i) one or more compartments, (ii) an ion exchange material, (iii) a mixing device, and (iv) a pH modulating setup for changing the pH of the liquid resource in the first system, to produce a lithiated ion exchange material; b) flowing the lithiated ion exchange material of a) into a second system comprising a tank, wherein the tank of the second system further comprises (i) one or more compartments, and (ii) a mixing device; and c) treating the lithiated ion exchange from b) with an acid solution to produce a hydrogen-rich ion exchange material and a salt solution comprising lithium ions.

In some embodiments, the method further comprises, subsequent to a), washing the lithiated ion exchange material with an aqueous solution.

In some embodiments, the method further comprises, prior to b), adding an aqueous solution to the lithiated ion exchange material to form a fluidized lithiated ion exchange material.

In some embodiments, the method further comprises, subsequent to c), washing the hydrogen-rich ion exchange material with an aqueous solution. In some embodiments, the aqueous solution is water.

In some embodiments, the pH modulating setup comprises a pH measuring device and an inlet for adding base. In some embodiments, the pH measuring device is a pH probe. In some embodiments, the inlet is a pipe. In some embodiments, the inlet is an injection port.

In some embodiments, the method further comprises, during a), measuring a change in pH of the liquid resource using the pH modulating setup. In some embodiments, the change in pH triggers adding a base to maintain lithium uptake.

An aspect described herein is a method of extracting lithium ions from a liquid resource, comprising: a) flowing the liquid resource into a first system comprising a plurality of tanks to produce a lithiated ion exchange material, wherein each of the plurality of tanks in the first system is in fluid communication with every other one of the plurality of tanks in the first system and, each of the plurality of tanks in the first system further comprises (i) one or more compartments, (ii) an ion exchange material, (iii) a mixing device, and (iv) a pH modulating setup for changing the pH of each of the plurality of tanks in the first system; b) flowing the lithiated ion exchange material into a second system comprising a plurality of tanks, wherein each of the plurality of tanks in the second system is in fluid communication with every other one of the plurality of tanks in the second system and, each of the plurality of tanks in the second system further comprises (i) one or more compartments, and (ii) a mixing device; and c) treating the lithiated ion exchange material from b) with an acid solution in at least one of the plurality of tanks in the second system to produce a hydrogen-rich ion exchange material and a salt solution comprising lithium ions.

In some embodiments, the method further comprises, subsequent to c), washing the hydrogen-rich ion exchange material with an aqueous solution in at least one of the plurality of tanks in the second system.

In some embodiments, the method is operated in a batch mode. In some embodiments, the method is operated in a continuous mode. In some embodiments, the method is operated in continuous and batch mode. In some embodiments, the method is operated in continuous mode, a batch mode, a semi-continuous mode, or combinations thereof.

In some embodiments, the pH modulating setup comprises a pH measuring device and an inlet for adding base. In some embodiments, the pH measuring device is a pH probe. In some embodiments, the inlet is a pipe. In some embodiments, the inlet is an injection port.

In some embodiments, the method further comprises, during a), measuring a change in pH of the liquid resource using the pH modulating setup. In some embodiments, the change in pH triggers adding a base to maintain lithium uptake.

An aspect described herein is a method of extracting lithium ions from a liquid resource, comprising: a) flowing the liquid resource into a first system comprising a tank to produce a lithiated ion exchange material, wherein the tank further comprises (i) one or more compartments, (ii) ion exchange material, and (iii) a mixing device; b) flowing the lithiated ion exchange material from a) into a second system comprising a tank, wherein the tank further comprises (i) one or more compartments, (ii) an acid solution, and (iii) a mixing device; and c) stripping the lithiated ion exchange material to produce hydrogen-rich ion exchange material and a salt solution comprising lithium ions.

In some embodiments, prior to b), the lithiated ion exchange material is washed. In some embodiments, the lithiated ion exchange material is washed with an aqueous solution.

An aspect described herein is a method of extracting lithium ions from a liquid resource, comprising: a) providing a system comprising an ion exchange material, a tank comprising one or more compartments; and a mixing device, wherein (i) the ion exchange material is oxide-based and exchanges hydrogen ions with lithium ions, and (ii) the mixing device is capable of moving the liquid resource around the tank comprising one or more compartments; b) flowing the liquid resource into the system of a), thereby contacting the liquid resource with the ion exchange material, wherein the ion exchange material exchanges hydrogen ions with lithium ions in the liquid resource to produce lithiated ion exchange material; c) removing the liquid resource from the system of b); d) flowing an acid solution into the system of c) thereby contacting the acid solution with the lithiated ion exchange material, wherein the lithiated ion exchange material exchanges lithium ions with the hydrogen ions in the acid solution to produce the ion exchange material and a salt solution comprising lithium ions from the lithiated ion exchange material; and e) collecting the salt solution comprising the lithium ions for further processing.

In some embodiments, the salt solution comprising lithium ions undergoes crystallization.

A method of extracting lithium ions from a liquid resource, comprising: a) flowing the liquid resource through a system comprising an ion exchange material and a plurality of columns, wherein the plurality of columns is configured to transport the ion exchange material along the length of the column, to produce a lithiated ion exchange material; and b) treating the lithiated ion exchange material from a) with an acid solution to produce a salt solution comprising lithium ions.

An aspect described herein is a method of extracting lithium ions from a liquid resource, comprising: a) providing a system comprising an ion exchange material and a plurality of columns, wherein each of the plurality of columns is configured to transport the ion exchange material along the length of the column; b) flowing the liquid resource through a first one of the plurality of columns to produce a lithiated ion exchange material; c) flowing the lithiated ion exchange material from b) into a second one of the plurality of columns; and d) treating the lithiated ion exchange material from c) with an acid solution to produce a hydrogen-rich ion exchange material and a salt solution comprising lithium ions.

In some embodiments, the method further comprises, subsequent to b), flowing the lithiated ion exchange material into another one of the plurality of columns and washing the lithiated ion exchange material with an aqueous solution. In some embodiments, the method further comprises, subsequent to d), flowing the hydrogen-rich ion exchange material into another one of the plurality of columns and washing the hydrogen-rich ion exchange material with an aqueous solution.

An aspect described herein is a method of extracting lithium ion from a liquid resource, comprising: a) providing a system comprising an ion exchange material and a plurality of columns, wherein each of the plurality of columns is configured to transport the ion exchange material along the length of the column; b) flowing the liquid resource through a first one of the plurality of columns to produce a lithiated ion exchange material; c) flowing the lithiated ion exchange material from b) into a second one of the plurality of columns; d) washing the lithiated ion exchange material from c) with an aqueous solution; e) flowing the lithiated ion exchange material from d) into a third one of the plurality of columns; and f) treating the lithiated ion exchange material from e) with an acid solution to produce a hydrogen-rich ion exchange material and a salt solution comprising lithium ions.

In some embodiments, the method further comprises: g) flowing the hydrogen-rich ion exchange material into a fourth one of the plurality of columns; and h) washing the hydrogen-rich ion exchange material with an aqueous solution. In some embodiments, each of the plurality of columns is configured to transport the ion exchange material by a pipe system or an internal conveyer system. In some embodiments, each of the plurality of columns is configured to transport the ion exchange material by a pipe system. In some embodiments, each of the plurality of columns is configured to transport the ion exchange material by an internal conveyer system.

In some embodiments of the methods described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments of the methods described herein, the liquid resource is a brine. In some embodiments of the methods described herein, the liquid resource comprises a natural brine, a synthetic brine, or a mixture of a natural and a synthetic brine. In some embodiments of the methods described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, or combinations thereof.

In some embodiments of the methods described herein, the acid solution comprises hydrochloric acid, sulfuric acid, phosphoric acid, hydrobromic acid, chloric acid, perchloric acid, nitric acid, formic acid, acetic acid, or combinations thereof. In some embodiments of the methods described herein, the acid solution comprises hydrochloric acid, sulfuric acid, phosphoric acid, nitric acid, or combinations thereof. In some embodiments of the methods described herein, the acid solution comprises hydrochloric acid, sulfuric acid, phosphoric acid, or combinations thereof. In some embodiments of the methods described herein the acid solution comprises hydrochloric acid. In some embodiments of the methods described herein the acid solution comprises sulfuric acid. In some embodiments of the methods described herein the acid solution comprises phosphoric acid.

Process of Extracting Lithium from a Liquid Resource

In one aspect described herein, is a process for lithium extraction from a liquid resource comprising treating porous ion exchange beads alternately with acid, brine, and optionally other solutions, in a configuration where the beads move in the net opposite direction to the acid, brine, and optionally other solutions, thereby producing a lithium-enriched solution from the liquid resource. In one embodiment, the process comprises: (a) treating the porous ion exchange beads with acid under conditions suitable to absorb hydrogen to generate hydrogen-enriched beads and release lithium to generate a lithium-enriched solution; (b) optionally, washing the hydrogen-enriched beads with water to generate hydrogen-enriched beads substantially free of residual acid; (c) treating the hydrogen-enriched beads with the liquid resource under conditions suitable to absorb lithium to generate lithium-enriched beads; (d) optionally, washing the lithium-enriched beads with water to generate lithium-enriched beads substantially free of liquid resource; and (e) repeating the cycle to produce a lithium-enriched solution from the liquid resource.

In one aspect described herein, is a process for lithium extraction from a liquid resource comprising treating ion exchange material alternately with acid, brine, and optionally other solutions, in a configuration where the ion exchange material moves in the net opposite direction to the acid, brine, and optionally other solutions, thereby producing a lithium-enriched solution from the liquid resource. In one aspect described herein, is a process for lithium extraction from a liquid resource comprising treating ion exchange material alternately with acid, the liquid resource, and optionally other solutions, in a configuration where the ion exchange material moves in the net opposite direction to the acid, liquid resource, and optionally other solutions, thereby producing a lithium-enriched solution from the liquid resource. In one aspect described herein, is a process for lithium extraction from a liquid resource comprising treating ion exchange material alternately with acid, brine, and optionally other solutions, in a configuration where the ion exchange material moves in the net opposite direction to the acid, brine, and optionally other solutions, thereby producing a lithium-enriched solution from the brine. In one embodiment, the process comprises: (a) treating the ion exchange material with acid under conditions suitable to absorb hydrogen to generate hydrogen-enriched material and release lithium to generate a lithium-enriched solution; (b) optionally, washing the hydrogen-enriched material with water to generate hydrogen-enriched material substantially free of residual acid; (c) treating the hydrogen-enriched material with the liquid resource under conditions suitable to absorb lithium to generate lithium-enriched material; (d) optionally, washing the lithium-enriched beads with water to generate lithium-enriched beads substantially free of liquid resource; and (e) repeating the cycle to produce a lithium-enriched solution from the liquid resource.

In one embodiment, the porous ion exchange beads comprise ion exchange particles that reversibly exchange lithium and hydrogen and a structural matrix material, and having a pore network. In one embodiment, the liquid resource comprises a natural brine, a dissolve salt flat, a concentrated brine, a processed brine, a filtered brine, a liquid from an ion exchange process, a liquid from a solvent extraction process, a synthetic brine, leachate from ores, leachate from minerals, leachate from clays leachate from recycled products, leachate from recycled materials, or combinations thereof.

In some embodiments herein, is a process for lithium extraction from a liquid resource comprising treating porous ion exchange beads alternately with acid, brine, and optionally other solutions, in a configuration where the beads move in the net opposite direction to the acid, brine, and optionally other solutions, thereby producing a lithium-enriched solution from the liquid resource, wherein the process comprises: a) treating the porous ion exchange beads with acid under conditions suitable to absorb hydrogen to generate hydrogen-enriched beads and release lithium to generate a lithium-enriched solution; b) optionally, washing the hydrogen-enriched beads with water to generate hydrogen-enriched beads substantially free of residual acid; c) treating the hydrogen-enriched beads with the liquid resource under conditions suitable to absorb lithium to generate lithium-enriched beads; d) optionally, washing the lithium-enriched beads with water to generate lithium-enriched beads substantially free of liquid resource; and e) repeating the cycle to produce a lithium-enriched solution from the liquid resource.

In one aspect described herein, is a process for lithium extraction from a liquid resource comprising treating ion exchange particles alternately with the liquid resource, washing fluid, and acid, in a system for the extraction of lithium ions from a liquid resource, comprising: a. an ion exchange material; b. a stirred tank reactor; and c. a pH modulating setup for increasing the pH of the liquid resource in the system.

In one aspect described herein, is a process for lithium extraction from a liquid resource comprising treating ion exchange particles alternately with the liquid resource, a washing fluid, and an acid solution, with a system for the extraction of lithium ions from a liquid resource, comprising a stirred rank reactor, an ion exchange material, a pH modulating setup for increasing the pH of the liquid resource in the stirred tank reactor, and a compartment for containing the ion exchange material in the stirred tank reactor while allowing for removal of liquid resource, washing fluid, and acid solutions from the stirred tank reactor.

Process of Modulating pH for the Extraction of Lithium

An aspect of the invention described herein is a process for the extraction of lithium ions from a liquid resource, comprising: a) contacting an ion exchange material with the liquid resource; and b) increasing the pH of the liquid resource before contact with the ion exchange material, during contact with the ion exchange material, after contact with the ion exchange material and combinations thereof.

Another aspect described herein is a process for the extraction of lithium ions from a liquid resource, comprising: a) contacting an ion exchange material with the liquid resource; and b) increasing the pH of the liquid resource before contact with the ion exchange material, during contact with the ion exchange material, after contact with the ion exchange material, or combinations thereof. In some embodiments of the process, increasing the pH of the liquid resource is before contacting the ion exchange material with the liquid resource. In some embodiments of the process, increasing the pH of the liquid resource is during contacting the ion exchange material with the liquid resource. In some embodiments of the process, increasing the pH of the liquid resource is after contacting the ion exchange material with the liquid resource. In some embodiments of the process, increasing the pH of the liquid resource is before and during contacting the ion exchange material with the liquid resource. In some embodiments of the process, increasing the pH of the liquid resource is before and after contacting the ion exchange material with the liquid resource. In some embodiments of the process, increasing the pH of the liquid resource is during and after contacting the ion exchange material with the liquid resource. In some embodiments of the process, increasing the pH of the liquid resource is before, during, and after contacting the ion exchange material with the liquid resource.

An aspect of the invention described herein is a process, wherein the ion exchange material is loaded into a column. In an embodiment, the process further comprises: a) loading a liquid resource into one or more liquid resource tanks; b) connecting the column to the one or more liquid resource tanks; and c) passing the liquid resource from the one or more liquid resource tanks through the column, wherein the passing of the liquid resource occurs at least once. In an embodiment, the process further comprises increasing the pH of the liquid resource in one or more pH increasing tanks. In an embodiment, the process further comprises settling precipitates in one or more settling tanks. In an embodiment, the process further comprises storing the liquid resource in one or more storing tanks prior to or after circulating the liquid resource through the column.

An aspect of the invention described herein is a process, wherein the process further comprises: a) loading the liquid resource into one or more liquid resource tanks; b) connecting the column to the one or more liquid resource tanks; c) passing the liquid resource from the one or more liquid resource tanks through the column, wherein the passing of the liquid resource occurs at least once; d) increasing the pH of the liquid resulting from c. in one or more pH increasing tanks; e) settling precipitates of the liquid resulting from d. in one or more settling tanks; and f) storing the liquid resulting from e. in one or more storing tanks.

An aspect of the invention described herein is a process, wherein the ion exchange material is loaded in a plurality of columns. In an embodiment, a plurality of tanks is connected to the plurality of columns, wherein each of the plurality of tanks is immediately connected to one of the plurality of columns. In an embodiment, two or more of the plurality of columns forms at least one circuit. In an embodiment, at least one circuit is selected from a liquid resource circuit, a water washing circuit and an acid solution circuit. In an embodiment, the pH of the liquid resource is increased in the plurality of tanks connected to the plurality of columns in the liquid resource circuit. In an embodiment, the liquid resource circuit includes a plurality of columns connected to a plurality of tanks, wherein each of the plurality of tanks is immediately connected to one of the plurality of columns.

An aspect of the invention described herein is a process, wherein the process further comprises: a) passing the liquid resource through a plurality of columns in the liquid resource circuit; b) passing an acid solution through a plurality of columns in the acid solution circuit one or more times; and c) passing water through a plurality of columns in the water washing circuit. In an embodiment, the process further comprises interchanging a plurality of columns between the liquid resource circuit, the water washing circuit and the acid solution circuit, such that: a) at least one of the plurality of columns in the liquid resource circuit becomes at least one of the plurality of columns in the water washing circuit and/or at least one of the plurality of columns in the acid solution circuit; b) at least one of the plurality of columns in the water washing circuit becomes at least one of the plurality of columns in the acid solution circuit and/or at least one of the plurality of columns in the liquid resource circuit; and/or c) at least one of the plurality of columns in the acid solution circuit becomes at least one of the plurality of columns in the liquid resource circuit and/or at least one of the plurality of columns in the water washing circuit.

An aspect of the invention described herein is a process, wherein the ion exchange material is loaded into one or more compartments in a tank. In an embodiment, the process further comprises moving the liquid resource through the one or more compartments in the tank. In an embodiment, the tank comprises injection ports. In an embodiment, the process further comprises using the injection ports to increase the pH of the liquid resource before contact with the ion exchange material, during contact with the ion exchange material, after contact with the ion exchange material and combinations thereof.

In some embodiments, the process further comprises using the injection ports to increase the pH of the liquid resource before contact with the ion exchange material, during contact with the ion exchange material, after contact with the ion exchange material, or combinations thereof.

An aspect of the invention described herein is a process, wherein the column further comprises a plurality of injection ports. In an embodiment, the process further comprises using the plurality of injection ports to increase the pH of the liquid resource before contact with the ion exchange material, during contact with the ion exchange material, after contact with the ion exchange material and combinations thereof.

In some embodiments, the process further comprises using the plurality of injection ports to increase the pH of the liquid resource before contact with the ion exchange material, during contact with the ion exchange material, after contact with the ion exchange material, or combinations thereof.

In an embodiment, the ion exchange material comprises a plurality of ion exchange particles. In an embodiment, the plurality of ion exchange particles in the ion exchange material is selected from uncoated ion exchange particles, coated ion exchange particles and combinations thereof. In an embodiment, the ion exchange material is a porous ion exchange material. In an embodiment, the porous ion exchange material comprises a network of pores that allows liquids to move quickly from the surface of the porous ion exchange material to the plurality of ion exchange particles. In an embodiment, the ion exchange material is in the form of porous ion exchange beads.

In an embodiment, the ion exchange material extracts lithium ions from a liquid resource. During the extraction of lithium ions from a liquid resource by the ion exchange material, the pH of the liquid resource optionally decreases. Increasing the pH of the liquid resource in the system maintains the pH in a range that is suitable for lithium ion uptake by the ion exchange material. In an embodiment, increasing the pH comprises measuring the pH of the system and adjusting the pH of the system to an ideal pH range for lithium extraction. In an embodiment, for ion exchange material to absorb lithium from brine, an ideal pH range for the brine is optionally 6 to 9, a preferred pH range is optionally 4 to 9, and an acceptable pH range is optionally 2 to 9. In an embodiment, increasing the pH comprises measuring the pH of the system and wherein the pH of the system is less than 6, less than 4, or less than 2, the pH of the system is adjusted to a pH of 2 to 9, a pH of 4 to 9, or a pH of 6 to 9.

Continuous Process for Lithium Extraction

Lithium is an essential element for batteries and other technologies. Lithium is found in a variety of liquid resources, including natural and synthetic brines and leachate solutions from minerals, clays, and recycled products. Lithium can be extracted from such liquid resources using an ion exchange process based on inorganic ion exchange materials. These inorganic ion exchange materials absorb lithium from a liquid resource while releasing hydrogen, and then elute lithium in acid while absorbing hydrogen. This ion exchange process can be repeated to extract lithium from a liquid resource and yield a concentrated lithium solution. The concentrated lithium solution can be further processed into chemicals for the battery industry or other industries.

Ion exchange materials can be formed into beads and the beads can be loaded into ion exchange columns for lithium extraction. In an ion exchange column with a fixed bed, the beads at one end of the column approach saturation quickly, while the beads at the other end of the column never approach saturation. This saturation can be with lithium during brine flow or with hydrogen during acid flow. When a bead at the top of a fixed bed becomes saturated, it must remain in place until the entire column has been adequately saturated. While a bead remains in place after approaching saturation, it is not able to contribute substantial absorption capacity to the column. In this situation, the use of beads in the ion exchange columns is inefficient because the saturated beads must wait additional time prior to the next processing step. Furthermore, due to this time waiting period, the beads are exposed to longer flows of acid and brine solutions, which accelerate their dissolution and degradation.

Figure 9:
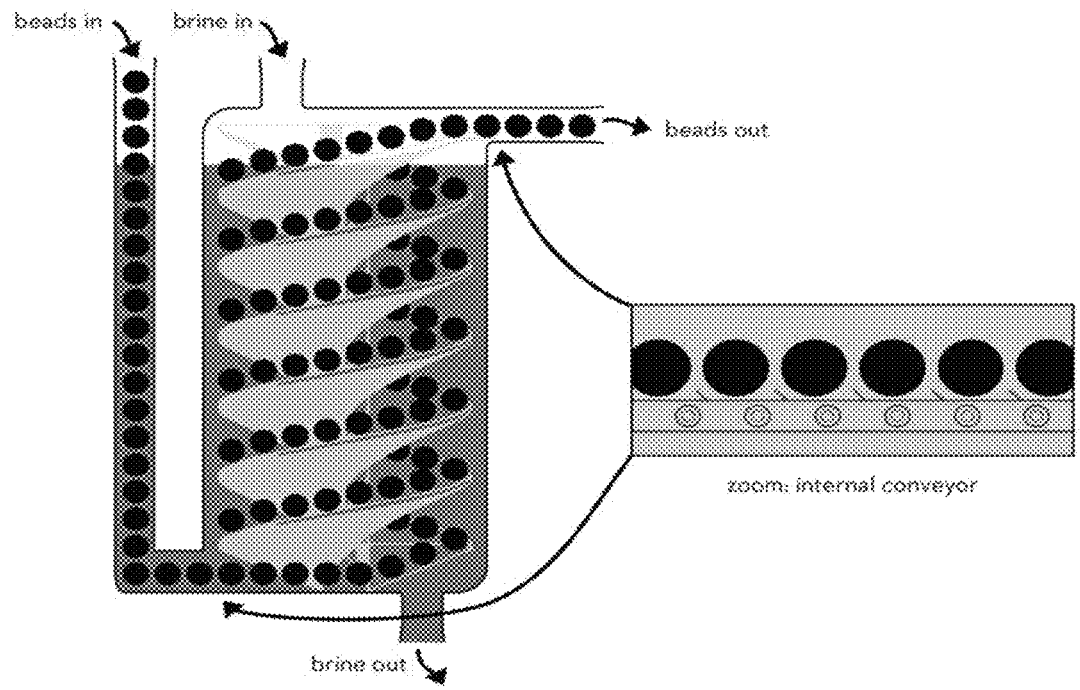
FIG. 9 illustrates an ion exchange column with a moving bed of beads that move in an opposite direction of flows of brine, acid, and other solutions.
Figure 10:
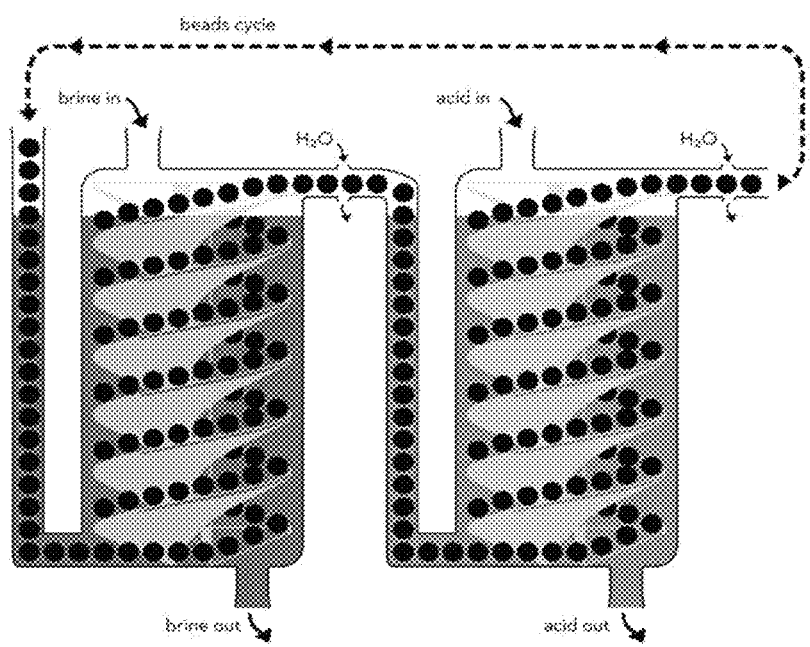
FIG. 10 illustrates the assembly of an acid column and a brine column, which move ion exchange beads in opposite directions of liquid flows.
Figure 11:
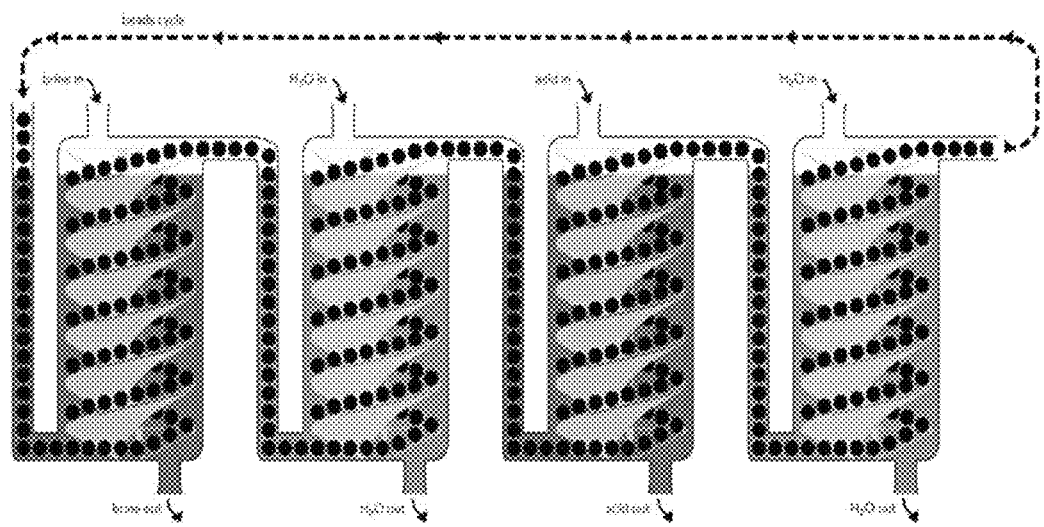
FIG. 11 illustrates the assembly of an acid column, a water washing column, a brine column, and another water washing column.
Figure 12:
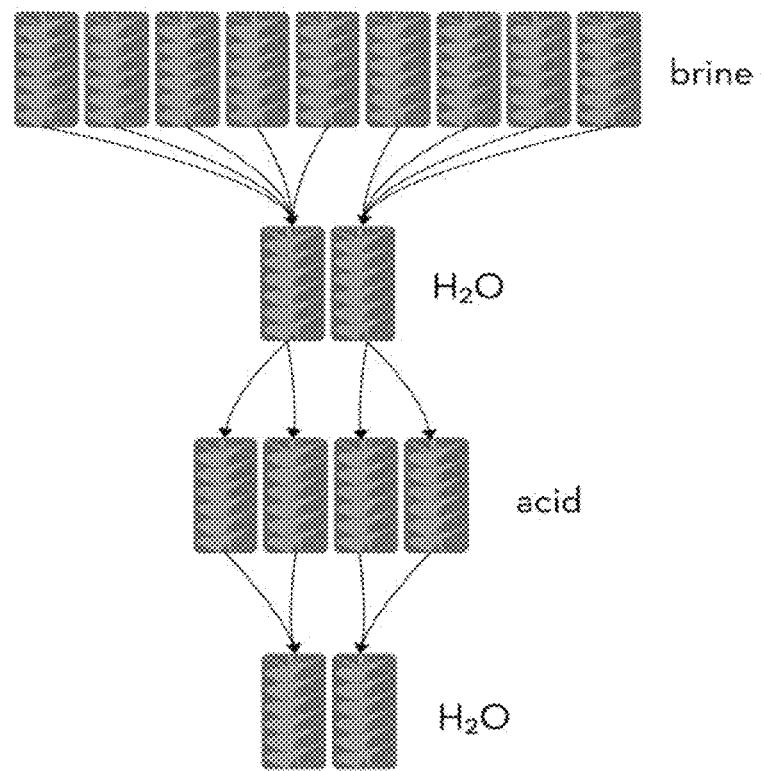
FIG. 12 illustrates the assembly of various acid, brine, and water washing columns with various flow rates of liquid solutions and beads, various column heights, and various bead and brine residence times.

The present invention is a continuous process for lithium extraction using columns with moving beds of ion exchange beads. Multiple columns may be used in this process. In one column, acid is pumped through the column and the beads are moved through the column in the opposite direction as the acid. During this acid flow, the beads absorb hydrogen from the acid while releasing lithium. Optionally, in another column, the beads are washed with water to remove the residual acid. In another column, brine is pumped through the column and the beads are moved through the column in the opposite direction as the brine. During this brine flow, the beads absorb lithium from the brine while releasing hydrogen. The hydrogen can be neutralized by adding base before, during, or after the brine flow through the column. Optionally, in another column, the beads are washed with water to remove the residual brine. Then, the beads are returned to the acid column, and the cycle repeats. FIG. 9 illustrates a continuous column with a moving bed of ion exchange beads. FIG. 10 illustrates an assembly of continuous columns including two types of ion exchange columns for brine and acid flows. FIG. 11 illustrates an assembly of continuous columns including two types of ion exchange columns for brine and acid flows, and two types of water washing columns for washing residual brine and acid. FIG. 12 illustrate an assembly of columns, wherein individual columns can process various flow rates of liquid solutions and beads with various residence times and column heights.

Ion exchange materials are typically small particles, which together constitute a fine powder. Small particle size is required to minimize the diffusion distance that lithium must travel into the core of the ion exchange particles. In some cases, these particles may be coated with protective surface coatings to minimize dissolution of the ion exchange materials while allowing efficient transfer of lithium and hydrogen to and from the particles, as disclosed in U.S. provisional application 62/421,934, filed on Nov. 14, 2016, entitled "Lithium Extraction with Coated Ion Exchange Particles," and incorporated in its entirety by reference.

One major challenge for lithium extraction using inorganic ion exchange particles is the loading of the particles into an ion exchange column in such a way that brine and acid can be pumped efficiently through the column with minimal clogging. The materials can be formed into beads, and the beads can be loaded into the column. This bead loading creates void spaces between the beads, and these void spaces facilitate pumping through the column. The beads hold the ion exchange particles in place and prevent free movement of the particles throughout the column. When the materials are formed into beads, the penetration of brine and acid solutions into the beads may become slow and challenging. A slow rate of convection and diffusion of the acid and brine solutions into the bead slows the kinetics of lithium absorption and release. Such slow kinetics can create problems for column operation. Slow kinetics can require slow pumping rates through the column. Slow kinetics can also lead to low lithium recovery from the brine and inefficient use of acid to elute the lithium.

Figure 15:
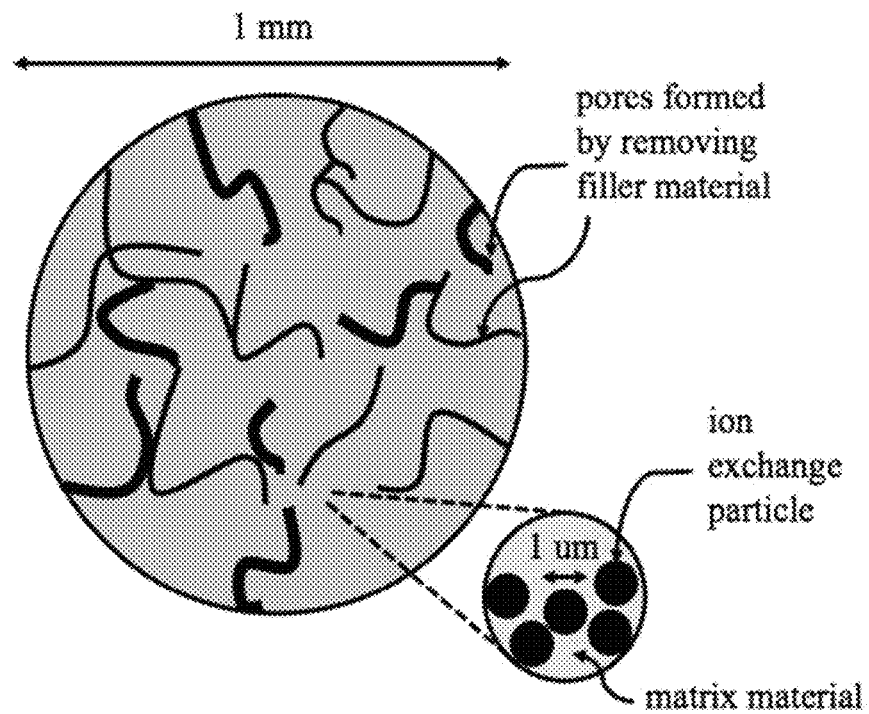
FIG. 15 illustrates a porous bead containing ion exchange particles, matrix material, and pores formed by removing filler material.

In some embodiments, the ion exchange beads are porous ion exchange beads with networks of pores that facilitate the transport into the beads of solutions that are pumped through an ion exchange column. Pore networks can be strategically controlled to provide fast and distributed access for the brine and acid solutions to penetrate into the bead and deliver lithium and hydrogen to the ion exchange particles. One example of a porous ion exchange bead is shown in FIG. 15.

In some embodiments, the ion exchange beads are formed by mixing of ion exchange particles, a matrix material, and a filler material. These components are mixed and formed into a bead. Then, the filler material is removed from the bead to leave behind pores. The filler material is dispersed in the bead in such a way to leave behind a pore structure that enables transport of lithium and hydrogen with fast kinetics. This method may involve multiple ion exchange materials, multiple polymer materials, and multiple filler materials.

Another major challenge for lithium extraction using inorganic ion exchange materials is dissolution and degradation of the materials, especially during lithium elution in acid but also during lithium uptake in liquid resources. To yield a concentrated lithium solution from the ion exchange process, it is desirable to use a concentrated acid solution to elute the lithium. However, concentrated acid solutions dissolve and degrade inorganic ion exchange materials, which decreases the performance and lifespan of the materials. Therefore, the porous ion exchange beads may contain coated ion exchange particle for lithium extraction that are comprised of an ion exchange material and a coating material protecting the particle surface. The coating protects the ion exchange material from dissolution and degradation during lithium elution in acid, during lithium uptake from a liquid resource, and during other aspects of an ion exchange process. This coated particle enables the use of concentrated acids in the ion exchange process to yield concentrated lithium solutions.

In one aspect described herein, the ion exchange material is selected for high lithium absorption capacity, high selectivity for lithium in a liquid resource relative to other ions such as sodium and magnesium, strong lithium uptake in liquid resources including those with low concentrations of lithium, facile elution of lithium with a small excess of acid, and fast ionic diffusion. In one aspect described herein, a coating material is selected to protect the particle from dissolution and chemical degradation during lithium recovery in acid and also during lithium uptake in various liquid resources. In some embodiments, the coating material may also be selected to facilitate one or more of the following objectives: diffusion of lithium and hydrogen between the particles and the liquid resources, enabling adherence of the particles to a structural support, and suppressing structural and mechanical degradation of the particles.

In some embodiments, the continuous ion exchange column may be loaded with beads at the top and then moved through the ion exchange from top to bottom. In some embodiments, the continuous ion exchange column may be loaded with beads at the bottom and then moved through the ion exchange from bottom to top. In some embodiments, the continuous ion exchange column may be loaded with beads at the bottom of the column by using a pipe or conveyer system which is flooded with solution at the bottom but extends upward to a height exceeding the height of the solution in the ion exchange column. This pipe or conveyer system allows beads to be fed into the bottom of the ion exchange column where they are submerged with liquid solution, while eliminating leakage of the liquid solution out of the column. In some embodiments, the beads are ion exchange particles, ion exchange particles with a coating, ion exchange particles without a coating, ion exchange particles embedded in a porous matrix, or combinations thereof. In some embodiments, a continuous ion exchange column is loaded with ion exchange material at the top or bottom of the column and the material is removed from the bottom or top of the column. In some embodiments, a continuous ion exchange column is loaded with ion exchange material at the top of the column and the ion exchange material is removed from the bottom of the column. In some embodiments, a continuous ion exchange column is loaded with ion exchange material at the bottom of the column and the ion exchange material is removed from the top of the column.

In some embodiments, the continuous columns use an internal conveyer system to move the beads through the column from bottom to top or from top to bottom. In some embodiments, the continuous columns use a corkscrew mechanism to move the beads through the column from bottom to top or from top to bottom. In some embodiments, the continuous columns use a corkscrew mechanism which slides under the beads while pressing them upwards. In some embodiments, the continuous columns use a corkscrew mechanism which rotates the beads upwards using friction or structures on the corkscrew that form ribs, notches, steps, flaps, supports, or fins. These structures may be rigid or flexible, and they may be made of material that is metal, plastic, or ceramic. The material chosen for the acid column is acid resistant. In some embodiments, gravity is used to move ion exchange material through a column from top to bottom. In some embodiments, liquid is flowed upward through a column while ion exchange material moves downward in the column or is suspended in the column by gravity. In some embodiments, the rate that liquid is pumped upward through the column is controlled to suspend the ion exchange material in the column. In some embodiments, the ion exchange material in a column is comprised of particles, uncoated particles, coated particles, porous material, porous beads, or porous beads comprising a structural matrix. In some embodiments, the ion exchange material is transported from one column to another column using a pipe, a conveyer, a hopper, a container, a funnel, an elevator, or combinations thereof. In some embodiments, the column may be cylindrical, conical, rectangular, pyramidal, non-cylindrical, or combinations thereof.

In some embodiments, the continuous columns are hollow cylinders oriented vertically with vertical flows of liquid solutions and beads in opposite directions. In some embodiments, the continuous columns are oriented horizontally with horizontal flows of liquid solutions and beads in opposite directions. In some embodiments, the continuous columns are oriented diagonally upwards with a stepped conveyer system. In some embodiments, the liquid solutions and beads may sometimes flow in the same direction through the columns.

Figure 13:
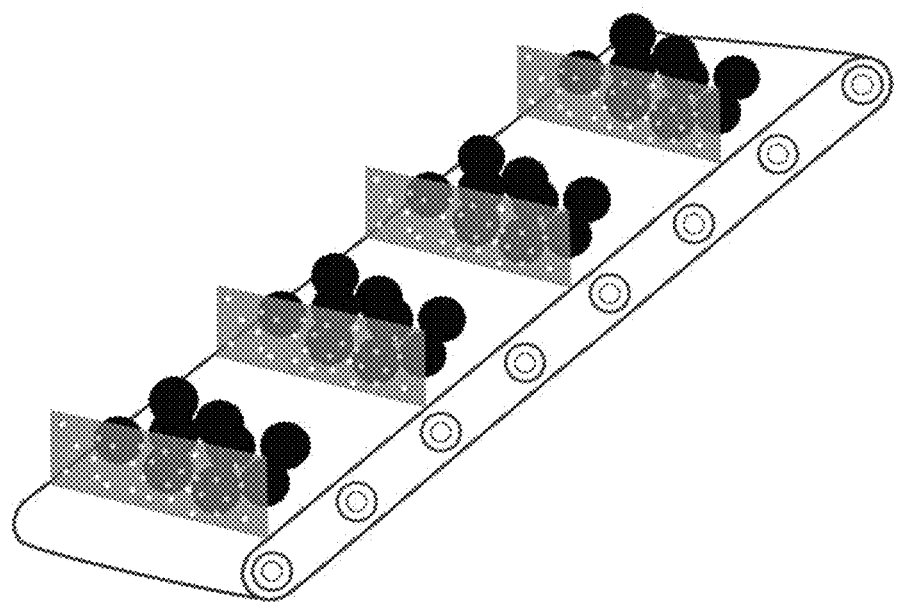
FIG. 13 illustrates an escalator system with a conveyer belt with fins attached to the conveyer belt.

In some embodiments, each column is a conveyer system which may not be cylindrical or fully enclosed. In some embodiments, the column is an escalator system where the beads are transported upward while the liquid solution flows down through the beads. The escalator has a conveyer belt with fins. The fins have holes to allow the brine to flow downward through the fins. The fins move upward, moving the beads from the bottom to the top. This escalator system with fins attached to a moving conveyer belt is illustrated in FIG. 13.

Figure 14:
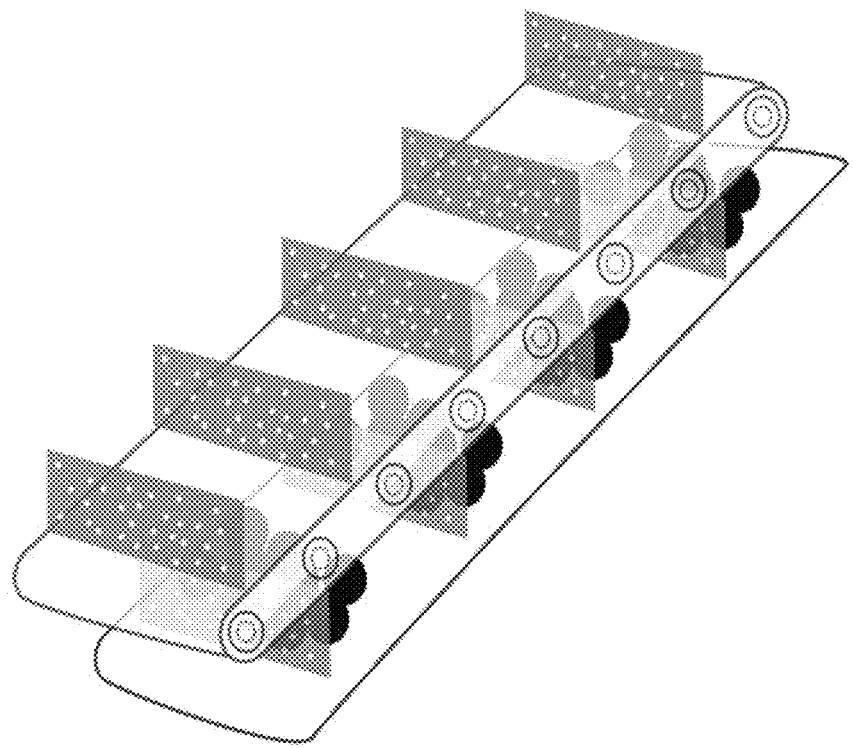
FIG. 14 illustrates an escalator system with a sliding surface that is fixed in position and fins that are attached to a separate conveyer system.

In some embodiments, each column is a non-cylindrical escalator system with fins that move upwards over a smooth sliding surface, which is fixed in position. The fins are not attached to the sliding surface but are rather attached to a separate conveyer system. These fins have holes to allow liquid solutions to flow downward, and the fins move the beads upward from bottom to top of the conveyer system. This allows the beads to be saturated by the liquid flow and then removed at the top of the conveyer system. This escalator system with a fixed sliding surface and separately-mounted fins is illustrated in FIG. 14.

In some embodiments, the holes on the fins may be less than 0.5 mm, less than 1 mm, less than 2 mm, less than 4 mm, less than 8 mm, less than 16 mm, or less than 32 mm. In some embodiments, a continuous process may use conveyer systems that move at different speeds for brine, acid, and other liquid flows. In some embodiments, a continuous process may use conveyer systems with fins of different sizes for brine, acid, or other liquid solution flows.

When the porous ion exchange beads are used in an ion exchange column, the liquid resource containing lithium is pumped through the ion exchange column so that the ion exchange particles absorb lithium from the liquid resource while releasing hydrogen. After the beads have absorbed lithium, an acid solution is pumped through the column so that the particles release lithium into the acid solution while absorbing hydrogen. The column may be operated in co-flow mode with the liquid resource and acid solution alternately flowing through the column in the same direction, or the column may be operated in counter-flow mode with a liquid resource and acid solution alternately flowing through the column in opposite directions. Between flows of the liquid resource and the acid solution, the column may be treated or washed with water or other solutions for purposes such as adjusting pH in the column or removing potential contaminants. The beads may form a fixed or moving bed, and the moving bed may move in counter-current to the brine and acid flows. The beads may be moved between multiple columns with moving beds where different columns are used for brine, acid, water, or other flows. Before or after the liquid resource flows through the column, the pH of the liquid may be adjusted with NaOH or other chemicals to facilitate the ion exchange reaction as well as handling or disposal of the spent liquid resource. Before or after the liquid resource flows through the column, the liquid resource may be subjected to other processes including other ion exchange processes, solvent extraction, evaporation, chemical treatment, or precipitation to remove lithium, to remove other chemical species, or to otherwise treat the brine.

When the ion exchange particles are treated with acid, a lithium solution is produced. This lithium solution may be further processed to produce lithium chemicals. These lithium chemicals may be supplied for an industrial application.

In some embodiments, an ion exchange material is selected from the following list: an oxide, a phosphate, an oxyfluoride, a fluorophosphate, or combinations thereof. In some embodiments, an ion exchange material is selected from the following list: $Li_4Mn_5O_{12}$, $Li_4Ti_5O_{12}$, $Li_2MO_3$ (M=Ti, Mn, Sn), $LiMn_2O_4$, $Li_{1.6}Mn1.6O4$, $LiMO_2$ (M=Al, Cu, Ti), $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, or combinations thereof. In some embodiments, an ion exchange material is selected from the following list: $Li_4Mn_5O_{12}$, $Li_4Ti_5O_{12}$, $Li_{1.6}Mn1.6O4$, $Li_2MO_3$ (M=Ti, Mn, Sn), LiFePO4, solid solutions thereof, or combinations thereof.

In some embodiments, a coating material for protecting the surface of the ion exchange material is selected from the following list: a carbide, a nitride, an oxide, a phosphate, a fluoride, a polymer, carbon, a carbonaceous material, or combinations thereof. In some embodiments, a coating material is selected from the following list: $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In some embodiments, a coating material is selected from the following list: $TiO_2$, $ZrO_2$, $MoO_2$, $SiO_2$, $Li_2TiO_3$, $Li_2ZrO_3$, $Li_2SiO_3$, $Li_2MnO_3$, $LiNbO_3$, $AlF_3$, SiC, $Si_3N_4$, graphitic carbon, amorphous carbon, diamond-like carbon, or combinations thereof.

In some embodiments, the ion exchange particles may have an average diameter that is selected from the following list: less than 10 nm, less than 100 nm, less than 1,000 nm, less than 10,000 nm, or less than 100,000 nm. In some embodiments, the ion exchange particles may have an average size that is selected from the following list: less than 200 nm, less than 2,000 nm, or less than 20,000 nm.

In some embodiments, the ion exchange particles may be secondary particles comprised of smaller primary particles that may have an average diameter selected from the following list: less than 10 nm, less than 100 nm, less than 1,000 nm, or less than 10,000 nm.

In some embodiments, the ion exchange particles have a coating material with a thickness selected from the following list: less than 1 nm, less than 10 nm, less than 100 nm, or less than 1,000 nm. In some embodiments, the coating material has a thickness selected from the following list: less than 1 nm, less than 10 nm, or less than 100 nm.

In some embodiments, the ion exchange material and a coating material may form one or more concentration gradients where the chemical composition of the particle ranges between two or more compositions. In some embodiments, the ion exchange materials and the coating materials may form a concentration gradient that extends over a thickness selected from the following list: less than 1 nm, less than 10 nm, less than 100 nm, less than 1,000 nm, less than 10,000 nm, or less than 100,000 nm.

In some embodiments, the ion exchange material is synthesized by a method selected from the following list: hydrothermal, solvothermal, sol-gel, solid state, molten salt flux, ion exchange, microwave, ball milling, precipitation, or vapor deposition. In some embodiments, the ion exchange material is synthesized by a method selected from the following list: hydrothermal, solid state, or microwave.

In some embodiments, a coating material is deposited by a method selected from the following list: chemical vapor deposition, atomic layer deposition, physical vapor deposition, hydrothermal, solvothermal, sol-gel, solid state, molten salt flux, ion exchange, microwave, wet impregnation, precipitation, titration, aging, ball milling, or combinations thereof. In some embodiments, the coating material is deposited by a method selected from the following list: chemical vapor deposition, hydrothermal, titration, solvothermal, wet impregnation, sol-gel, precipitation, microwave, or combinations thereof.

In some embodiments, a coating material is deposited with physical characteristics selected from the following list: crystalline, amorphous, full coverage, partial coverage, uniform, non-uniform, or combinations thereof.

In some embodiments, multiple coatings may be deposited on the ion exchange material in an arrangement selected from the following list: concentric, patchwork, or combinations thereof.

In some embodiments, the matrix is selected from the following list: a polymer, an oxide, a phosphate, or combinations thereof. In some embodiments, a structural support is selected from the following list: polyvinyl fluoride, polyvinylidene difluoride, polyvinyl chloride, polyvinylidene dichloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, sulfonated polymer, carboxylated polymer, Nafion, copolymers thereof, and combinations thereof. In some embodiments, a structural support is selected from the following list: polyvinylidene difluoride, polyvinyl chloride, sulfonated polytetrofluoroethylene, polystyrene, polydivinylbenzene, copolymers thereof, or combinations thereof. In some embodiments, a structural support is selected from the following list: titanium dioxide, zirconium dioxide, silicon dioxide, solid solutions thereof, or combinations thereof. In some embodiments, the matrix material is selected for thermal resistance, acid resistance, and/or other chemical resistance.

In some embodiments, the porous bead is formed by mixing the ion exchange particles, the matrix material, and the filler material together at once. In some embodiments, the porous bead is formed by first mixing the ion exchange particles and the matrix material, and then mixing with the filler material. In some embodiments, the porous bead is formed by first mixing the ion exchange particles and the filler material, and then mixing with the matrix material. In some embodiments, the porous bead is formed by first mixing the matrix material and the filler material, and then mixing with the ion exchange particles.

In some embodiments, the porous bead is formed by mixing the ion exchange particles, the matrix material, and/or the filler material with a solvent that dissolves once or more of the components. In some embodiments, the porous bead is formed by mixing the ion exchange particles, the matrix material, and/or the filler material as dry powders in a mixer or ball mill. In some embodiments, the porous bead is formed by mixing the ion exchange particles, the matrix material, and/or the filler material in a spray drier.

In some embodiments, the matrix material is a polymer that is dissolved and mixed with the ion exchange particles and/or filler material using a solvent from the following list: n-methyl-2-pyrrolidone, dimethyl sulfoxide, tetrahydrofuran, dimethylformamide, dimethylacetamide, methyl ethyl ketone, or combinations thereof. In some embodiments, the filler material is a salt that is dissolved and mixed with the ion exchange particles and/or matrix material using a solvent from the following list: water, ethanol, iso-propyl alcohol, acetone, or combinations thereof.

In some embodiments, the filler material is a salt that is dissolved out of the bead to form pores using a solution selected from the following list: water, ethanol, iso-propyl alcohol, a surfactant mixture, an acid a base, or combinations thereof. In some embodiments, the filler material is a material that thermally decomposes to form a gas at high temperature so that the gas can leave the bead to form pores, where the gas is selected from the following list: water vapor, oxygen, nitrogen, chlorine, carbon dioxide, nitrogen oxides, organic vapors, or combinations thereof.

In some embodiments, the porous ion exchange bead is formed from dry powder using a mechanical press, a pellet press, a tablet press, a pill press, a rotary press, or combinations thereof. In some embodiments, the porous ion exchange bead is formed from a solvent slurry by dripping the slurry into a different liquid solution. The solvent slurry may be formed using a solvent of n-methyl-2-pyrrolidone, dimethyl sulfoxide, tetrahydrofuran, dimethylformamide, dimethylacetamide, methyl ethyl ketone, or combinations thereof. The different liquid solution may be formed using water, ethanol, iso-propyl alcohol, acetone, or combinations thereof.

In some embodiments, the porous ion exchange bead is approximately spherical with an average diameter selected from the following list: less than 10 um, less than 100 um, less than 1 mm, less than 1 cm, or less than 10 cm. In some embodiments, the porous ion exchange bead is approximately spherical with an average diameter selected from the following list: less than 200 um, less than 2 mm, or less than 20 mm.

In some embodiments, the porous ion exchange bead is tablet-shaped with a diameter of less than 1 mm, less than 2 mm, less than 4 mm, less than 8 mm, or less than 20 mm and with a height of less than 1 mm, less than 2 mm, less than 4 mm, less than 8 mm, or less than 20 mm.

In some embodiments, the porous ion exchange bead is embedded in a support structure, which may be a membrane, a spiral-wound membrane, a hollow fiber membrane, or a mesh. In some embodiments, the porous ion exchange bead is embedded on a support structure comprised of a polymer, a ceramic, or combinations thereof. In some embodiments, the porous ion exchange bead is loaded directly into an ion exchange column with no additional support structure.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof.

In some embodiments, the liquid resource is selected with a lithium concentration selected from the following list: less than 100,000 ppm, less than 10,000 ppm, less than 1,000 ppm, less than 100 ppm, less than 10 ppm, or combinations thereof. In some embodiments, a liquid resource is selected with a lithium concentration selected from the following list: less than 5,000 ppm, less than 500 ppm, less than 50 ppm, or combinations thereof.

In some embodiments, the acid used for recovering lithium from the porous ion exchange beads is selected from the following list: hydrochloric acid, sulfuric acid, phosphoric acid, hydrobromic acid, chloric acid, perchloric acid, nitric acid, formic acid, acetic acid, or combinations thereof. In some embodiments, the acid used for recovering lithium from the porous ion exchange beads is selected from the following list: hydrochloric acid, sulfuric acid, nitric acid, or combinations thereof.

In some embodiments, the acid used for recovering lithium from the porous ion exchange beads has a concentration selected from the following list: less than 0.1 M, less than 1.0 M, less than 5 M, less than 10 M, or combinations thereof.

In some embodiments, the porous ion exchange beads perform the ion exchange reaction repeatedly over a number of cycles selected from the following list: greater than 10 cycles, greater than 30 cycles, greater than 100 cycles, greater than 300 cycles, or greater than 1,000 cycles. In some embodiments, the porous ion exchange beads perform the ion exchange reaction repeatedly over a number of cycles selected from the following list: greater than 50 cycles, greater than 100 cycles, or greater than 200 cycles.

In some embodiments, the concentrated lithium solution that is yielded from the porous ion exchange beads is further processed into lithium raw materials using methods selected from the following list: solvent extraction, ion exchange, chemical precipitation, electrodialysis, electrowinning, evaporation with direct solar energy, evaporation with concentrated solar energy, evaporation with a heat transfer medium heated by concentrated solar energy, evaporation with heat from a geothermal brine, evaporation with heat from combustion, or combinations thereof.

In some embodiments, the concentrated lithium solution that is yielded from the porous ion exchange beads is further processed into lithium chemicals selected from the following list: lithium chloride, lithium carbonate, lithium hydroxide, lithium metal, lithium metal oxide, lithium metal phosphate, lithium sulfide, or combinations thereof. In some embodiments, the concentrated lithium solution that is yielded from the porous ion exchange beads is further processed into lithium chemicals that are solid, liquid, hydrated, or anhydrous.

In some embodiments, the lithium chemicals produced using the porous ion exchange beads are used in an industrial application selected from the following list: lithium batteries, metal alloys, glass, grease, or combinations thereof. In some embodiments, the lithium chemicals produced using the coated ion exchange particles are used in an application selected from the following list: lithium batteries, lithium-ion batteries, lithium sulfur batteries, lithium solid-state batteries, and combinations thereof.

In some embodiments, the ion exchange materials are synthesized in a lithiated state with a sublattice fully or partly occupied by lithium. In some embodiments, the ion exchange materials are synthesized in a hydrated state with a sublattice fully or partly occupied by hydrogen.

EXAMPLES

Example 1: Lithium Extraction Using Coated Ion Exchange Particles

Lithium is extracted from a brine using coated ion exchange particles. The brine is an aqueous solution containing 50,000 ppm Na and 1,000 ppm Li. The coated ion exchange particles are comprised of an ion exchange material and a coating material. The ion exchange material is $Li_4Mn_5O_{12}$ and the coating material is $ZrO_2$. The particles are comprised of 98 wt. % active material and 2 wt. % of the coating. The particles have a mean diameter of 1.0 microns, and the coating thickness is approximately 2 nm.

The particles are created by first synthesizing $Li_4Mn_5O_{12}$ and then depositing the coating on the surface of the $Li_4Mn_5O_{12}$. The particles are treated with HCl acid to yield LiCl in solution. During acid treatment, the particles absorb hydrogen while releasing lithium. The $Li_4Mn_5O_{12}$ active material is converted to a hydrated state with a hydrogen-rich composition. The $ZrO_2$ coating allows diffusion of hydrogen and lithium respectively to and from the active material while providing a protective barrier that limits dissolution of manganese and oxygen from the active material. The solution is collected for elemental analysis to measure lithium yield.

After treatment in acid, the hydrated particles are treated with brine wherein the particles absorb lithium while releasing hydrogen. The particles are converted from a hydrated state to a lithiated state with a lithium-rich composition. The solution is collected for elemental analysis to measure lithium uptake.

The lithiated material is then treated again with acid to yield lithium in solution as described previously. The cycle of hydration and lithiation is repeated to extract lithium from the brine and yield a LiCl solution. Dissolution and degradation of the active material in acid is limited due to the coating providing a protective barrier. Dissolution of the active material is measured by through elemental analysis of the acid solution following stirring.

Example 2: Lithium Extraction Using an Ion Exchange Column Loaded with Beads Comprising Coated Ion Exchange Particles Lithium is extracted from a brine using an ion exchange column loaded with beads containing coated ion exchange particles. The brine is natural brine containing approximately 500 ppm Li, 50,000 ppm Na, and other chemical species including K, Mg, Ca, and sulfate. The beads are comprised of 10 wt. % polyvinylidene fluoride (PVDF) matrix and 90 wt. % coated ion exchange particles. The coated ion exchange particles are comprised of an active material and a protective surface coating. The active material is $Li_4Mn_5O_{12}$ and the coating is $ZrO_2$. The particles are comprised of 98 wt. % active material constitutes and 2 wt. % of the coating. The particles have a mean diameter of 1.0 microns, and the coating thickness is approximately 2 nm.

The particles are created by first synthesizing $Li_4Mn_5O_{12}$ and then depositing the coating on the surface of the $Li_4Mn_5O_{12}$. The beads are created by dissolving PVDF in N-methyl-2-pyrrolidone (NMP) to form a solution. This solution is then mixed with the coated ion exchange particles to form a slurry. The slurry is dripped into deionized water to form beads. The beads have an average diameter of 2 mm and a porosity of 35%.

The ion exchange column is 2 meters in length and 50 cm in diameter. The column is loaded with the beads. 10 M HCl is pumped into the bottom of the column to elute a LiCl solution out the top of the column. The particles absorb hydrogen while releasing lithium to yield LiCl. The $Li_4Mn_5O_{12}$ active material is converted to a hydrated state with a hydrogen-rich composition $Li_{4-x}H_xMn_5O_{12}$. Lithium recovery from the column is monitored using pH measurements and elemental analysis. After lithium recovery, the column is flushed with water.

After acid treatment, brine is pumped down through the column. The particles absorb lithium while releasing hydrogen. The hydrated material is converted to a lithiated state with a lithium-rich composition $Li_{4-x}H_xMn_5O_{12}$. Lithium uptake by the ion exchange beads in the column is monitored using pH measurements and elemental analysis. The brine exiting the column is adjusted to a neutral pH using NaOH and then reinjected into a brine reservoir. After lithium uptake, the column is flushed with water.

The column is operated by repeating the previously described steps of acid and brine pumping in alternation. This column operation functions to extract lithium from the brine and produce a concentrated LiCl solution. During column operation, the ion exchange particles are protected from dissolution and degradation due to the surface coating, which provides a protective barrier.

The LiCl solution that is yielded from column operation is processed into lithium raw materials including $Li_2CO_3$, LiOH, and Li metal. These lithium raw materials are sold for use in batteries, alloys, and other products.

Example 3: Lithium Extraction Using Recirculating Batch System with Mixing Tank, Settling Tank, and Recirculation Tanks Lithium is extracted from a brine using a recirculating batch system (FIG. 1) comprising an ion exchange column (101), a mixing tank for base (102), a settling tank for basic precipitates (103), a brine recirculation tank (104), and an acid recirculation tank (105). The brine is a natural aqueous chloride solution containing approximately 100 ppm Li, 40,000 ppm Na, 30,000 ppm Ca, and 3,000 ppm Mg. The ion exchange column is loaded with a packed bed of porous ion exchange beads (FIG. 8). The porous ion exchange beads are comprised of ion exchange particles and a polymer matrix. The ion exchange particles are coated ion exchange particles comprised of a $Li_4Mn_5O_{12}$ core with a $ZrO_2$ coating (FIG. 7). The particles are approximately spherical with a mean diameter of 3.0 microns, and the coating thickness is approximately 4.0 nm. The polymer matrix is comprised of polyvinylidene difluoride. The porous beads contain porous networks with a controlled distribution of pore sizes providing diffusion channels from the bead surface into the bead interior and to the ion exchange particles. The beads have a distribution of shapes with a 2.0 mm average diameter.

The ion exchange column is 50 cm tall and 1.3 cm in diameter. 200 mL of 1.0 M HCl acid is loaded into the acid recirculation tank. The acid is pumped through the ion exchange column at a flow rate of 10 mL per minute. The acid solution flows through the ion exchange column, where the protons from the acid enter the ion exchange beads and are exchanged for lithium. Lithium is thereby released from the beads and enters the acid solution. The acid solution flows back into the acid recirculation tank and is recirculated through the column for a period of 6 hours. After this 6-hour time period, the acid solution has been converted to a lithium chloride solution with some HCl remaining. The lithium chloride solution with some HCl remaining is removed from the system and further processed to produce lithium carbonate powder.

500 mL of water is loaded into the acid recirculation tank. The water is pumped through the ion exchange column at a flow rate of 20 mL per minute to wash residual acid from the column. The water flows through the ion exchange column, then back into the acid recirculation tank, and is then recirculated through the ion exchange column. After 2 hours of water washing, the water is removed from the acid recirculation tank, the pH of the water is neutralized, and the water is discarded.

10 liters of brine is loaded into the brine recirculation tank. The brine is pumped through the ion exchange column at a flow rate of 40 mL per minute. As the brine flows through the column, the ion exchange beads absorb lithium from the brine while releasing protons. The acidified brine flows out of the ion exchange column and into a mixing tank, where aqueous NaOH base is injected from an aqueous base tank (106) to adjust the pH of the brine to approximately 7.5. The mixing tank mixes the base into the brine. The brine flows from the mixing tank into the settling tank, where $Mg(OH)_2$ precipitates optionally settle to the bottom. The $Mg(OH)_2$ precipitates, which form an aqueous slurry, are pumped from the bottom of the settling tank and reinjected into the mixing tank. The pH of the brine entering and leaving the mixing tank is monitored to control rates of base injection into the mixing tank. The brine leaves the settling tank and enters into the brine recirculation tank. The brine is then recirculated back into the ion exchange column. After 36 hours, the rate of lithium uptake by the ion exchange beads slows, pumping through the system is terminated, and the spent brine is drained from the system and discarded. Then, the system is again washed with 500 mL of water as described previously. Then, the system is eluted with acid as described previously to recover a lithium concentrate.

These system operations are repeated to extract lithium from brine and yield a lithium chloride concentrate for production of lithium carbonate or other lithium chemicals.

Figure 2:
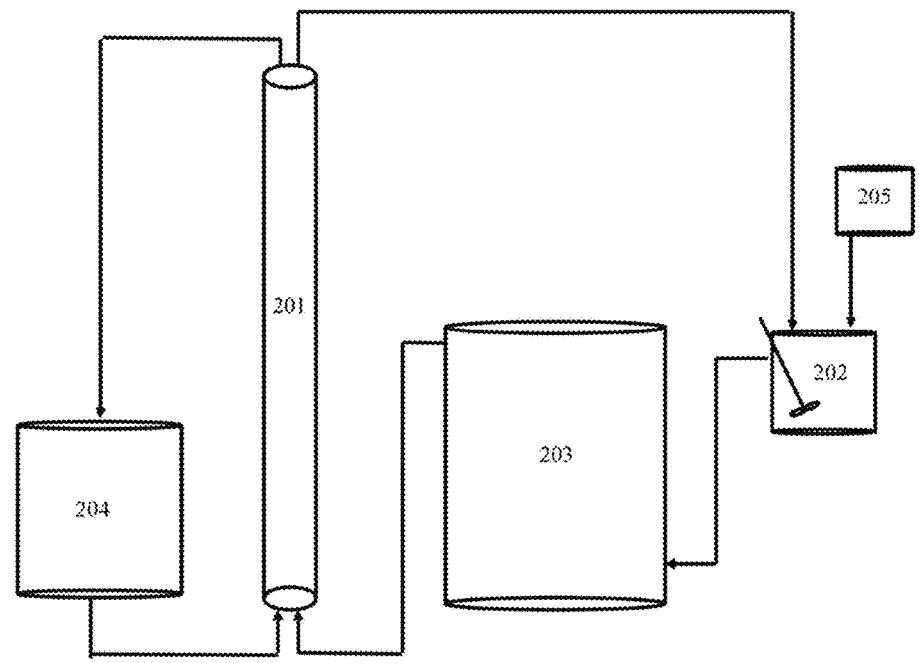
FIG. 2 illustrates a recirculating batch system comprising an ion exchange column, a mixing tank, and a recirculation tank.

Example 4: Lithium Extraction Using Recirculating Batch System with Mixing Tank and Recirculation Tanks Lithium is extracted from a brine using a recirculating batch system (FIG. 2) comprising an ion exchange column (201), a mixing tank for base (202), a brine recirculation tank (203), and an acid recirculation tank (204). The brine is a natural aqueous chloride solution containing approximately 100 ppm Li, 40,000 ppm Na, 30,000 ppm Ca, and 3,000 ppm Mg. The ion exchange column is loaded with a packed bed of porous ion exchange beads. The porous ion exchange beads are comprised of ion exchange particles and a polymer matrix. The ion exchange particles are coated ion exchange particles comprised of a $Li_4Mn_5O_{12}$ core with a $ZrO_2$ coating. The particles are approximately spherical with a mean diameter of 3.0 microns, and the coating thickness is approximately 4.0 nm. The polymer matrix is comprised of polyvinylidene fluoride. The porous beads contain porous networks with a controlled distribution of pore sizes providing diffusion channels from the bead surface into the bead interior and to the ion exchange particles. The beads have a distribution of shapes with a 2.0 mm average diameter.

The ion exchange column is 50 cm tall and 1.3 cm in diameter. 200 mL of 1.0 M HCl acid is loaded into the acid recirculation tank. The acid is pumped through the ion exchange column at a flow rate of 10 mL per minute. The acid solution flows through the ion exchange column, where the protons from the acid enter the ion exchange beads and are exchanged for lithium. Lithium is thereby released from the beads and enters the acid solution. The acid solution is flowed back into the acid recirculation tank and is recirculated through the column for a period of 6 hours. After this 6-hour time period, the acid solution has been converted to a lithium chloride solution with some HCl remaining. The lithium chloride solution with some HCl remaining is removed from the system and further processed to produce lithium carbonate powder.

500 mL of water is loaded into the acid recirculation tank. The water is pumped through the ion exchange column at a flow rate of 20 mL per minute to water residual acid from the column. The water flows through the ion exchange column, then back into the acid recirculation tank, and is then recirculated through the ion exchange column. After 2 hours of water washing, the water is removed from the acid recirculation tank, the pH of the water is neutralized, and the water is discarded.

10 liters of brine is loaded into the brine recirculation tank. The water is pumped through the ion exchange column at a flow rate of 40 mL per minute. As the brine flows through the column, the ion exchange beads absorb lithium from the brine while releasing protons. The acidified brine flows out of the ion exchange column and into a mixing tank, where aqueous NaOH base is injected from an aqueous base tank (205) to adjust the pH of the brine to approximately 7.0 while limiting formation of any basic precipitates. The mixing tank mixes the base into the brine. The pH of the brine entering and leaving the mixing tank is monitored to control rates of base injection into the mixing tank. The brine leaves the mixing tank and enters into the brine recirculation tank. The brine is then recirculated back into the ion exchange column. After 36 hours, the rate of lithium uptake by the ion exchange beads slows, pumping through the system is terminated, and the spent brine is drained from the system and discarded. Then, the system is again washed with 500 mL of water as described previously. Then, the system is eluted with acid as described previously to recover a lithium concentrate.

These system operations are repeated to extract lithium from brine and yield a lithium chloride concentrate for production of lithium carbonate or other lithium chemicals.

Figure 3:
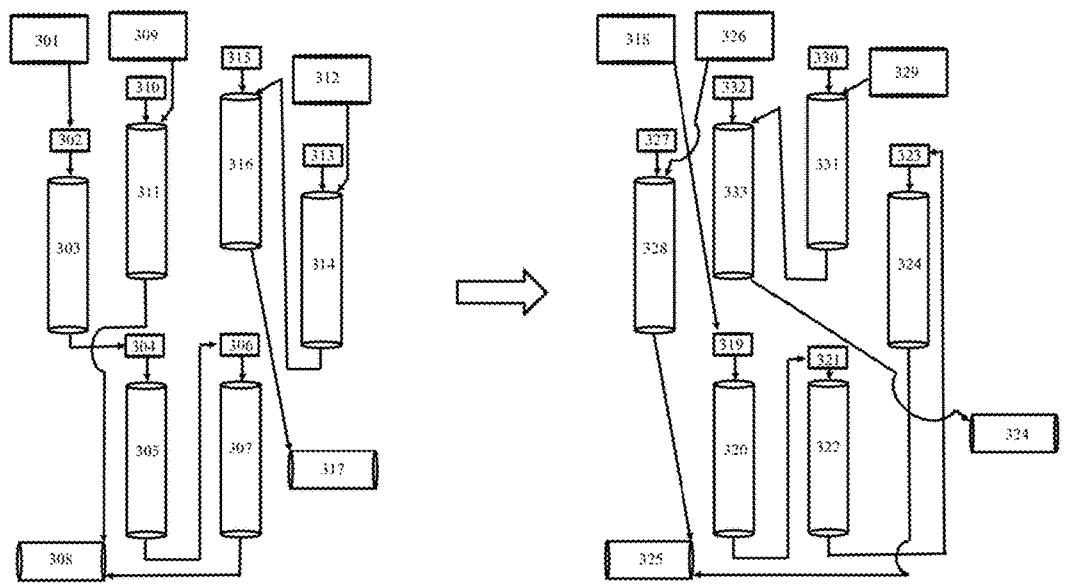
FIG. 3 illustrates a column interchange system comprising a brine circuit, a water washing circuit, and an acid circuit.

Example 5: Lithium Extraction Using Column Interchange System with Brine Circuit, Acid Circuit, and Water Washing Circuit Lithium is extracted from a brine using a column interchange system (FIG. 3) comprising six ion exchange columns, which are divided into a brine circuit, a water washing circuit, and an acid circuit. The brine is a natural aqueous chloride solution containing approximately 50 ppm Li, 40,000 ppm Na, 30,000 ppm Ca, and 3,000 ppm Mg. The ion exchange columns are loaded with packed beds of porous ion exchange beads. The porous ion exchange beads are comprised of ion exchange particles and a polymer matrix. The ion exchange particles are coated ion exchange particles comprised of a $Li_4Mn_5O_{12}$ core with a $ZrO_2$ coating. The particles are approximately spherical with a mean diameter of 3.0 microns, and the coating thickness is approximately 4.0 nm. The polymer matrix is comprised of polyvinylidene fluoride. The porous beads contain porous networks with a controlled distribution of pore sizes providing diffusion channels from the bead surface into the bead interior and to the ion exchange particles. The beads have a distribution of shapes with a 2.0 mm average diameter.

Each of the six ion exchange columns is 150 cm tall and 75 cm in diameter (303, 305, 307, 311, 314, 316). Each ion exchange column has an associated mixing tank for mixing base into brine before the brine is injected into the column (302, 304, 306, 310, 313, 315). Three of the columns (303, 305, 307) along with the associated mixing tanks (302, 304, 306) are linked to form a brine circuit. Brine flows from a brine pipe (301) through a first mixing tank (302), a first ion exchange column (303), a second mixing tank (304), a second ion exchange column (305), a third mixing tank (306), a third ion exchange column (307), and then into a disposal pipe (308). For the mixing tanks in the brine circuit (303, 305, 307), an aqueous base solution of NaOH is added to increase the pH of the brine to 7.5. The pH of the brine is monitored before and after each mixing tank in the brine circuit to control the rate of addition of aqueous base solution. In the first mixing tank (302) in the brine circuit, the brine enters the mixing tank from the brine pipe at a pH of 6.5 and a relatively small amount of base is added. In the other mixing tanks in the brine circuit (304, 306), the brine enters the mixing tank from the outlet of prior ion exchange columns at a pH of 3.5, and a relatively larger amount of base is added to neutralize the protons that are released by the prior ion exchange columns.

The water washing circuit involves pumping water from a water pipe (309), through an ion exchange column that is saturated with lithium (311), and then the water is pumped into a disposal pipe. This water washing circuit removes residual brine from the column to prepare for acid elution with minimal impurities.

The acid circuit comprises two ion exchange columns, which are eluted with 1.0 M sulfuric acid to yield a lithium sulfate concentrate. Acid solution flows from an acid storage tank (312), into a first ion exchange column in the acid circuit (314) and then into a second ion exchange column in the acid circuit (316). The mixing tanks associated with the acid circuit are idle (313, 315). While the acid flows through the acid circuit, the ion exchange beads absorb protons while releasing lithium to form a lithium sulfate solution. The resulting lithium sulfate concentrate flows into a lithium concentrate pipe (317), and is then moved to a conversion plant for processing into battery-grade lithium hydroxide.

The flow rates of the brine circuit, water washing circuit, and acid circuit are coordinated for an interchange event, which is marked by the switching of values to redirect flows through the system. During the interchange event, the first column in the brine circuit is interchanged to the water washing circuit, the column in the water washing circuit is interchanged to the acid circuit, and the first column in the acid circuit is interchanged to the brine circuit.

As the brine flows through the brine circuit, lithium is absorbed into the ion exchange beads in the ion exchange columns. The first ion exchange column in the brine circuit becomes saturated with lithium first, and then this first column is interchanged to the water washing circuit. As acid solution flows through the acid circuit, lithium is released from the ion exchange beads in the ion exchange columns. The first ion exchange column in the acid circuit becomes saturated with protons first, and then this first column is interchanged to the end of the brine circuit. Residual acid in the ion exchange column at the end of the brine circuit is washed out by the brine and is pH neutralized prior to disposal.

After the interchange event, the brine circuit is comprised of three ion exchange columns (320, 322, 324) and three mixing tanks for base addition (319, 321, 323). The acid circuit is comprised of two ion exchange columns (331, 333). The mixing tanks associated with the acid circuit are idle (330, 332). The water washing circuit is comprised of one ion exchange column (328). After the interchange event, the brine pipe (318), water pipe (326), acid tank (329), disposal pipe (325), and lithium concentrate pipe (324) are interchanged to the new circuits using valves.

In alternative versions of this example, the brine circuit is optionally comprised of fifty or more ion exchange columns with associated base mixing tanks for each column. This large number of ion exchange columns and mixing tanks enables high lithium recoveries from brines with concentrations of lithium above 50 ppm, while maintaining the pH of the brine in the range of 4-8. Such a large number of ion exchange columns is difficult to illustrate, and so a brine circuit with only three columns is used in this example to facilitate the description and illustration.

Figure 4:
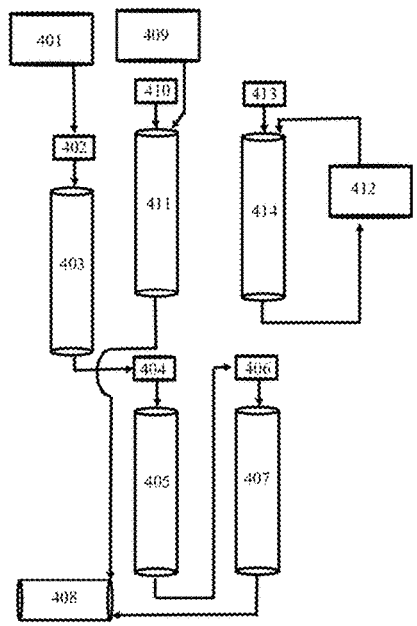
FIG. 4 illustrates a column interchange system comprising a brine circuit, a water washing circuit, and an acid recirculation loop.

Example 6: Lithium Extraction Using Column Interchange System with Brine Circuit, Acid Recirculating Loop, and Water Washing Circuit Lithium is extracted from a brine using a column interchange system (FIG. 4) comprising five ion exchange columns, which are divided into a brine circuit, a water washing circuit, and an acid recirculating loop. The brine is a natural aqueous chloride solution containing approximately 50 ppm Li, 40,000 ppm Na, 30,000 ppm Ca, and 3,000 ppm Mg. The ion exchange columns are loaded with packed beds of porous ion exchange beads. The porous ion exchange beads are comprised of ion exchange particles and a polymer matrix. The ion exchange particles are coated ion exchange particles comprised of a $Li_4Mn_5O_{12}$ core with a $ZrO_2$ coating. The particles are approximately spherical with a mean diameter of 3.0 microns, and the coating thickness is approximately 4.0 nm. The polymer matrix is comprised of polyvinylidene fluoride. The porous beads contain porous networks with a controlled distribution of pore sizes providing diffusion channels from the bead surface into the bead interior and to the ion exchange particles. The beads have a distribution of shapes with a 2.0 mm average diameter.

Each of the five ion exchange columns is 150 cm tall and 75 cm in diameter (403, 405, 407, 411, 414). Each ion exchange column has an associated mixing tank for mixing base into brine before the brine is injected into the column (402, 404, 406, 410, 413). Three of the columns (403, 405, 407) along with the associated mixing tanks (402, 404, 406) are linked to form a brine circuit. Brine flows from a brine pipe (401) through a first mixing tank (402), a first ion exchange column (403), a second mixing tank (404), a second ion exchange column (405), a third mixing tank (406), a third ion exchange column (407), and then into a disposal pipe (408). For the mixing tanks in the brine circuit (403, 405, 407), an aqueous base solution of NaOH is added to increase the pH of the brine to 7.5. The pH of the brine is monitored before and after each mixing tank in the brine circuit to control the rate of addition of aqueous base solution. In the first mixing tank (402) in the brine circuit, the brine enters the mixing tank from the brine pipe at a pH of 6.5 and a relatively small amount of base is added. In the other mixing tanks in the brine circuit (404, 406), the brine enters the mixing tank from the outlet of prior ion exchange columns at a pH of 3.5, and a relatively larger amount of base is added to neutralize the protons that are released by the prior ion exchange columns.

The water washing circuit involves pumping water from a water pipe (409), through an ion exchange column that is saturated with lithium (411), and then the water is pumped into a disposal pipe. This water washing circuit removes residual brine from the column to prepare for acid elution with minimal impurities.

The acid recirculating loops comprises one ion exchange column (414) and an acid recirculation tank (412). The tank is loaded with 1.0 M HCl acid, which is pumped into the ion exchange column, then back into the tank, then recirculated through the column. As the acid solution flows through the column, the ion exchange beads absorb protons while releasing lithium. Over time, the acid solution is converted into a lithium chloride concentrate. The mixing tanks associated with the ion exchange column are idle (413). The resulting lithium chloride concentrate is then pH neutralized, concentrated through reverse osmosis, polished to remove trace amounts of divalent ions, and processed through carbonation to yield a battery-grade lithium carbonate powder.

The flow rates of the brine circuit, water washing circuit, and acid recirculation loop are coordinated for an interchange event, which is marked by the switching of values to redirect flows through the system. During the interchange event, the first column in the brine circuit is interchanged to the water washing circuit, the column in the water washing circuit is interchanged to the acid recirculation loop, and the column in the acid circulation loop is interchanged to the brine circuit.

As the brine flows through the brine circuit, lithium is absorbed into the ion exchange beads in the ion exchange columns. The first ion exchange column in the brine circuit becomes saturated with lithium first, and then this first column is interchanged to the water washing circuit. The ion exchange column in the acid recirculation loop becomes saturated with protons, and then this column is interchanged to the end of the brine circuit. Residual acid in the ion exchange column at the end of the brine circuit is washed out by the brine and is pH neutralized prior to disposal.

After the interchange event, the brine pipe (401), water pipe (409), acid tank (412), and disposal pipe (408) are interchanged to the new circuits using valves.

In alternative versions of this example, the brine circuit is optionally comprised of fifty or more ion exchange columns with associated base mixing tanks for each column. This large number of ion exchange columns and mixing tanks enables high lithium recoveries from brines with concentrations of lithium above 50 ppm, while maintaining the pH of the brine in the range of 4-8. Such a large number of ion exchange columns is difficult to illustrate, and so a brine circuit with only three columns is used in this example to facilitate the description and illustration.

Example 7: Lithium Extraction Using Stirred Tank System

Figure 5:
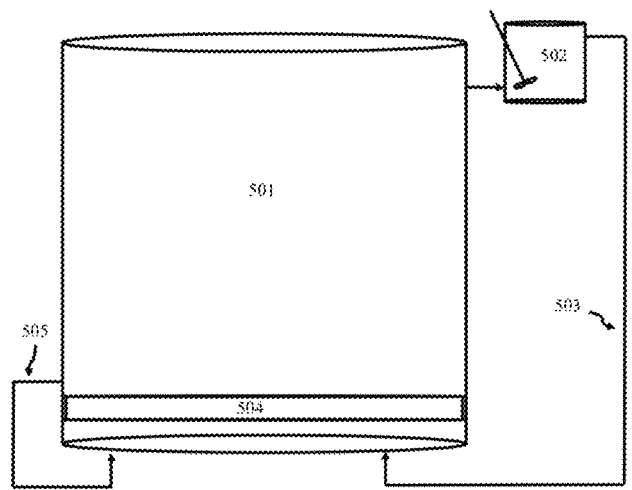
FIG. 5 illustrates a stirred tank system comprising a tank, a base mixing tank, and a permeable compartment for holding ion exchange beads.

Lithium is extracted from a brine using a stirred tank system (FIG. 5) comprising a tank (501), a mixing tank for addition of base (502), a brine recirculation pipe (503), a permeable compartment for supporting ion exchange beads inside the tank (504), and an acid recirculation pipe (505). The brine is a natural aqueous chloride solution containing approximately 100 ppm Li, 40,000 ppm Na, 30,000 ppm Ca, and 3,000 ppm Mg. The ion exchange column is loaded with a packed bed of porous ion exchange beads. The porous ion exchange beads are comprised of ion exchange particles and a polymer matrix. The ion exchange particles are coated ion exchange particles comprised of a $Li_4Mn_5O_{12}$ core with a $ZrO_2$ coating. The particles are approximately spherical with a mean diameter of 3.0 microns, and the coating thickness is approximately 4.0 nm. The polymer matrix is comprised of polyvinylidene fluoride. The porous beads contain porous networks with a controlled distribution of pore sizes providing diffusion channels from the bead surface into the bead interior and to the ion exchange particles. The beads have a distribution of shapes with a 2.0 mm average diameter.

The tank is 3.5 meters tall and 2.5 meters in diameter (501). The permeable compartment for supporting ion exchange beads is mounted inside the tank near the bottom of the tank. The compartment is mounted low enough in the tank so that the compartment will be submerged by the minimum volume of acid needed to elute the lithium from the beads. The compartment containing beads is loaded into the tank with the beads in a lithiated state. 1.0 M HCl acid is then loaded into the tank and recirculated through the acid circulation pipe (505). This acid solution delivers protons to the beads while absorbing lithium from the beads. The acid solution is pumped out of the tank at a point above the compartment, through the acid circulation pipe, and is then reinjected into the bottom of the tank. The acid solution then percolates through the compartment where it contacts the ion exchange beads, eluting lithium from the beads. Once lithium elution has slowed, the resulting lithium concentrate is removed from the system and processed into a battery-grade lithium carbonate product by neutralization, concentration using reverse osmosis, carbonation, and recrystallization.

Water is loaded into the tank and recirculated through the acid circulation pipe to wash out residual acid.

Brine is loaded into the tank and pumped out of the top of the tank, into the base mixing tank (502). The brine then flows through the brine circulation pipe and is reinjected into the bottom of the tank below the compartment. The brine flows upward through the tank, percolating through the compartment. The brine contacts the ion exchange beads, and the beads absorb lithium out of the brine while release protons. The acidified brine flows upward above the compartment, and is then pumped into the base mixing tank. In the base mixing tank, an aqueous base NaOH solution is added to neutralize the protons released by the beads and maintain the pH of the brine in the range of 6-8. The neutralized brine then flows through the brine recirculation pipe and is recirculated back into the tank for additional lithium uptake. After lithium uptake slows, the spent brine is removed from the tank. The tank is then washed again with water as described previously. Then, the acid step is repeated to yield a lithium chloride concentrate. This cycle is repeated to yield lithium concentrate, which is processed into battery-grade lithium carbonate.

Example 8: Lithium Extraction Using Ported Ion Exchange Column System

Figure 6:
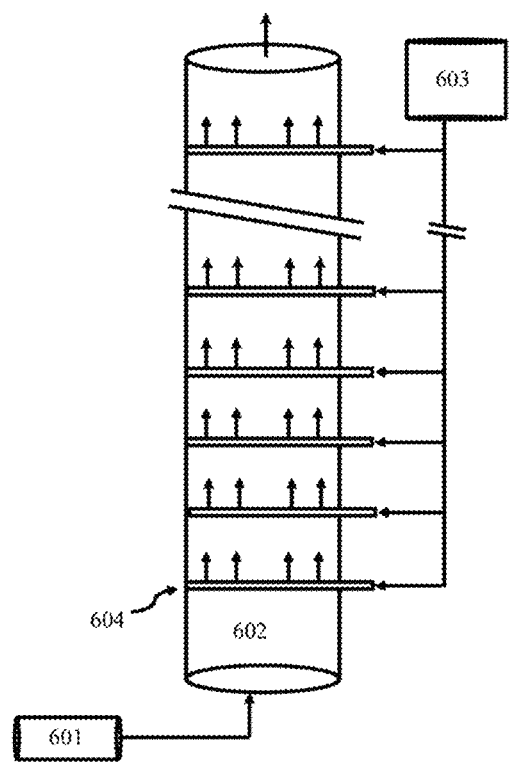
FIG. 6 illustrates a ported ion exchange column system comprising an ion exchange column with multiple ports along the length of the column for injection of base.

Lithium is extracted from a brine using a ported ion exchange column system (FIG. 6) comprising a column (602) with multiple base injection ports (604). The brine is a natural aqueous chloride solution containing approximately 100 ppm Li, 40,000 ppm Na, 30,000 ppm Ca, and 3,000 ppm Mg. The ion exchange column is loaded with a packed bed of porous ion exchange beads. The porous ion exchange beads are comprised of ion exchange particles and a polymer matrix. The ion exchange particles are coated ion exchange particles comprised of a $Li_4Mn_5O_{12}$ core with a $ZrO_2$ coating. The particles are approximately spherical with a mean diameter of 3.0 microns, and the coating thickness is approximately 4.0 nm. The polymer matrix is comprised of polyvinylidene fluoride. The porous beads contain porous networks with a controlled distribution of pore sizes providing diffusion channels from the bead surface into the bead interior and to the ion exchange particles. The beads have a distribution of shapes with a 2.0 mm average diameter.

Ion exchange beads are loaded into the ported ion exchange column system. 1.0 M HCl acid is flowed through the system to elute a lithium chloride concentrate. Then, the system is washed with acid to remove residual acid. Brine is flowed into the bottom of the system from a brine pipe (601). As the brine flows through the column, the beads absorb lithium out of the brine and release protons into the brine, acidifying the brine. To maintain the pH of the brine in a pH range of 4-8, an aqueous base solution of NaOH is injected into the base injection ports. As brine first enters the column and contacts fresh beads near the bottom of the column, the ion exchange reaction is fastest near the bottom of the column, and so initially base is injected through the ports at the bottom of the column at a higher rate. As the beads near the bottom of the column saturate, the region of the column with the greatest rate of ion exchange moves upward in the column. To neutralize the protons being release in the brine higher up in the column, base is then injected higher up in the column and base injection near the bottom of the column is slowed and eventually terminated. Base injection at the bottom of the column is terminated to avoid the precipitation of $Mg(OH)_2$ and other basic precipitates in the column in regions where protons are no longer being released at sufficient rates to neutralize the base. As the brine moves upward through the column, pH is maintained in a range of 4-8 while the beads absorb lithium and release protons and while formation of basic precipitations is limited. Once the beads throughout the column are saturated or nearly saturated with lithium, the column is washed with water, and the lithium is eluted with sulfuric acid to form a lithium sulfate concentrate. The lithium concentrate is then processed into a lithium hydroxide product.

Example 9: Lithium Extraction with Two Types of Moving Bed Columns

Lithium is extracted from a brine using an ion exchange column loaded with a moving bed of porous ion exchange particles. The brine is a natural chloride solution containing approximately 100 ppm Li, 40,000 ppm Na, 30,000 ppm Ca, and 3,000 ppm Mg. The porous ion exchange beads are comprised of ion exchange particles and a polymer matrix. The ion exchange particles are comprised of a Li4Mn5O12 core with a $ZrO_2$ coating. The ion exchange particles contain 99 wt. % $Li_4Mn_5O_{12}$ and 1 wt. % $ZrO_2$. The particles are approximately spherical with a mean diameter of 1.0 microns, and the coating thickness is approximately 1.0 nm. The polymer matrix is comprised of PVC. The porous beads contain pores with a distribution of pore sizes providing diffusion channels from the bead surface into the bead interior and to the ion exchange particles. When the porous beads are submerged in aqueous or other solutions, the pores are infiltrated with the solutions. The beads have a distribution of shapes that are approximately spherical on average with a 1.0 mm average diameter.

The porous ion exchange beads are created by combining three components: ion exchange particles, a polymer, and a removable filler material. The filler material is potassium sulfate. The three components are mixed together using a solvent mixture of n-methyl-2-pyrrolidone, ethanol, and water, and then the solvent is removed. The resulting mixture is ground and formed into beads using a mechanical press. The beads are heated to alter the structure of the polymer and improve mechanical strength. The filler is removed using water, which dissolves the filler and thereby leaves behind pores throughout the bead. The bead is heated again to alter the structure of the polymer and further improve mechanical strength.

Lithium is extracted from the brine in a continuous process with porous beads moving between two types of ion exchange columns. One type of ion exchange column is an acid column, where acid is pumped through the column. The other type of ion exchange column is a brine column, where brine is pumped through the column.

The acid columns are 2.0 meters in length and 1.0 meters in diameter. Each column is loaded with a moving bed of porous beads. 1.0 M HCl acid is pumped through the column from the bottom to the top at a flow rate of 0.5 bed volumes per hour to elute a LiCl solution. The pores in the beads allow the acid solution to penetrate into the bead and access the ion exchange particles. Therefore, the ion exchange particles can absorb hydrogen from the acid while releasing lithium into the acid. The $Li_4Mn_5O_{12}$ active material is converted to a hydrogenated state with a hydrogen-rich composition $Li_{4-x}H_xMn_5O_{12}$ where x may be close to 2. The $ZrO_2$ coating allows diffusion of hydrogen and lithium respectively to and from the active material while providing a protective barrier that limits dissolution of manganese and oxygen from the active material. The beads release lithium to yield a LiCl solution with a lithium concentration of approximately 0.8 M in solution. Lithium recovery from the column is monitored using pH measurements and elemental analysis. The beads are loaded into the top of the column and are moved toward the bottom of the column by a corkscrew mechanism. At the bottom of the column, the beads are removed from the column using another corkscrew mechanism. The beads are then washed with water and transferred to a brine column.

The brine columns are 3.0 meters in length and 1.0 meters in diameter. Each column is loaded with a moving bed of porous beads. Brine is pumped through the column from the bottom to the top at a flow rate of 4.0 bed volumes per hour. The beads absorb lithium while releasing hydrogen. The pores in the beads allow the brine solution to penetrate into the bead and access the ion exchange particles. Therefore, the ion exchange particles can absorb lithium from the brine while releasing hydrogen into the brine. The beads are converted from a hydrogenated state to a lithiated state with a lithium-rich composition $Li_4Mn_5O_{12}$ where x may be close to 0. Lithium uptake by the beads in the column is monitored using pH measurements and elemental analysis. The brine exiting the column is adjusted to a neutral pH using NaOH and then reinjected into a brine reservoir. The beads are loaded into the top of the column and are moved toward the bottom of the column by a corkscrew mechanism. At the bottom of the column, the beads are removed from the column using another corkscrew mechanism. The beads are then washed with water and transferred back to an acid column.

The acid and brine columns are operated in a continuous process by continuously flowing acid and brine through the respective columns. The beads move continuously through the columns. In the brine column, each bead is removed from the column as lithium uptake into the bead begins to slow due to partial saturation. In the acid column, each bead is removed from the column as lithium release from the bead begins to slow due to partial saturation. Removal of the bead from the acid column minimizes the time that the bead spends in acid while ensuring adequate lithium extraction from the bead. This protects the lifespan of the bead. These column operations function to extract lithium from the brine and produce a concentrated LiCl solution. During column operations, the porous beads allow the acid and brine solutions to penetrate into the beads and deliver hydrogen and lithium to the ion exchange particles. The ion exchange particles are protected from dissolution and degradation due to the $ZrO_2$ surface coating, which provides a protective barrier.

The LiCl solution that is yielded from the column operations is processed into lithium raw materials including $Li_2CO_3$, LiOH, LiCL, and Li metal. These lithium raw materials are sold for use in batteries, alloys, and other products.

Example 10: Lithium Extraction with Four Types of Moving Bed Columns

Lithium is extracted from a brine using an ion exchange column loaded with a moving bed of porous ion exchange particles. The brine is a natural chloride solution containing approximately 100 ppm Li, 40,000 ppm Na, 30,000 ppm Ca, and 3,000 ppm Mg. The porous ion exchange beads are comprised of ion exchange particles and a polymer matrix. The ion exchange particles are comprised of a $Li_4Mn_5O_{12}$ core with a $ZrO_2$ coating. The ion exchange particles contain 99 wt. % $Li_4Mn_5O_{12}$ and 1 wt. % $ZrO_2$. The particles are approximately spherical with a mean diameter of 1.0 microns, and the coating thickness is approximately 1.0 nm. The polymer matrix is comprised of PVC. The porous beads contain pores with a distribution of pore sizes providing diffusion channels from the bead surface into the bead interior and to the ion exchange particles. When the porous beads are submerged in aqueous or other solutions, the pores are infiltrated with the solutions. The beads have a distribution of shapes that are approximately spherical on average with a 1.0 mm average diameter.

The porous ion exchange beads are created by combining three components: ion exchange particles, a polymer, and a removable filler material. The filler material is potassium sulfate. The three components are mixed together using a solvent mixture of n-methyl-2-pyrrolidone, ethanol, and water, and then the solvent is removed. The resulting mixture is ground and formed into beads using a mechanical press. The beads are heated to alter the structure of the polymer and improve mechanical strength. The filler is removed using water, which dissolves the filler and thereby leaves behind pores throughout the bead. The bead is heated again to alter the structure of the polymer and further improve mechanical strength.

Lithium is extracted from the brine in a continuous process with porous beads moving between four types of columns. The first type of column is an acid ion exchange column, where acid is pumped through the column to deliver hydrogen to the beads and release lithium. The second type of column is a water column, where residual acid is washed from the beads. The third type of column is a brine ion exchange column, where brine is pumped through the column to deliver lithium to the beads while releasing hydrogen. The fourth type of column is a water column, where residual brine is washed from the beads.

The acid columns are 2.0 meters in length and 1.0 meters in diameter. Each column is loaded with a moving bed of porous beads. 1.0 M HCl acid is pumped through the column from the bottom to the top at a flow rate of 0.5 bed volumes per hour to elute a LiCl solution. The pores in the beads allow the acid solution to penetrate into the bead and access the ion exchange particles. Therefore, the ion exchange particles can absorb hydrogen from the acid while releasing lithium into the acid. The $Li_4Mn_5O_{12}$ active material is converted to a hydrogenated state with a hydrogen-rich composition $Li_{4-x}H_xMn_5O_{12}$ where x may be close to 2. The $ZrO_2$ coating allows diffusion of hydrogen and lithium respectively to and from the active material while providing a protective barrier that limits dissolution of manganese and oxygen from the active material. The beads release lithium to yield a LiCl solution with a lithium concentration of approximately 0.8 M in solution. Lithium recovery from the column is monitored using pH measurements and elemental analysis. The beads are loaded into the top of the column and are moved toward the bottom of the column by a corkscrew mechanism. At the bottom of the column, the beads are removed from the column using another corkscrew mechanism.

The beads are then transferred to another column with a moving bed of beads, where the beads are washed with water to remove residual acid. The water flows in opposite direction of the bead movement. The beads are then transferred to a brine column.

The brine columns are 3.0 meters in length and 1.0 meters in diameter. Each column is loaded with a moving bed of porous beads. Brine is pumped through the column from the bottom to the top at a flow rate of 4.0 bed volumes per hour. The beads absorb lithium while releasing hydrogen. The pores in the beads allow the brine solution to penetrate into the bead and access the ion exchange particles. Therefore, the ion exchange particles can absorb lithium from the brine while releasing hydrogen into the brine. The beads are converted from a hydrogenated state to a lithiated state with a lithium-rich composition $Li_xMn_5O_{12}$ where x may be close to 0. Lithium uptake by the beads in the column is monitored using pH measurements and elemental analysis. The brine exiting the column is adjusted to a neutral pH using NaOH and then reinjected into a brine reservoir. The beads are loaded into the top of the column and are moved toward the bottom of the column by a corkscrew mechanism. At the bottom of the column, the beads are removed from the column using another corkscrew mechanism.

The beads are then transferred to another column with a moving bed of beads, where the beads are washed with water to remove residual brine. The water flows in opposite direction of the bead movement. The beads are then transferred back to an acid column.

The acid and brine columns are operated in a continuous process by continuously flowing acid and brine through the respective columns. The beads move continuously through the columns. In the brine column, each bead is removed from the column as lithium uptake into the bead begins to slow due to partial saturation. In the acid column, each bead is removed from the column as lithium release from the bead begins to slow due to partial saturation. Removal of the bead from the acid column minimizes the time that the bead spends in acid while ensuring adequate lithium extraction from the bead. This protects the lifespan of the bead. These column operations function to extract lithium from the brine and produce a concentrated LiCl solution. During column operations, the porous beads allow the acid and brine solutions to penetrate into the beads and deliver hydrogen and lithium to the ion exchange particles. The ion exchange particles are protected from dissolution and degradation due to the $ZrO_2$ surface coating, which provides a protective barrier.

The LiCl solution that is yielded from the column operations is processed into lithium raw materials including $Li_2CO_3$, LiOH, LiCL, and Li metal. These lithium raw materials are sold for use in batteries, alloys, and other products.

Example 11: Lithium Extraction Using Stirred Tank Reactor

Lithium was extracted from a brine using a stirred tank reactor loaded with a fluidized bed of ion exchange particles. The brine was a natural chloride solution containing 500 ppm Li, 60,000 ppm Na, 17,000 ppm Ca, and 3,000 ppm Mg. The ion exchange particles were comprised of a $Li_4Mn_5O_{12}$ core with a titanium dioxide coating. The ion exchange particles contained 98 wt. % $Li_4Mn_5O_{12}$ and 2 wt. % titanium dioxide. The particles were approximately spherical with a mean diameter of 50 microns.

Figure 16:
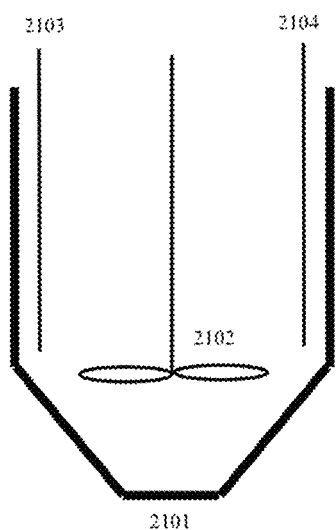
FIG. 16 illustrates a stirred tank reactor with a pH modulating setup.

The ion exchange particles were loaded into a stirred tank reactor (FIG. 16) comprising a tank (2101), an overhead stirrer (2102), a pH probe (2103), and a pipe for adding base into the tank (2104). The particles were sequentially stirred with brine, water, 0.75 N sulfuric acid, and again with water. When the particles were stirred with brine, the particles absorbed lithium from the brine while releasing protons into the brine. As protons were released, the pH of the brine dropped. The pH probe measured the change in pH and triggered base to be added to the brine through the pipe. This base neutralized the protons released from the particles and maintained a strong thermodynamic driving force for lithium uptake into the particles. The particles were then washed with water to remove residual brine. Then, the particles were eluted with sulfuric acid, and the particles released lithium to form a lithium sulfate solution while absorbing protons. Then, the particles were washed again to remove residual acid. Then, the particles were returned to a brine step and the cycle repeated. This cycle functioned to extract lithium from the brine and produce a lithium sulfate solution.

Example 12: Lithium Extraction Using Stirred Tank Reactor with Compartment

Lithium was extracted from a brine using a stirred tank reactor loaded with a fluidized bed of ion exchange particles. The brine was a natural chloride solution containing 500 ppm Li, 60,000 ppm Na, 17,000 ppm Ca, and 3,000 ppm Mg. The ion exchange particles were comprised of $Li_4Mn_5O_{12}$ in a polystyrene matrix. The particles contained approximately 90% $Li_4Mn_5O_{12}$ and 10% polystyrene. The particles had a typical size of 100 microns.

Figure 17:
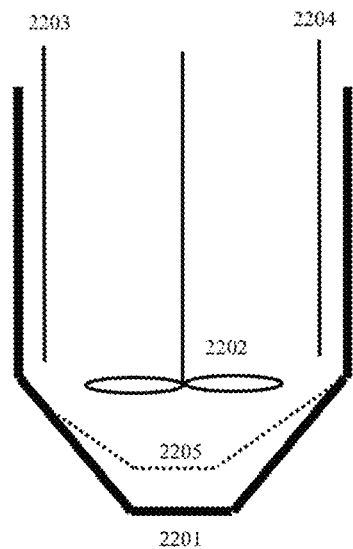
FIG. 17 illustrates a stirred tank reactor with a pH modulating setup and a compartment for containing ion exchange particles.

The ion exchange particles were loaded into a stirred tank reactor (FIG. 17) comprising a tank (2201), an overhead stirrer (2202), a pH probe (2203), a pipe for adding base into the tank (2204), and a compartment that contains the ion exchange particles with a porous polymer support (2205). The porous polymer support was a polyether ether ketone mesh with 35 micron pore size. The porous polymer support divided the bottom of the tank from the top of the tank, contained the ion exchange particles in the top of the tank, and allowed fluid to drain out of the tank through the mesh and into a pipe connected at the bottom of the tank. The compartment represented approximately 99% of the volume of the tank.

The particles were sequentially stirred with brine, water, 0.75 N hydrochloric acid, and again with water. When the particles were stirred with brine, the particles absorbed lithium from the brine while releasing protons into the brine. As protons were released, the pH of the brine dropped. The pH probe measured the change in pH and triggered base to be added to the brine through the pipe. This base neutralized the protons released from the particles and maintained a strong thermodynamic driving force for lithium uptake into the particles. The brine was drained from the tank through the bottom while leaving the ion exchange particles in the compartment separated by the porous mesh. The particles were then washed with water three times to remove residual brine, and each time the water was drained from the bottom of the tank. Then, the particles were eluted with hydrochloric acid, and the particles released lithium to form a lithium chloride solution while absorbing protons. Then, the lithium chloride solution was drained from the bottom of the tank. Then, the particles were washed again to remove residual acid. Then, the particles were returned to a brine step and the cycle repeated. This cycle functioned to extract lithium from the brine and produce a lithium chloride solution. The lithium chloride was concentrated through evaporation, purified, and reacted with sodium carbonate to form a lithium carbonate powder.

Example 13: Lithium Extraction Using Pair of Stirred Tank Reactors

Lithium is extracted from a brine using a stirred tank reactor loaded with a fluidized bed of ion exchange particles. The brine is a natural chloride solution containing approximately 500 ppm Li, 60,000 ppm Na, 20,000 ppm Ca, and 5,000 ppm Mg. The ion exchange particles are comprised of a $Li_4Mn_5O_{12}$ material. The particles are approximately spherical with a mean diameter of 30 microns.

Figure 18:
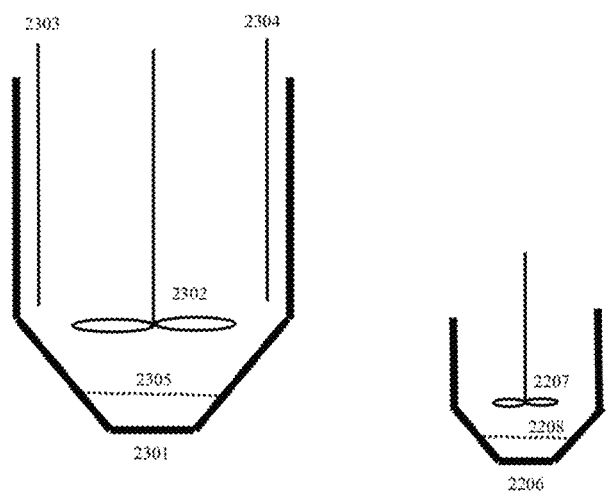
FIG. 18 illustrates a pair of stirred tank reactors including a large stirred tank reactor with a pH modulating setup and a small stirred tank reactor.

The ion exchange particles are loaded into an ion exchange system (FIG. 18) comprising a large stirred tank reactor and a small stirred tank reactor. The large stirred tank reactor comprises a large tank (2301), an overhead stirrer (2302), a pH probe (2303), a pipe for adding base into the tank (2304), and a compartment that contains the ion exchange particles with a porous polymer support (2305). The small stirred tank reactor comprises a small tank (2306), an overhead stirrer (2307), and a compartment that contains the ion exchange particles with a porous polymer support (2308). The porous polymer supports are formed with a bilayer structure with a coarse polypropylene mesh (750 micron pores) and a fine polyether ether ketone mesh (20 micron pores). The porous polymer support divides the bottom of the tanks from the top of the tanks, contains the ion exchange particles in the top of the tanks, and allows fluid to drain out of the tanks through the mesh and into pipes connected at the bottoms of the tanks. The compartments represent 99% of the volume of the tanks.

In the compartment of the large stirred tank reactor, the particles are stirred with brine and the water. When the particles are stirred with brine, the particles absorb lithium from the brine while releasing protons into the brine. As protons are released, the pH of the brine drops. The pH probe measures the change in pH and triggers base to be added to the brine through the pipe. This base neutralizes the protons released from the particles and maintains a strong thermodynamic driving force for lithium uptake into the particles. The brine is drained from the tank through the mesh and out the bottom while leaving the ion exchange particles in the compartment separated by the porous mesh. The particles are then washed with water to remove residual brine, and the water is drained from the bottom of the tank. Then, water is added to the tank to form a slurry, which is pumped out of the large stirred tank reactor and into the compartment of the small stirred tank reactor.

In the small stirred tank reactor, the particles are washed again with water and the water is then drained through the mesh out the bottom of the tank. Then, the particles are stirred with hydrochloric acid, and the particles release lithium to form a lithium chloride solution while absorbing protons. Then, the lithium chloride solution is drained from the bottom of the tank. Then, the particles are washed again to remove residual acid. Then, water is added to form a slurry, and the slurry is pumped back to the large stirred tank reactor.

The lithium chloride is concentrated through evaporation and purified. Then, the lithium chloride solution is mixed with a solution of sodium carbonate to precipitate lithium carbonate.

Example 14: Lithium Extraction Using Continuous Network of Stirred Tank Reactors Lithium is extracted from a brine using a stirred tank reactor loaded with a fluidized bed of ion exchange particles. The brine is a natural chloride solution containing approximately 500 ppm Li, 60,000 ppm Na, 20,000 ppm Ca, and 5,000 ppm Mg. The ion exchange particles are comprised of a $Li_4Mn_5O_{12}$ material with a titanium dioxide coating embedded into a polyvinylidene difluoride (PVDF) matrix. The ion exchange particles contain 75 wt. % $Li_4Mn_5O_{12}$, 5 wt. % titanium dioxide, and 20 wt. % PVDF. The particles are approximately spherical with a mean diameter of 80 microns.

Figure 19:
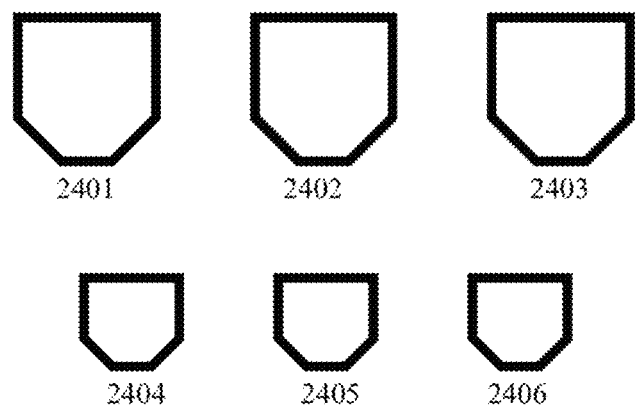
FIG. 19 illustrates a network of stirred tank reactors with a continuously operated circuit for a liquid resource.

The ion exchange particles are loaded into a network of stirred tank reactors, which is operated in a continuous mode (FIG. 19). The system comprises three large stirred tank reactors (2401, 2402, 2403) and three small stirred tank reactors (2404, 2405, 2406). Each large stirred tank reactor comprises a large tank, an overhead stirrer, a pH probe, a pipe for adding base into the tank, and a compartment that contains the ion exchange particles with a porous polymer support. Each of the small stirred tank reactors comprises a small tank, an overhead stirrer, and a compartment that contains the ion exchange particles with a porous polymer support. The porous polymer supports are formed with a bilayer structure with a coarse polypropylene mesh (750 micron pores) and a fine polyester mesh (20 micron pores). The porous polymer support divides the bottom of the tanks from the top of the tanks, contains the ion exchange particles in the top of the tanks, and allows fluid to drain out of the tanks through the mesh and into pipes connected at the bottoms of the tanks. In each tank, the compartment represents about 98% of the volume of the tank.

Brine is flowed continuously from a well field through an ultra-filtration unit to remove suspended solids and into the first large stirred tank reactor (2401). In the first stirred tank reactor, the brine is stirred with the ion exchange particles with a residence time of 20 minutes and is continuously removed from the reactor from the bottom of the reactor and then pumped into the second large stirred tank reactor (2402). In the second stirred tank reactor, the brine is stirred with the ion exchange particles with a residence time of 20 minutes and is continuously removed from the reactor from the bottom of the reactor and then pumped into the third large stirred tank reactor (2403). In the third stirred tank reactor, the brine is stirred with the ion exchange particles with a residence time of 20 minutes and is continuously removed from the reactor from the bottom of the reactor and then filtered to remove any fragments of ion exchange particles and piped back to the well field for reinjection. When the particles are stirred with brine, the particles absorb lithium from the brine while releasing protons into the brine. As protons are released, the pH of the brine drops. The pH probe measures the change in pH and triggers base to be added to the brine through the pipe. This base neutralizes the protons released from the particles and maintains a strong thermodynamic driving force for lithium uptake into the particles.

Ion exchange particles are removed continuously from the first stirred tank reactor as a slurry into a buffer tank and loaded in batches into a small stirred tank reactor (2406) for washing to remove residual brine. Then, the particles are transferred in batches to another small stirred tank reactor (2405) for elution with 1.0 N sulfuric acid to produce lithium sulfate solution, which is drained out of the compartment and out of the bottom of the tank. Then the particles are transferred to another small stirred tank reactor (2404) for washing to remove residual acid. Then the particles are transferred to a buffer tank, from where they are fed continuously into the first large stirred tank reactor to repeat the cycle.

The lithium sulfate is concentrated through reverse osmosis and purified. Then, the lithium sulfate solution is mixed with a solution of sodium carbonate to precipitate lithium carbonate.

Example 15: Lithium Extraction Using Switched Network of Stirred Tank Reactors Lithium is extracted from a brine using a stirred tank reactor loaded with a fluidized bed of ion exchange particles. The brine is a natural chloride solution containing approximately 300 ppm Li, 80,000 ppm Na, 1,000 ppm Ca, and 3,000 ppm Mg. The ion exchange particles are comprised of a $Li_4Mn_5O_{12}$ material coated with polystyrene The ion exchange particles contain 95 wt. % $Li_4Mn_5O_{12}$ and 5 wt. % polystyrene. The particles are approximately spherical with a mean diameter of 50 microns.

Figure 20:
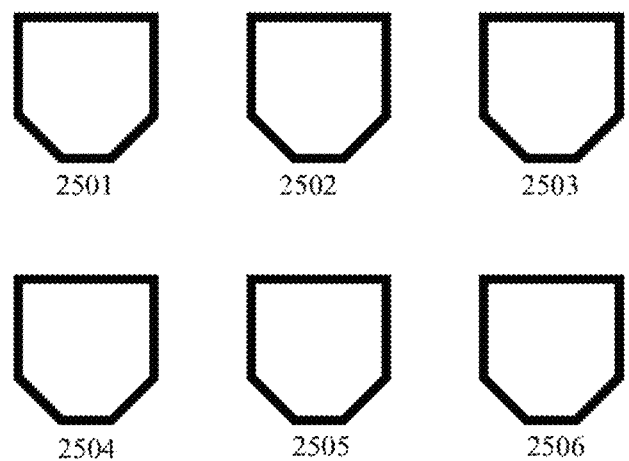
FIG. 20 illustrates a network of stirred tank reactors that each operate in batch mode and operate together in a switched network.

The ion exchange particles are loaded into a network of six stirred tank reactors, which form a switched network (FIG. 20). Each stirred tank reactor comprises a large tank, an overhead stirrer, a pH probe, a pipe for adding base into the tank, and a compartment that contains the ion exchange particles with a porous polymer support. The porous polymer supports are formed with a bilayer structure with a coarse polypropylene mesh (500 micron pores) and a fine polyether ether ketone mesh (20 micron pores). The porous polymer support divides the bottom of the tanks from the top of the tanks, contains the ion exchange particles in the top of the tanks, and allows fluid to drain out of the tanks through the mesh and into pipes connected at the bottoms of the tanks. In each tank, the compartment represents about 99% of the volume of the tank.

In each stirred tank reactor, the particles are sequentially stirred with brine, water, 0.75 N sulfuric acid, and again with water. When the particles are stirred with brine, the particles absorb lithium from the brine while releasing protons into the brine. As protons are released, the pH of the brine drops. The pH probe measures the change in pH and triggers base to be added to the brine through the pipe. This base neutralizes the protons released from the particles and maintains a strong thermodynamic driving force for lithium uptake into the particles. The brine is drained from the compartment through the porous mesh and from the tank out a pipe in the bottom while leaving the ion exchange particles in the compartment. The particles are then washed with water three times to remove residual brine, and each time the water is drained from the bottom of the tank. Then, the particles are eluted with the sulfuric acid, and the particles release lithium to form a lithium sulfate solution while absorbing protons. Then, the lithium sulfate solution is drained from the bottom of the tank. Then, the particles are washed again to remove residual acid. Then, the particles are returned to a brine step and the cycle repeats. This cycle functions to extract lithium from the brine and produce a lithium sulfate solution.

The network of stirred tank reactors is operated is batch mode with the reactors switching so that at any given time, one reactor is being eluted with acid (2501), one reactor is being washed with water to remove residual acid (2502), three reactors are being treated with brine to absorb lithium into the particles (2503, 2504, 2505), and one reactor is being washed with water to remove residual brine (2506).

The lithium sulfate is concentrated through reverse osmosis, purified, and electrolyzed to form a lithium hydroxide solution. The lithium hydroxide solution is crystallized to form a lithium hydroxide powder.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein is optionally employed in practicing the invention. It is intended that the following claims define the scope of the invention and that methods and structures within the scope of these claims and their equivalents be covered thereby.

What is claimed is:

1. A method of extracting lithium ions from a liquid resource, comprising:
   a) providing a system comprising an ion exchange material, one or more tanks comprising one or more compartments, and a mixing device, wherein (i) the ion exchange material is oxide-based and exchanges hydrogen ions with lithium ions, and (ii) the mixing device is capable of fluidizing the ion exchange material and the liquid resource around the one or more tanks comprising one or more compartments;
   b) flowing the liquid resource into the system of a) thereby contacting the liquid resource with the ion exchange material, wherein the ion exchange material exchanges hydrogen ions with lithium ions in the liquid resource to produce lithiated ion exchange material;
   c) removing the liquid resource from the system of b);
   d) flowing an acid solution into the system of c) thereby contacting the acid solution with the lithiated ion exchange material, wherein the lithiated ion exchange material exchanges lithium ions with the hydrogen ions in the acid solution to produce the ion exchange material and a salt solution comprising lithium ions from the lithiated ion exchange material; and
   e) collecting the salt solution comprising the lithium ions for further processing.

2. The method of claim 1, wherein the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

3. The method according to claim 1, wherein the acid solution comprises hydrochloric acid, sulfuric acid, phosphoric acid, hydrobromic acid, chloric acid, perchloric acid, nitric acid, formic acid, acetic acid, or combinations thereof.

4. The method of claim 1, wherein the one or more tanks comprise one or more injection ports.

5. The method of claim 4, wherein the method further comprises using the injection ports to increase the pH of the liquid resource before contact with the ion exchange material, during contact with the ion exchange material, after contact with the ion exchange material, or combinations thereof.

6. The process of method of claim 1, wherein the ion exchange material further comprises coated ion exchange material.

7. The method of claim 1, wherein the ion exchange material is a porous ion exchange material.

8. The method of claim 7, wherein the porous ion exchange material is in the form of porous ion exchange beads.

9. The method of claim 1, wherein the system further comprises a pH modulating setup.

10. The method of claim 9, wherein the pH modulating setup comprises a pH measuring device.

11. The method of claim 10, wherein the pH measuring device is a pH probe.

12. The method of claim 9, wherein a change in pH of the liquid resource triggers the addition of a base using the pH modulating setup to maintain lithium uptake.

13. The method of claim 9, wherein the pH modulating setup maintains the pH of the liquid resource in a range from about 3 to about 9.

14. The method of claim 1, wherein the one or more tanks further comprise one or more porous partitions.

15. The method of claim 14, wherein the one or more porous partitions are one or more polymer porous partitions.

16. The method of claim 14, wherein the one or more porous partitions comprise a polyether ether ketone mesh, a polypropylene mesh, a polyethylene mesh, a polysulfone mesh, a polyester mesh, a polyamide mesh, a polytetrafluoroethylene mesh, an ethylene tetrafluoroethylene polymer mesh, a stainless steel mesh, a stainless steel mesh coated in a polymer, a stainless steel mesh coated in a ceramic, or a combination thereof.

17. The method of claim 1, wherein the system comprises more than one tank and the tanks are configured to operate in series.

18. The method of claim 1, wherein the liquid resource is flowed into the system in batches.

19. The method of claim 1, wherein the liquid resource is flowed into the system continuously.

* * * * *

UNITED STATES PATENT AND TRADEMARK OFFICE
CERTIFICATE OF CORRECTION

PATENT NO. : 10,505,178 B2
APPLICATION NO. : 16/409643
DATED : December 10, 2019
INVENTOR(S) : David Henry Snydacker et al.

Page 1 of 1

It is certified that error appears in the above-identified patent and that said Letters Patent is hereby corrected as shown below:

In the Claims

Column 68, Line 5:
In Claim 6, "The process of method of claim 1," should read --The method of claim 1,--.

Signed and Sealed this
Fourth Day of August, 2020

Andrei Iancu
*Director of the United States Patent and Trademark Office*